US007110003B2

(12) United States Patent
Doan

(10) Patent No.: US 7,110,003 B2
(45) Date of Patent: Sep. 19, 2006

(54) RENDERING OBJECTS

(75) Inventor: Khanh Phi Van Doan, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 10/022,376

(22) Filed: Dec. 20, 2001

(65) Prior Publication Data

US 2002/0145616 A1  Oct. 10, 2002

(30) Foreign Application Priority Data

Dec. 22, 2000 (AU) .................... PR2312
Apr. 10, 2001 (AU) .................... PR4318

(51) Int. Cl.
*G09G 5/00* (2006.01)
(52) U.S. Cl. .............. 345/611; 345/441; 345/470; 345/592; 345/629; 382/199
(58) Field of Classification Search .............. 345/441, 345/470, 592, 629; 382/199
See application file for complete search history.

(56) References Cited

U.S. PATENT DOCUMENTS

| 5,043,711 | A | * | 8/1991 | Harrington ............. 345/440 |
| 5,065,342 | A | * | 11/1991 | Ito et al. ............... 345/626 |
| 5,438,656 | A | * | 8/1995 | Valdes et al. ........... 345/443 |
| 6,084,596 | A | | 7/2000 | Politis ................. 345/435 |
| 6,437,793 | B1 | * | 8/2002 | Kaasila ................ 345/611 |

OTHER PUBLICATIONS

Porter, Thomas, Tom Duff, Compositing Digital Images, Jul. 1984, vol. 18, No. 3, pp. 253-259.

* cited by examiner

*Primary Examiner*—Kee M. Tung
*Assistant Examiner*—Antonio Caschera
(74) *Attorney, Agent, or Firm*—Fitzpatrick, Cella, Harper & Scinto

(57) ABSTRACT

The method 600 renders a self-overlapping polygon, wherein the polygon is a set of one or more closed curves each comprising line segments. The method performs, for a currently scanned pixel that overlaps both sides of a line segment of the self-overlapping polygon within a currently scanned scanline, the following steps. The method 600 decomposes 618 that portion of the polygon that lies within the currently scanned pixel into a number of closed loops comprising at least those portions of those line segments that lie within the currently scanned pixel, the closed loops are such that when they are combined the combination is substantially equivalent to that portion of the polygon that lies within the currently scanned pixel. The method 600 combines 623 incrementally the closed loops and determines one or more winding count values representative of respective weighted averages of winding counts of the combined closed loops. The method 600 then determines 622 a real opacity of the currently scanned pixel according to a predetermined fill rule utilizing an intrinsic opacity of said polygon and the one or more winding count values. The method 600 finally renders 624 the currently scanned pixel with the determined real opacity.

21 Claims, 28 Drawing Sheets a simple polygon a simple, self-overlapping polygon a complex polygon a complex, self-overlapping polygon odd-even fill rule non-zero winding fill rule winding-counting fill rule Type 1: $A = 1 - \dfrac{(x_1 + x_2)}{2}$ Type 2:
$A = 1 - \dfrac{x_2 + x_3 + y_3(x_1 - x_2)}{2}$ Type 3: $A = 1 - \dfrac{x_1 y_2}{2}$ Type 4: $A = 1 - \dfrac{x_1 y_3 + x_3 y_2}{2}$ Type 6:
$$A = \frac{(1-x_1)y_3 + (1-x_3)y_2}{2}$$

Type 5: $A = \frac{(1-x_1)y_2}{2}$

Type 7: $A = \frac{1}{2}y_3(x_2 - x_1)$

Type 8:
$$A\frac{(1-x_2)(1-y_1)}{2}$$

Type 9: $A = 1 - \dfrac{x_2(1-y_1)}{2}$

Type 10:
$$A = \tfrac{1}{2}(x_1 - x_2)(1-y_3)$$

Type 11:
$$A = 1 - \frac{y_1 + y_3 + x_3(1-y_1) + x_2(1-y_3)}{2}$$

Type 12:
$$A = 1 - \frac{x_2(1-y_3) + x_3(1-y_1)}{2}$$

Type 13: $A = 1 - \dfrac{(y_1 + y_2)}{2}$

Type 14:
$A = 1 - \dfrac{y_1 + y_3 + x_3(y_2 - y_1)}{2}$

Type 15: $A = \dfrac{1}{2} x_3 (y_1 - y_2)$

Type 16: $A = \dfrac{1}{2}(y_2 - y_1)(1 - x_3)$

+ winding count = -1 average winding count = 0

+

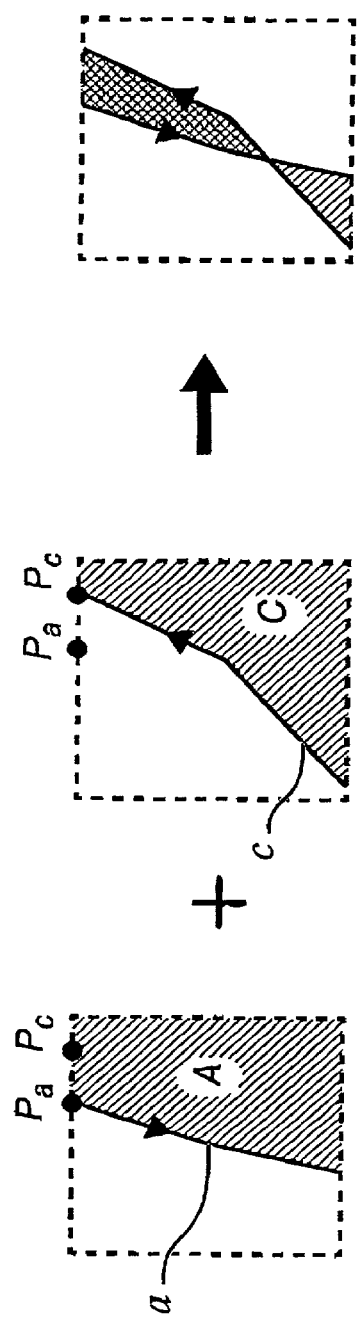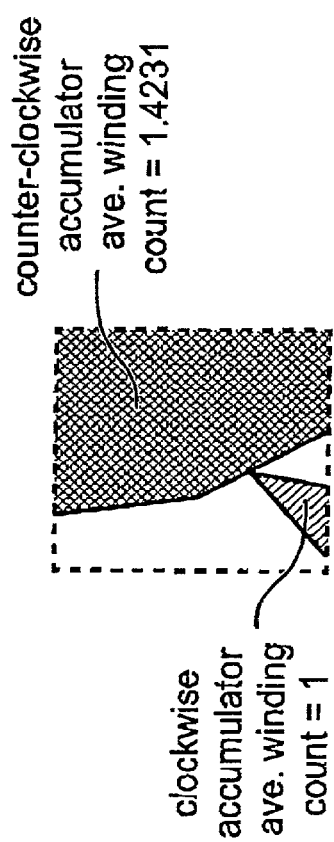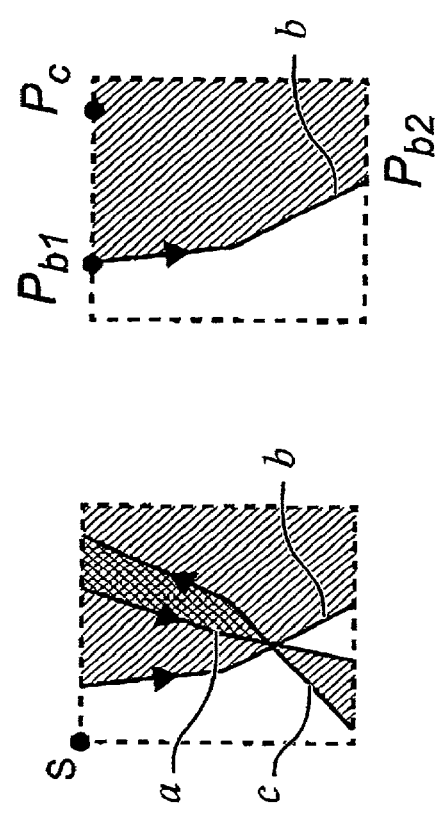
Fig. 22
Fig. 23
Fig. 24
Fig. 25

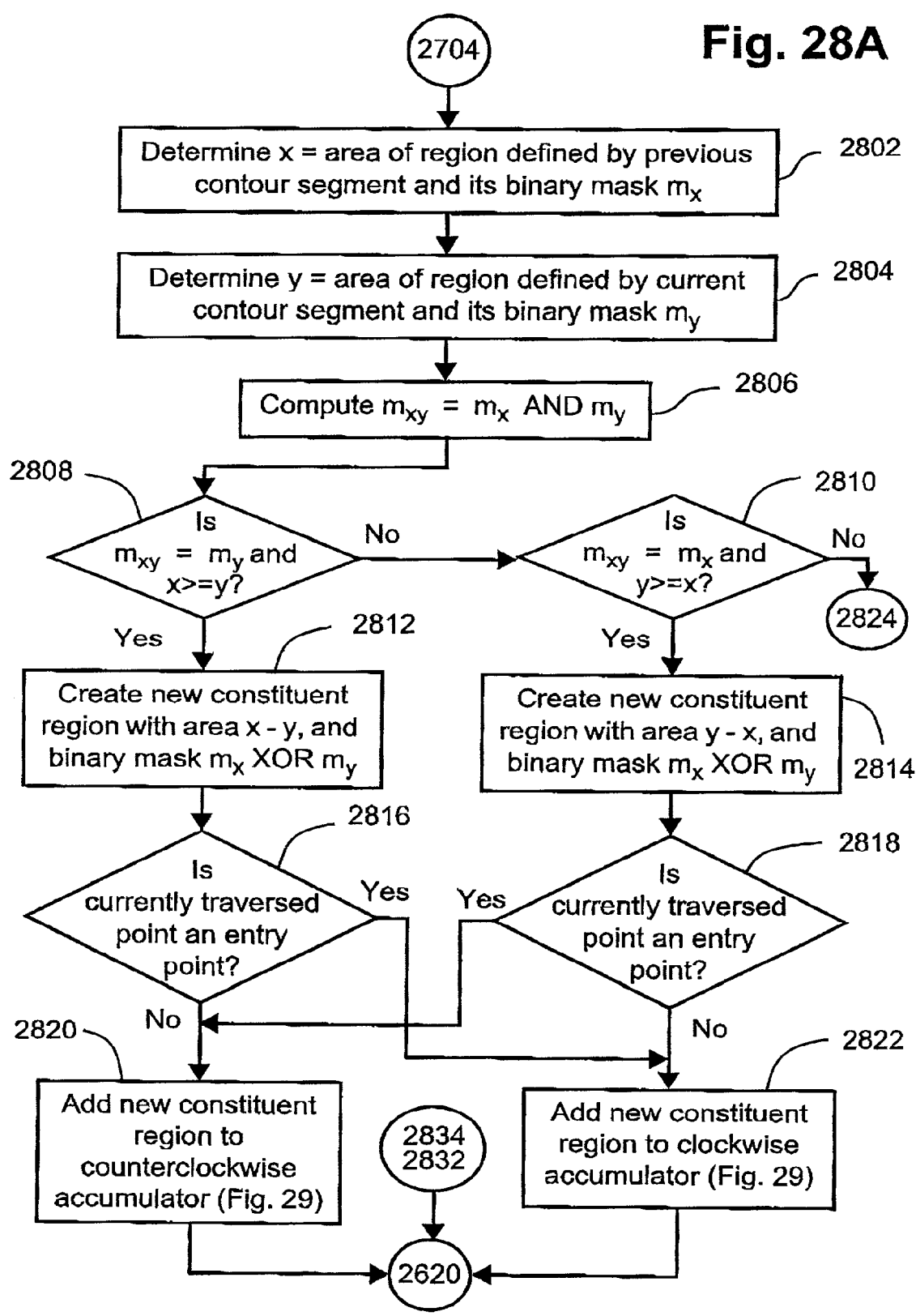

RENDERING OBJECTS

TECHNICAL FIELD

The present invention relates generally to rendering objects, and in particular to rendering a self-overlapping polygon.

BACKGROUND

Scan conversion is a computer graphics process in which geometrical objects such as lines and polygons are converted into pixel data for displaying on a raster device. Scan conversion can either operate in a simple "aliased" or more sophisticated "anti-aliased" mode.

In aliased mode, each display pixel is assigned one of two values according to whether it is classified as being inside or outside of the object being scan converted. It is well known that in this mode, "aliasing" effects can occur along the edges of objects, which give rise to "jagged" appearance. Techniques aimed at reducing or eliminating this effect are referred to as anti-aliasing techniques. They work by blending the object's colour with the colour of the background along pixels lying on the edges of the object to create smooth transitions between pixels lying outside and inside the object. Scan conversion methods that incorporate these techniques are said to be operating in "anti-aliased" mode.

Existing anti-aliasing techniques generally fall into one of three types: filtering, multi-point sampling, and area sampling. Filtering techniques work by applying a low-pass filter to the pixel values produced by an aliased scan conversion of an object to remove the high spatial frequency components that give rise to the "jagged" appearance of edges. Since this requires a matrix multiplication at each pixel, filtering techniques are computationally expensive. Filtering also has the effect of blurring horizontal and vertical edges that fall exactly on pixel boundaries that would otherwise appear sharp when scan converted using other anti-aliasing techniques, which may be undesirable.

In multi-point sampling, each pixel is sampled at several different locations at which tests are made to identify which of these points lie inside the object being scan converted. The pixel is then assigned a value based on the number of such points. Variations of this technique also exist where sampling is performed along several continuous horizontal or vertical line segments within each pixel instead of at discrete locations. The pixel is assigned a value based on the total length of these line segments that lie inside the object being scan converted.

A disadvantage of multi-point sampling is that it does not handle thin edges well. Consider the examples shown in FIG. 1 and FIG. 2. The object being scan converted in both cases is a thin, near-horizontal line 10. In FIG. 1, sampling is performed at nine equally spaced points within each pixel. The white and black circles represent sampling points that lie outside and inside of the line 10 respectively. It can be seen that since all sampling points in pixels 3 and 6 lie outside of the line 10, these pixels will be treated as if they lie completely outside of the line 10, and hence the scan converted line 10 will appear broken.

A similar problem exists in FIG. 2, where sampling is performed over three horizontal line segments per pixel denoted by the dotted lines. The portion of these dotted line segments that lie inside the line 10 being scan converted is highlighted in solid black lines in FIG. 2. Again, the scan converted line 10 will appear broken at pixels 3 and 6.

The third type of anti-aliasing technique is area sampling, where each pixel is assigned a value according to the percentage area of the pixel that falls inside the object being drawn. Its advantage over multi-point sampling is that it does not suffer from the problem illustrated in FIG. 1 and FIG. 2 that arise when scan converting thin lines. The overriding disadvantage of area sampling is that whilst straight lines and simple polygons can easily be handled, complex, self-overlapping (or self-intersecting) polygons pose a problem because of the computational intensive nature of processing such polygons. It has been suggested to convert these complex and/or self-overlapping polygon into a plurality of simple mutually exclusive non-intersecting polygons prior to area sampling. However, the procedure involved is potentially time consuming since it requires the calculations of the intersections between every pair of edges of the polygon. This has the disadvantage of adding an extra burden to the already costly area sampling process.

When scan converting a complex or self-overlapping polygon, it is necessary to select a fill rule. A polygon is a set of one or more closed curves each comprising of a number of vertices connected by straight line segments. Each closed curve is also known as a contour and has an associated direction. A polygon is said to be simple if it comprises of only a single contour, otherwise it is said to be complex. A polygon is also said to be self-overlapping or self-intersecting if one or more of its contours crosses over itself or over other contours. Examples of the possible different types of polygons are shown in FIGS. 3(A), 3(B), 3(C), and 3(D).

Odd-even and non-zero winding are two fill rules well known to those skilled in the art based on the winding count of a point. The winding count of a point is defined as follows: draw an arbitrary path from any point outside of the polygon to this point. Count the number of times a contour crosses the path from one side of the path to the other, and the number of times a contour crosses the path in the opposite direction. The winding count of the point is the obtained by subtracting the second number from the first.

When using the odd-even fill rule, points that have odd winding counts are considered to be inside the polygon and are hence filled with the polygon's colour and opacity, whilst points with even winding counts are considered to be outside the polygon and are not filled.

When using the non-zero winding fill rule, points that have zero winding counts are considered to be outside the polygon, whilst points with non-zero winding counts are considered to be inside the polygon.

The publication U.S. Pat. No. 6,084,596 discloses a third fill rule, called "winding-counting". Unlike the non-zero winding fill rules, in which all pixels classified as being inside the polygon are rendered with uniform colour and opacity, winding-counting assigns an opacity value to a pixel according to its absolute winding count. More specifically, pixels with a zero winding count are classified as being outside the polygon and are not filled, and pixels with a +1 or −1 winding count are filled in the same manner as in the odd-even and non-zero winding rule.

The pixels with a winding count of n, where |n|>1, are rendered by performing |n| repeated rendering operations, each time using a pixel with the colour and opacity of the polygon. For fully opaque polygons, this produces identical results to the non-zero winding fill rule. For partially transparent, complex and/or self-overlapping polygons however, winding-counting gives the effect of the polygons being made up of several overlapping layers.

A comparison between the three fill rules is shown in FIGS. 4(a), 4(b), and FIG. 4(c). In FIG. 4(a), a partially transparent polygon is rendered using the odd-even fill rule. In (b) and (c), the same polygon is rendered using the non-zero winding and the winding-counting fill rules respectively. The centre region of FIG. 4(c) has a winding count of 2 and hence has been drawn with a higher opacity than the surrounding region.

However, the scan conversion method of the publication U.S. Pat. No. 6,084,596 suffers from "aliasing" effects.

SUMMARY OF THE INVENTION

It is an object of the present invention to substantially overcome, or at least ameliorate, one or more disadvantages of existing arrangements.

According to one aspect of the invention, there is provided a method of rendering objects, the method comprising, for each said object within a scanline, the steps of: determining each boundary pixel that overlaps both sides of a border of the object; computing a real opacity of each said boundary pixel, wherein said real opacity of a said boundary pixel is dependent upon an intrinsic opacity of the object, winding counts for subregions of said boundary pixel, and values representative of the areas of the respective subregions with respect to the total area of the boundary pixel; and rendering each said boundary pixel by compositing using the corresponding computed real opacity.

According to another aspect of the invention, there is provided apparatus for rendering objects, the apparatus comprising processing means for processing each said object within a scanline, the processing means comprising: means for determining each boundary pixel that overlaps both sides of a border of the object; means for computing a real opacity of each said boundary pixel, wherein said real opacity of a said boundary pixel is dependent upon an intrinsic opacity of the object, winding counts for subregions of said boundary pixel, and values representative of the areas of the respective subregions with respect to the total area of the boundary pixel; and means for rendering each said boundary pixel by compositing using the corresponding computed real opacity.

According to still another aspect of the invention, there is provided a computer program for rendering objects, the computer program comprising processing code for processing each said object within a scanline, the processing code comprising: code for determining each boundary pixel that overlaps both sides of a border of the object; code for computing a real opacity of each said boundary pixel, wherein said real opacity of a said boundary pixel is dependent upon an intrinsic opacity of the object, winding counts for subregions of said boundary pixel, and values representative of the areas of the respective subregions with respect to the total area of the boundary pixel; and code for rendering each said boundary pixel by compositing using the corresponding computed real opacity.

BRIEF DESCRIPTION OF THE DRAWINGS

A number of preferred embodiments of the present invention will now be described with reference to the drawings, in which:

FIG. 22 illustrates a pixel containing 3 contour segments;

FIG. 23 illustrates the combining of the two contour segments a and c of FIG. 22 to form a constituent region;

FIG. 24 illustrates a constituent region formed by the single contour segment b of FIG. 22;

FIG. 25 illustrates coverage regions and their associated area values stored in the clock and counter-clockwise accumulators;

FIGS. 28A and 28B is a flow chart of step 2706 of FIG. 27 in accordance with the method 600 shown in more detail;

DETAILED DESCRIPTION INCLUDING BEST MODE

Figure 1:
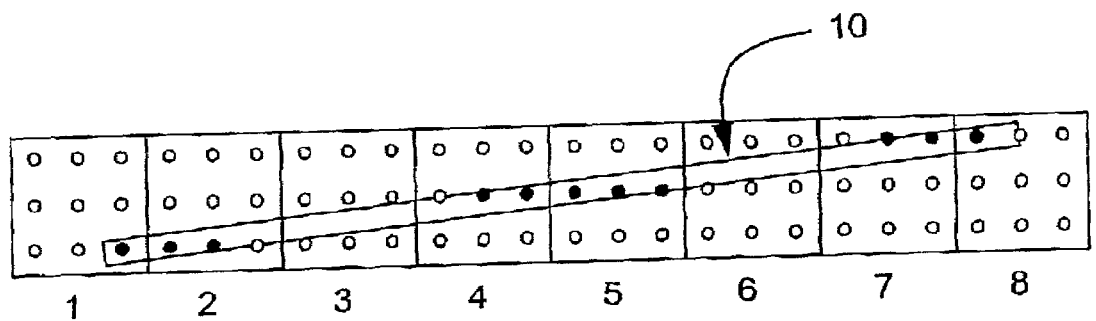
FIG. 1 illustrates the results of a prior art anti-aliasing method using multi-point sampling.
Figure 2:
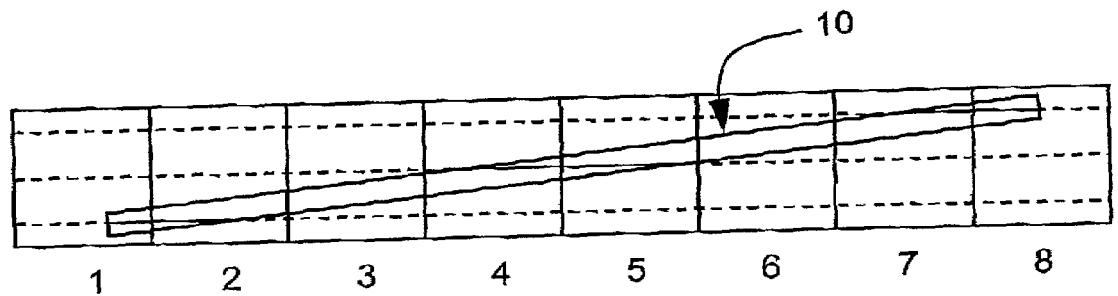
FIG. 2 illustrates the results of a prior art anti-aliasing method using line segment sampling.
Figure 3A:
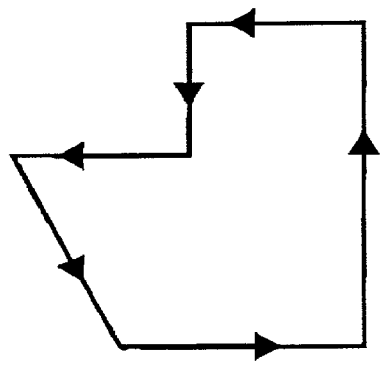
FIGS. 3A, 3B, 3C, and 3D illustrate different types of polygons.
Figure 3B:
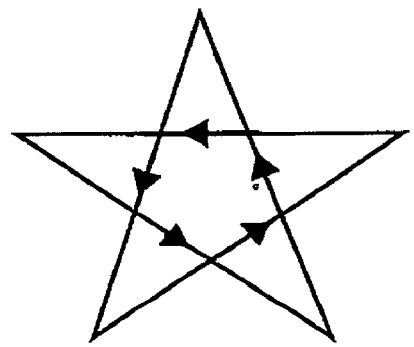
Figure 3C:
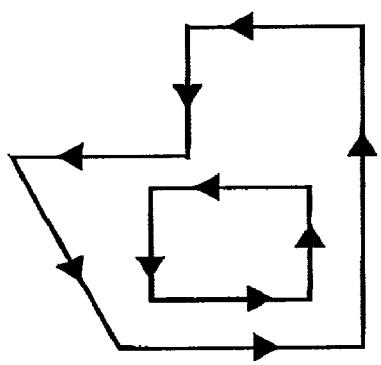
Figure 3D:
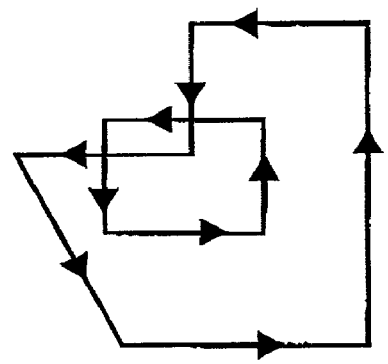

Where reference is made in any one or more of the accompanying drawings to steps and/or features, which have the same reference numerals, those steps and/or features have for the purposes of this description the same function(s) or operation(s), unless the contrary intention appears.

1.0 Polygon Fill Rules

Before proceeding with a description of the embodiments of the invention, a brief review on Polygon Fill Rules is discussed herein.

A polygon is a set of one or more closed curves each comprising a number of vertices connected by straight-line segments. Each closed curve is also known as a contour and has an associated direction A polygon is said to be simple if it comprises only a single contour, otherwise it is said to be complex. A polygon is also said to be self-overlapping or self-intersecting if one or more of its contours crosses over itself or over other contours. Examples of the possible different types of polygons are shown in FIG. 3.

When scan converting a complex or self-overlapping polygon, it is necessary to select a "fill rule". "Odd-even" and "non-zero winding" are two fill rules well known to those skilled in the art.

When using the odd-even fill rule, points that have odd "winding counts" are considered to be inside the polygon and are hence filled with the polygon's colour and opacity, whilst points with even winding counts are considered to be outside the polygon and are not filled.

When using the non-zero winding fill rule, points that have zero winding counts are considered to be outside the polygon, whilst points with non-zero winding counts are considered to be inside the polygon.

The winding count of a point is defined as follows: draw an arbitrary path from any point outside of the polygon to this point. Count the number of times a contour crosses the path from one side of the path to the other, and the number of times a contour crosses the path in the opposite direction. The winding count of the point is the obtained by subtracting the second number from the first.

A more formal definition of the odd-even fill rule is as follows; if the intrinsic opacity of an object at a point P is $\alpha$, and P has a winding count of n, then point P is assigned a real opacity value of:

$\alpha$ if n is odd, 0 if n is even. Eqn. (1).

A more formal definition of the non-zero fill rule is as follows: if the intrinsic opacity of an object at a point P is $\alpha$, and P has a winding count of n, then point P is assigned a real opacity value of $\alpha$ if n is non-zero, 0 if n is zero. Eqn. (2)

1.1 Winding-counting Fill Rule

A third fill rule, called "winding-counting", has also been proposed in U.S. Pat. No. 6,084,596 by George Politis (herein incorporated by reference). Unlike the non-zero winding fill rules, in which all pixels classified as being inside the polygon are rendered with uniform colour and opacity, the winding-counting fill rule assigns an opacity value to a pixel according to its absolute winding count. More specifically, pixels with a zero winding count are classified as being outside the polygon and are not filled, and pixels with a +1 or −1 winding count are filled in the same manner as in the odd-even and non-zero winding rule.

Pixels with a winding count of n, where |n|>1, are rendered according to U.S. Pat. No. 6,084,596 by performing |n| repeated compositing operations, each time using a pixel with the colour and opacity of the polygon, For fully opaque polygons, this produces identical results to the non-zero winding fill rule. For partially transparent, complex and/or self-overlapping polygons however, the winding-counting fill rule gives the effect of the polygons being made up of several overlapping layers.

Figure 4A:
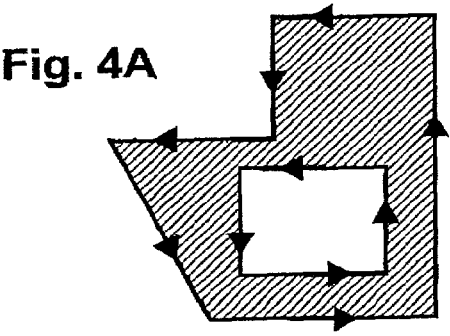
FIGS. 4A, 4B, and 4C illustrate the results of three different fill rules.
Figure 4B:
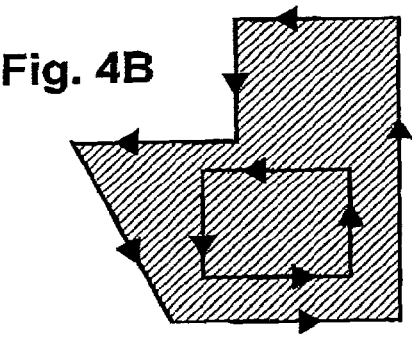
Figure 4C:
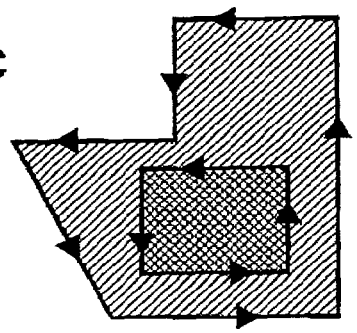

A comparison between the three fill rules is shown in FIGS. 4A, 4B, and 4C. In FIG. 4A, a partially transparent polygon is rendered using the odd-even fill rule. In FIGS. 4B and 4C, the same polygon is rendered using the non-zero winding and the winding-counting fill rules respectively. The centre region of FIG. 4C has a winding count of 2 and hence has been drawn with a higher opacity than the surrounding region.

Figure 5:
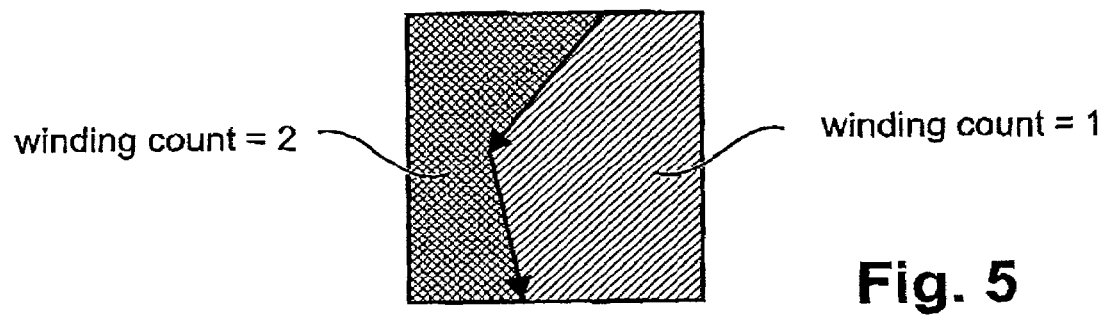
FIG. 5 illustrates a pixel comprising 2 sub-regions of different winding counts.

A short coming of the definition of the winding-counting fill rule given in U.S. Pat. No. 6,084,596 is that it does not address the issue of how polygons are rendered in anti-aliased mode. A difficulty lies in the treatment of pixel(s) that comprise subregions of different winding counts, as illustrated in FIG. 5 which shows a single pixel having 2 subregions of different winding counts.

The problem does not arise when operating in aliased mode since such pixels are always assigned a single winding count, based on certain criteria. For example, the pixel can be assigned the winding count of the point at the centre of the pixel, or the winding count of the largest region of the pixel. In any case, the pixel is then rendered by repeatedly performing a number of compositing operations equal to the absolute value of the assigned winding count.

In anti-aliased mode however, it is necessary to take into account the different regions that make up the entire pixel. Thus it is not clear how many compositing operations are to be performed to render the pixel, nor it is clear what pixel value is to be composited each time.

1.2 New Definition of the Winding-counting Fill Rule

The purpose of this section is to present a formal definition of a new winding-counting fill rule that will enable anti-aliased scan conversion methods to be used unambiguously.

Consider the case where two simple, partially transparent polygons of opacity $\alpha$ are composited together using the "over" operator as defined in the publication Porter, Thomas, and Duff, "Compositing Digital Images" SIGGRAPH 84, 1984 (herein after referred to as Porter et. al). According to the definition of this operator, when a point with opacity of $\alpha_L$ is composited "over" another point of opacity $\alpha_R$, the resulting opacity is given by:

$$\alpha_L + \alpha_R - \alpha_L\alpha_R.$$

In the present example, since the opacity of both polygons is $\alpha$, the opacity of the intersection region between the two polygons is:

$$2\alpha - \alpha^2.$$

Now consider the case where there are n overlapping polygons instead of 2. Again each polygon is partially transparent with opacity of $\alpha$. When these polygons are composited together using the "over" operator as defined in Porter et. al., it can be shown by mathematical induction that the resulting opacity of the intersection region between all n polygons is given by:

$$1-(1-\alpha)^n.$$

Since the aim of the winding-counting fill rule is to create the effect of polygons being made up of several layers in regions where the absolute winding counts are greater than 1, it is desirable that such regions are rendered with the same opacity as that would be obtained by compositing together the same number of such layers.

The winding-counting fill rule is thus defined as follows: if the intrinsic opacity of an object at a point P is $\alpha$, and P has a winding count of n, then point P is assigned a real opacity value of:

$$1-(1-\alpha)^{|n|}. \qquad \text{Eqn. (3)}$$

Under the winding-counting fill rule, objects are rendered according to their real opacities. In contrast, objects are rendered according to their intrinsic opacities under the non-zero winding fill rule.

For pixels with integral winding counts, the above definition produces identical results to that given in U.S. Pat. No. 6,084,596, The new definition however, allows objects to be rendered more efficiently, since a pixel with a winding count of n needs to be composited only once rather than |n| times as described in U.S. Pat. No. 6,084,596. Although Eqn. (3) needs to be evaluated to determine the real opacity from the winding count of the pixel, its computational cost can usually be amortised over many pixels with the same winding counts and hence will likely be insignificant. An example of how this can be achieved is as follows:

Given an object with uniform intrinsic opacity to be rendered, pre-compute the real opacities for points with absolute winding counts from 1 to m, where m is some positive integer. Store these in a look up table indexed by the absolute winding count. Then perform the scan conversion as described in U.S. Pat. No. 6,084,596, but instead of compositing a pixel whose winding count is n |n| times, do the following. If $|n| \leq m$, then look up the pre-computed table created to obtain the real opacity associated with a winding count of |n|. Otherwise compute the real opacity using Eqn. (3).

The above method takes advantage of the fact that for most cases, the maximum absolute winding count over the entire object is usually rather low, and hence the pre-computed look up table will likely cover the majority of pixels.

2A.0 First Arrangement

A method 3600 of rendering objects (FIG. 36) in accordance with a first arrangement is herein described in section 2A.0.

The aforementioned new definition (Eqn. 3) allows existing anti-aliased scan conversion techniques to be extended to support the winding-counting fill rule. For example, in multi-point sampling methods, instead of rendering each pixel based on the total number of sampling points that lie inside the polygon, each pixel is rendered based on the sum of the real opacities at all sampling points.

Figure 34:
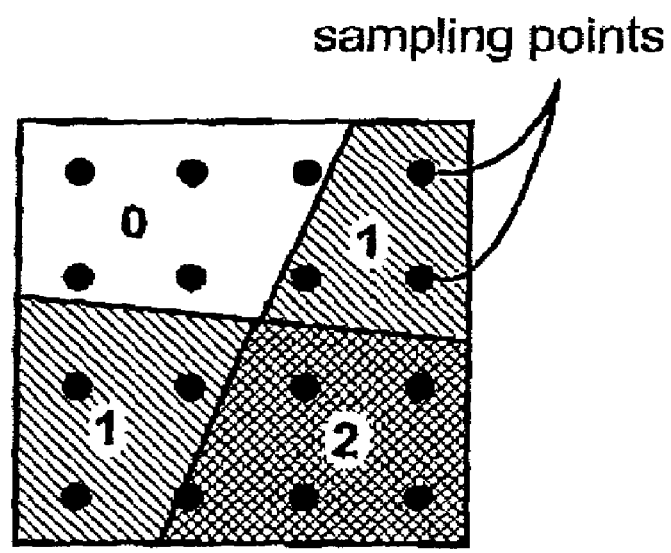
FIG. 34 illustrates the computing of real opacity of a pixel in accordance with a winding counting rule.

This is illustrated in FIG. 34, which shows a pixel comprising a 4×4 array of sampling points. In the FIG. 34, the black circles represents sampling points, whilst the numbers shown indicate the winding counts of the four subregions of the pixel. Since the real opacities associated with winding counts of 0, 1, and 2 are 0, $\alpha$, and $2\alpha - \alpha^2$ respectively, where $\alpha$ is the intrinsic opacity, the sum of the real opacities at all sampling points is:

$$6\alpha + 5(2\alpha - \alpha^2)$$

The pixel is then assigned an opacity value equal to this sum divided by the total number of sampling points.

Figure 35:
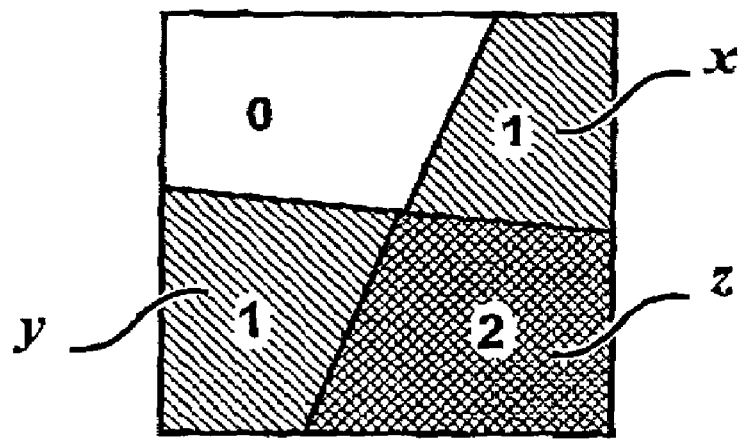
FIG. 35 illustrates the computing of real opacity of a pixel in accordance with a winding counting rule.

Anti-aliased scan conversion methods based on area sampling can be extended to support the winding-counting fill rule in a similar way. Instead of rendering each pixel according to the percentage area of the pixel that falls inside the polygon, it is rendered according to the sum of the percentage areas of the different subregions that make up the pixel, weighted by their real opacities. This is illustrated in the example shown in FIG. 35, which shows the four sub-regions of the polygon within the pixel. For the example shown in FIG. 35 this sum is computed to be:

$$\alpha(x+y) + (2\alpha - \alpha^2)z$$

where x,y are the percentage areas of the subregions whose winding count is 1, and z is the percentage area of the sub-region whose winding count is 2.

Figure 36:
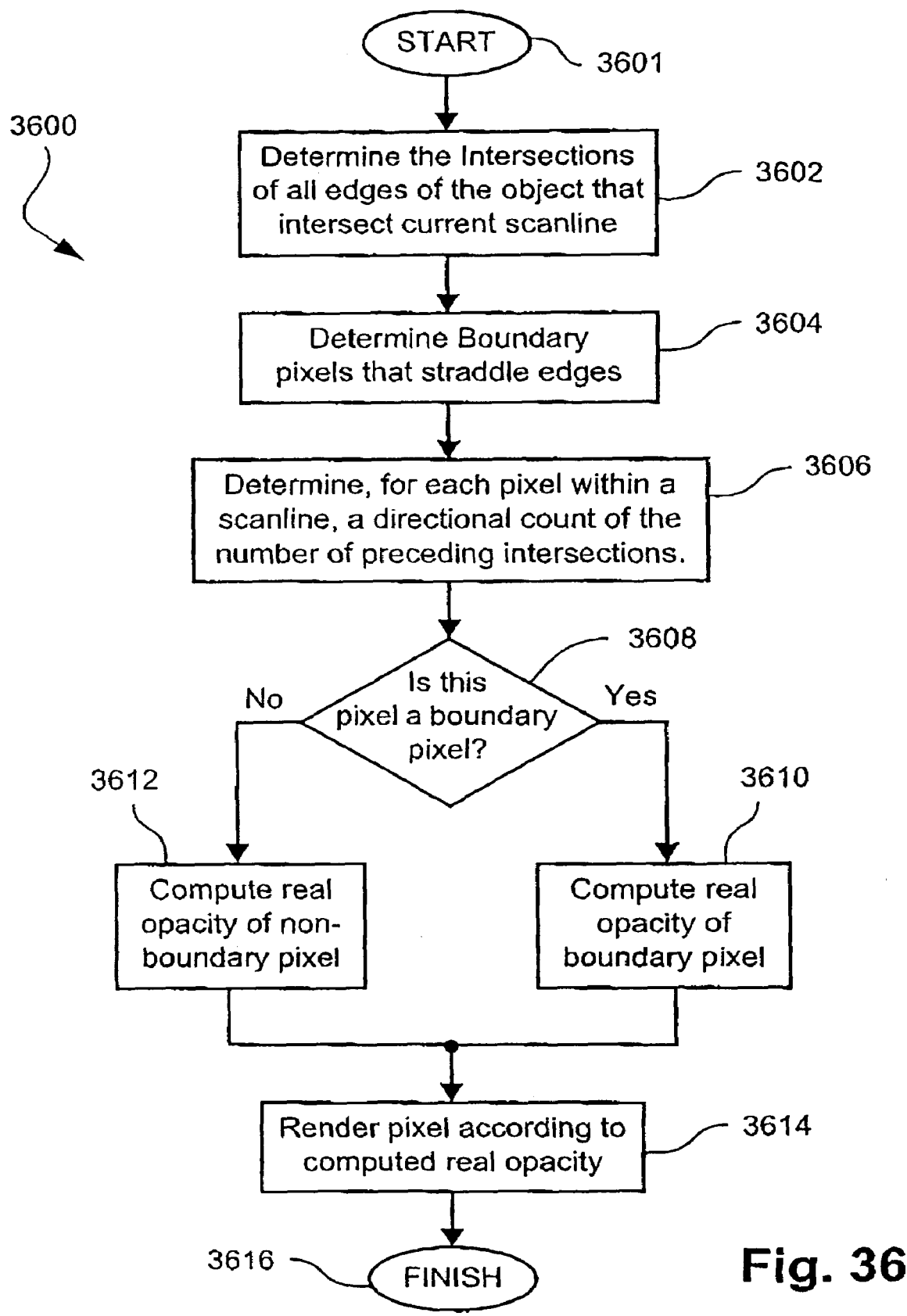
FIG. 36 is a flow chart of a method 3600 of rendering objects.

Turning now to FIG. 36, there is shown a method 3600 of rendering objects using a scanline process in accordance with a first arrangement. The method 3600 comprises the following steps performed for each one of the objects within each scanline.

The method 3600 commences at step 3601, where any necessary parameters are initialised. The method 3600 may be called by a main method for the processing of each object within each scanline. After completion of step 3601, the method 3600 continues to step 3602.

During step 3602, the method 3600 determines the intersections of all the edges of the object that intersect the current scanline. Preferably, these intersections are specified by the x co-ordinate location that the edge intersects with the top of the current scanline. Alternatively, these intersections may be specified by the x co-ordinate location that the edge intersects with the bottom or any horizontal line that runs through the current scanline. After completion of step 3602, the method 3600 proceeds to step 3604.

During step 3604, the method determines those "boundary" pixels which straddle the edges of the object within the current scanline. The intersections determined during step 3602 specify the locations within the boundary pixel where the edge of the object intersects the current scanline. Steps 3604 and 3602 may interchanged in the sequence of steps of the method or performed simultaneously together.

After completion of step 3604, the method proceeds to step 3606, where the method 3600 determines for each pixel in the current scanline a directional count of the number of edges of the object that intersect the current scanline prior to the current pixel. The directional count sums the aforementioned edges, which have a first direction and sums the aforesaid edges, which have a second direction and subtracts the first sum from the second to obtain the count. The directional count is in effect a winding count of the current pixel or a sub-region of the current pixel, depending upon whether an edge of the object intersects the previous pixel. After completion of step 3606, the method proceeds to decision block 3608.

The method 3600 scans each pixel with the current scanline and checks in decision block 3608 whether the currently scanned pixel is a boundary pixel.

If the decision block 3608 returns TRUE (YES) the method proceeds to step 3610 where the real opacity of the boundary pixel is computed. The method 3610 computes the real opacity of the boundary pixel in accordance with the technique described with reference to FIG. 34 or 35. The directional count of the previous pixel is used as a basis for determining the winding count of the different regions or sampling points within the current pixel. After completion of step 3610, the method proceeds to step 3614, On the other hand, if the decision block 3608 returns FALSE (NO) the method proceeds to step 3612 where the real opacity of the non boundary pixel is computed. The method 3610 computes the real opacity of the current pixel according to formulae (3), wherein the winding count of the current pixel is the directional count of the previous pixel.

After completion of either steps 3610 or 3612, the method 3600 renders the pixel in accordance with the computed real opacity.

2.0 Second Arrangement

A method 600 (FIG. 6) of rendering in accordance with a second arrangement is described herein in sections 2.0 to 11.0. The method 600 is capable of scan converting a self-overlapping polygon, according to any one of the odd-even, non-zero-winding, and the winding-counting fill rules in an efficient anti-aliasing manner. It is not intended that the second arrangement be limited to any particular type of fill rule As will become apparent the method 600 has general applicability to a method of rendering self-overlapping polygons. However, the method 600 is able to render not only self-overlapping polygons, but also other objects such as lines, simple polygons, and complex polygons, However, for ease of explanation, the steps of the method 600 are described primarily with reference to the rendering of simple and complex self-overlapping polygons. Furthermore, tee method 600 may also have application to the rendering of objects formed by general curves. In the latter case, these general curves are first converted to a straight-line approximation of line(s) and/or polygon(s) before processing by the rendering method 600.

Figure 6:
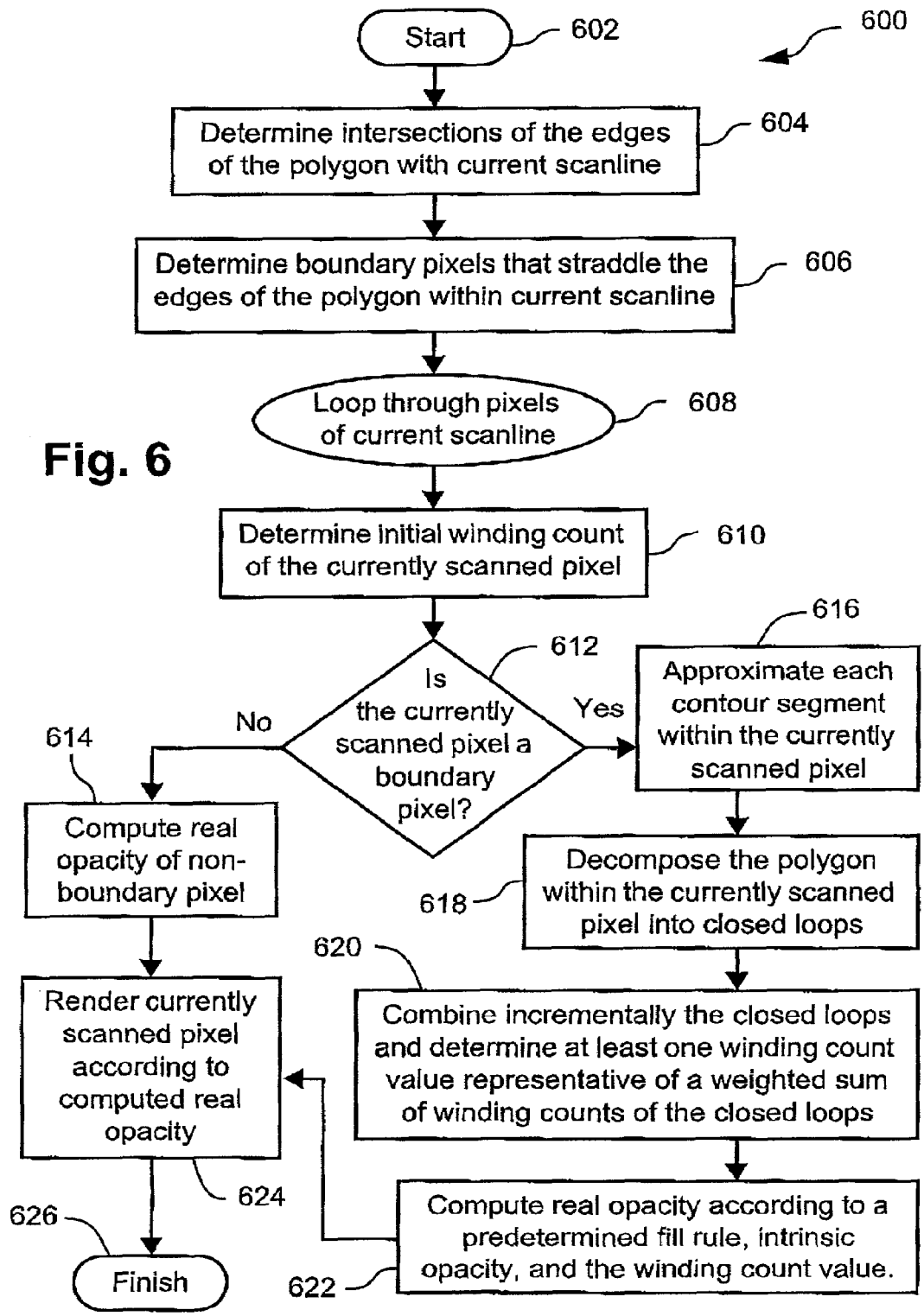
FIG. 6 is a flow chart of a method 600 of rendering a self-overlapping polygon.

Turning now to FIG. 6, there is shown a flow chart of the method 600 of rendering a self-overlapping polygon comprising one or more closed curves. The polygon is preferably represented as a list of straight-line segments each specified by the x,y co-ordinates of its starting point and endpoint; an unique number indicating to which closed curve it belongs; and a direction defining whether the straight-line segment is pointing up or down with respect to the top scanline. If the straight-line segment is horizontal, an up direction defines that the straight-line segment points to the left and a down direction defines that the straight-line segment points to the right. The x,y co-ordinate system is such that the origin is located at the top-left corner of the first pixel in the first scanline in raster scan order, and the x and y co-ordinates extending to the right and downwards to the bottom right corner of the last pixel in the last scanline in raster scanline order.

The method 600 performs the following steps for each pixel within each scanline. The method 600 commences at step 602, where any necessary parameters are initialised. The method 600 may be called by a main method for the processing of the self-overlapping polygon. After completion of step 602, the method 600 continues to step 604.

During step 604, the method 600 first determines from the aforementioned list those straight-line segments that intersect the current scanline and makes a sub-list of those straight-line segments. The method 600 then determines for each straight-line segment of the sub-list the location of the intersection of that straight-line segment with the current scanline. Preferably, these intersections are specified by the x co-ordinate locations that the line segment intersects with the top and bottom of the current scanline. After completion of step 604, the method 600 proceeds to step 606. During step 606, the method determines those "boundary" pixels that straddle the line segments of the polygon within the current scanline. It will be apparent to those skilled in the art that the number of "boundary pixels" that straddle a line segment of the polygon within the current scanline will depend on the slope of that line segment. The method determines those "boundary pixels" which straddle the line segments from the intersection locations determined during step 604.

After completion of step 606, the method 600 proceeds to a loop 608 comprising steps 610 through to 624. The loop 608 scans and processes the pixels of a current scanline, one at a time in raster order, commencing with the leftmost pixel in the current scanline and finishing with the rightmost pixel in the current scanline (or vice versa). The steps 610 through to 624 are performed on each scanned pixel within the current scanline. Prior to the processing of each currently scanned pixel by the loop 608, the loop 608 generates a further sub-list, hereinafter called the current sub-list, from the aforementioned sub-list. This current sub-list comprises only those straight-line segments that intersect the currently scanned pixel of the current scanline. Preferably each of these straight-line segments in the current sub-list are specified by their location of its starting point and endpoints within or on the boundary of the currently scanned pixel. These locations are preferably specified by a new x,y co-ordinate system such that the origin is located at the top-left corner of the currently scanned pixel, and the x and y co-ordinates extending to the right and downwards to the bottom right corner of the currently scanned pixel. For example see FIGS. 13A to 15C. These straight-line segments of the current sub-list are also specified by a direction defining whether the straight-line segment is pointing up or down and an unique number indicating which closed curve they belong in similar fashion as described above.

The steps 610 through to 624 of the loop will now be described for one currently scanned pixel.

During step 610, the method 600 determines for a currently scanned pixel in the current scanline a directional count of the number of line segments of the polygon that intersect the top of the current scanline prior to the current pixel. The directional count sums the aforementioned line segments, which have a first direction and sums the aforesaid line segments, which have a second direction and subtracts the first sum from the second to obtain the count. Preferably, the directional count is determined with reference to the top left corner of a current pixel. This directional count is called the initial winding count of the current pixel. It will be apparent, if only one line segment intersects the current pixel at the top of the current scanline, then the initial winding count of the next pixel in the scanline will differ from the initial winding count of the current pixel by one. Preferably, the initial winding count of a currently scanned pixel is determined in a iterative manner from the initial winding count of the previously scanned pixel and the number of line segments and their directions that intersect the previously scanned pixel that was determined during the previous pass of the loop. After completion of step 610, the method proceeds to decision block 612.

The decision block 612 checks whether the currently scanned pixel is a boundary pixel. If the decision block 612 returns FALSE (NO) the method 600 proceeds to step 614 where the real opacity of the non-boundary pixel is computed. Preferably, the method 600 utilizes the winding-counting fill rule and computes the real opacity of the current pixel during step 614 according to Eqn. (3) described above, wherein the winding count used is the initial winding count of the current pixel.

In a further variation, the method 600 utilizes the odd-even fill rule and the real opacity of the current pixel during step 614 is assigned a value in accordance with Eqn. (1) described above, wherein the winding count used is the initial winding count of the current pixel. In a still further variation, the method 600 utilizes the non-zero fill rule and the real opacity of the current pixel during step 614 is assigned a value in accordance with Eqn. (2), wherein again the winding count used is the initial winding count of the current pixel, On the other hand, if the decision block 612 returns TRUE (YES), the method preferably proceeds to step 616. In step 616 each contour of the polygon within the currently scanned pixel (viz contour segment) is approximated with one or more straight-line segments joining the entry and exit points on the boundary of the current pixel. Specifically, the method 600 approximates the straight-line segments of the current sub-list and updates the current sub-list with these approximated straight-line segments. The manner in which the contour segment(s) are approximated is described below in more detail in the section "4.0 Straight line Approximation of Contour Segments".

After completion of step 616, the method 600 then proceeds to step 618, where that portion of the polygon within the currently scanned pixel is decomposed into a number of individual closed loops comprising those contour segments that lie within the currently scanned segment. These individual closed loops are either clockwise or counterclockwise closed loops and consist of either one or two contour segments. These individual closed loops are created in such a manner that when the individual closed loops are combined, the winding counts and area of the regions of the combined closed loops within the currently scanned pixel are approximately equivalent to the winding counts and areas of the regions of the polygon within the currently scanned pixel. The method 600 performs this task utilizing the information from the current updated sub-list. The theory behind the decomposition of a polygon is described below in more detail in the section "3.0 Polygon Decomposition".

The method 600 during this decomposition process 618 creates these individual closed loops from regions defined by one or two contour segments respectively, At the same time the method determines the directions of the individual closed loops and their area values. The method 600 creates an individual closed loop comprising two contour segments by destructively combining two regions defining the respective two contour segments. The method 600 creates an individual closed loop comprising one contour segment from the region defining that contour segment. In the latter case, the area value of the closed loop is the area value of the region defining the contour segment. Specifically, a region defining a contour segment is that region on one side of the contour segment bounded by the contour segment and the boundary of the pixel. In this sense two such regions define a contour segment. The method, when creating an individual closed loop from two contour segments, uses those two regions residing on those sides of the contour segments that result in the constituent region when those two regions are combined destructively. Similarly the method, when forming a single closed loop defined by one contour segment, uses that region R residing on that side of the contour segment which is equivalent to the constituent region, The manner in which a closed loop is formed from two contour segments is described in more detail in the "7.0 Combining Regions", "7.1 Mask Creation" and "7.2 Mask Operations". The area value of an individual closed loop comprising two contour segments is determined from the respective area values defined by the two contour segments. In turn, the area value(s) defining each contour segment is determined utilizing the techniques described in Section "5.0 Coverage Area of a Region defined by a Single Contour Segment".

In another variation of the method, the line segments are not approximated and area values defined by each contour segment are directly calculated. As will be apparent from the aforementioned sections, the size of any region contained within a pixel is expressed as the ratio of the area of the region within the pixel to the total pixel area, which total pixel area is taken as being one square unit. For the purposes of this specification, the term area value(s) is taken to mean such ratio(s), unless otherwise expressed or implied to the contrary.

After completion of step 618, the method 600 then proceeds to step 620, where the method 600 combines incrementally the individual closed loops and determines at least one winding count value representative of a weighted average of the winding counts of the closed loops.

Preferably, the method 600 during this step 620 combines incrementally the clockwise and counterclockwise closed loops separately to produce two combined regions respectively. Namely, the clockwise closed loops are combined incrementally to produce a first combined region, and the counterclockwise closed loops are combined incrementally to produce a second combined region. During this step 620, the method also preferably determines in an incremental manner a first winding count value representative of a weighted average of the winding counts of the combined clockwise loops. In a similar fashion, step 620 also preferably determines in an incremental manner a second winding count value representative of a weighted average of the winding counts of the combined counterclockwise loops. In this particular arrangement, each of these two winding count values is determined by summing the area values of the closed loops having the same winding count sign. As it will become apparent from the description below, it is possible that two or more closed loops having the same winding count sign will intersect. In these circumstances, the summing operation of the areas will result in the area of the intersecting region contributing to the winding count value two or more times depending upon the number of closed loops that form the intersection region. The number of times a particular area of a closed loop contributes to the total area is the winding count within that area In this way, the winding count value is effectively a weighted average of the winding counts, where the weighting coefficients are the area values of those regions having those winding counts respectively.

Also during this step 620, area values of these two combined regions are calculated. One of these two area values is a measurement of the area of those closed loops within the currently scanned pixel having positive winding counts. The other of the two area values is a measurement of the area of those closed loops within the currently scanned pixel having negative winding counts. As mentioned above, it is possible that two or more regions of the closed loops having the same winding count sign will intersect. As distinct from the winding counts, the area of any intersecting region contributes only once to the area values, as these two area values are strictly representative of the area of the closed loops having positive and negative winding counts respectively.

The method in step 620 lastly combines the two combined regions, namely the combined clockwise closed loops and the combined counterclockwise closed loops. As will be described in more detail latter, those areas of intersection occurring between the two regions will combine destructively. The method first computes an absolute weighted average winding count for each of the two regions by dividing their corresponding weighted average winding counts by the total area value of the corresponding region. An absolute weighted average winding count of these intersection regions is then set to the absolute value of the difference between the absolute weighted average winding count of the two regions.

The theory behind computing these winding count values and area values is described below in more detail in the sections "6.0 Weighted Average Winding Count Approximation". "8.0 Merging a Constituent Region into an Accumulator" and "8.1 Merging Regions of the Clockwise and Counterclockwise Accumulators".

After completion of step 620, the method 600 then proceeds to step 622, where the method 600 determines the real opacity of the currently scanned pixel according to a predetermined fill rule and using an intrinsic opacity of the polygon, and the at least one winding count value determined during step 620. As mentioned above, the method in step 620 preferably computes the absolute weighted average winding counts for the two combined regions and the absolute weighted average winding count for the intersection of those two regions, The method 600 preferably determines 622 the real opacity of the currently scanned pixel according to a predetermined fill rule and using as parameters; the intrinsic opacity of the polygons the absolute weighted average winding counts of the two combined regions and the absolute weighted average winding count of the intersection of the two combined regions, the area value of the intersection of the two combined regions, and the area values of the two combined regions both excluding the area of the intersection. The predetermined fill rule used is preferably the winding counting fill rule, but the odd-even fill mule or non-zero fill rule may alternatively be used. The manner in which the real opacity is computed is described in more detail below in section "9.0 Computing the Real Opacity of a Boundary Pixel".

After completion of steps 614 and 622, the method 600 then renders the currently scanned pixel in accordance with the computed real opacity. The method 600 then proceeds to the next pixel within the scanline for processing. If there are no more remaining pixels within the scanline to be processed, the method 600 terminates and returns to the main method.

For ease of explanation, the method 600 has been described above as performing the steps 618 and 620 in sequence. However, the method 600 preferably performs these steps 618 and 620 together in an incremental manner. The method for performing steps 618 to 622 is described in more detail below in the section "10.0 The Rendering Method 600 in more Detail". A variation of the preferred rendering method for performing steps 618 to 622 is described in Section 11.0.

Although the method 600 presented above is capable of operating under any fill rule, it is possible to implement a further variation of the method that takes advantage of the special properties of the odd-even fill rule. The method, in this variation, determines dung step 620 a winding count value representative of a weighted average of winding counts and areas of the closed loops. In this variation of the method 600, the winding count for each closed loop is taken as one (1) irrespective of its associated direction. Also, the areas of odd winding counts will contribute only once to the total of the winding count value for the purposes of its contribution to the overall opacity, whereas the areas of even winding counts will not contribute at all in accordance with the odd-even fill rule. Furthermore, according to this variation of the method 600, the weighted average of the winding counts is effectively equal to the area value of the combined closed loops. The real opacity of the currently scanned pixel is then computed during step 622 as being representative of the product of the intrinsic opacity of the polygon and the area value of the combined closed loops. This variation of the method is described in more detail below in the section "11.0 Variation of the Rendering Method 600 in More Detail".

The aforementioned rendering methods work by decomposes the coverage area of a polygon within each pixel into separate constituent regions, which constituent regions are simple regions whose winding counts and pixel coverage areas can be easily computed. The constituent regions are then combined together to obtain a weighted average of the winding counts and area values of the self-overlapping polygon in a relatively efficient and accurate manner.

The method is preferably based on area sampling and is free from the defects of multi-point sampling associated with thin edges. It also overcomes the computational complexity suffered by conventional area sampling methods by computing approximate (rather than exact) area values.

The rendering method also takes advantage of the fact that under most circumstances, the computation of the pixel coverage areas need not be very accurate at all. This is evidently shown by the existence of multi-point sampling anti-aliasing techniques. These techniques are essentially approximate forms of area sampling, where the pixel coverage areas are approximated by the number of sampling points that fall inside the polygon being scan converted.

The defects of multi-point sampling techniques however highlight circumstances where accurate area computation is necessary—when scan converting thin lines. This is because the coverage area per pixel of thin lines is very small, and hence any small absolute variation in the computed area values would equate to a large percentage variation. If these variations occur over the length of a line, then it will appear to the viewer to have non-uniform thickness.

As a result of the above observations, the rendering method has also been designed so that accurate area calculations are made when encountering pixels intersected by lines and similarly simple objects, whilst not affording the same level of accuracy to pixels intersected by more complicated edge combinations. This allows the rendering methods to achieve a similar level of efficiency to multi-point sampling techniques, but without their inherent defects.

3.0 Polygon Decomposition

Figure 7:
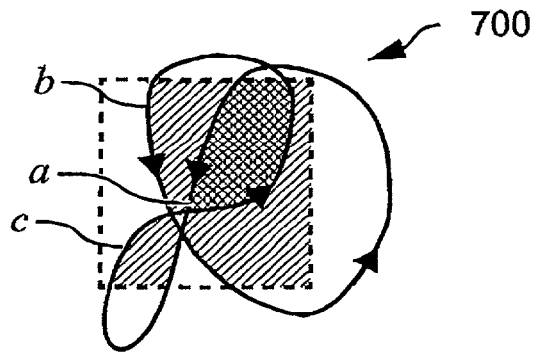
FIG. 7 illustrates a polygon rendered using the winding counting rule.

Turning now to FIG. 7, there is illustrated a polygon 700 to be rendered using the winding counting rule. The dotted box represents the boundary of a pixel whose opacity value is to be determined by the method 600. An arrow indicates the direction of the line segment of the polygon. The polygon is partially transparent with an intrinsic opacity of α. In the following and all subsequent discussions in this document, the area of each pixel will be assumed to be 1, without loss of generality.

For the purposes of this description, each length of the polygon from the point where the line segment of the polygon enters to the point where it leaves the pixel is referred to as a contour segment. In the above example, there are three contour segments a, b and c.

The winding counts, for any given polygon, at all points within a particular pixel (and hence how the polygon is filled) is completely determined by the set of contour segments that reside fully inside the pixel boundary, and the initial winding count at a single reference point on the pixel boundary. Outside of the pixel boundary, the behaviour of the polygon is irrelevant as far as the pixel is concerned. This means that the interconnections between contour segments outside of the pixel can be rearranged ill any manner without affecting the final outcome of the winding counts within the pixel, as long as it does not alter the winding count of the reference point. The method 600 decomposes the polygon into a number of simple closed loops, which may be then processed in turn.

Figure 8:
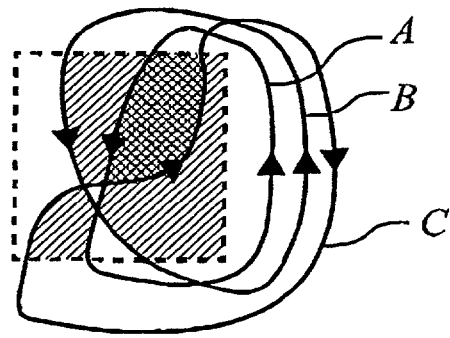
FIG. 8 illustrates a polygon equivalent to that shown in FIG. 7.

Turning now to FIG. 8, there is shown an equivalent polygon to FIG. 7 in which each contour segment forms a closed loop. In this polygon, the exit and entry points of each contour segment are connected to form a closed loop. The pixel region defined by each closed loop is referred to as a constituent region.

Figure 9:
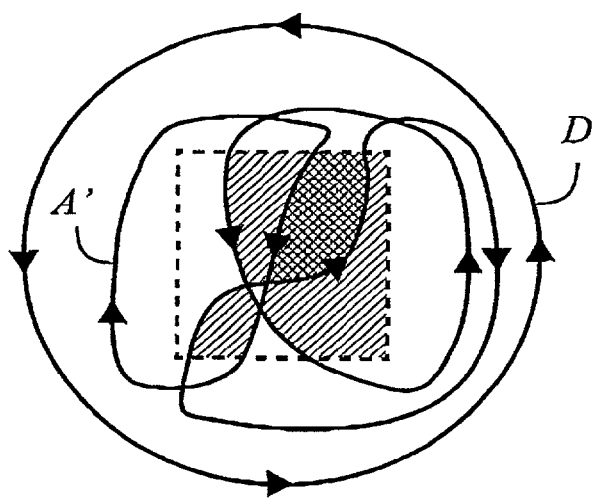
FIG. 9 illustrates another polygon equivalent to that shown in FIG. 7.

Depending on the initial winding count of the given reference point, and on how the reconnection of contour segments is performed, it may be necessary to introduce additional circular loops that enclose the whole pixel to ensure that the winding count of the reference point remains unchanged. For example, if the loop labelled A in the above FIG. 8 is formed on the left hand side of the pixel rather than the right, then an additional counter-clockwise loop D as shown in FIG. 9 is needed. In this way, the loops of FIG. 9 produces an equivalent polygon to FIG. 7 since the combination of loops A' and D is equivalent to a single loop A shown earlier.

Although the two polygons shown are theoretically equivalent, in practice they may give rise to different pixel coverage values due to the use of approximation techniques to be described later. Since approximations may be introduced whenever constituent regions are combined, polygons comprising fewer loops are usually more desirable as this generally implies fewer chances of errors.

As a result, it is preferable to combine certain contour segments together to reduce the number of loops and hence further improve accuracy. Naturally, overly complicated loops whose coverage areas are difficult to compute should be avoided since they would defeat the purpose of polygon decomposition.

Figure 10:
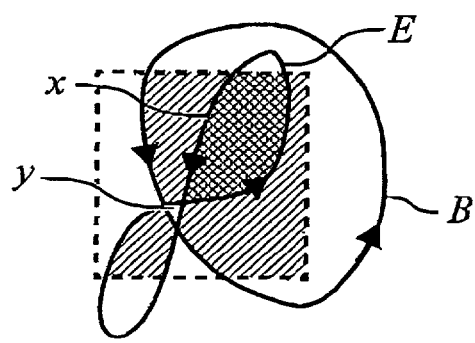
FIG. 10 illustrates another polygon equivalent to that shown in FIG. 7.

Turning now to FIG. 10, there is shown the preferred manner of connecting contour segments to form the closed loops. Preferably, pairs of contour segments of opposing direction are connected to form a closed loop having a single constituent region. Loop E has been formed by connecting together the contour segments a and c of FIG. 7. Contour segment B that remains after the pairing is joined with itself to form simple closed loops as before. The manner in which these closed loops are formed is described in more detail below in Sections 10.0 and 10.2

Having decomposed the polygon into a number of closed loops having constituent regions, the winding count of any point inside the pixel can simply be determined by counting the number of clockwise loops that enclose it, and subtracting the number of enclosing counter-clockwise loops (or vice-versa since the sign of the winding count is not important). Note that loops that are self-intersecting may enclose parts of the pixel in one direction, whilst enclosing other parts in the opposite direction. For example, the upper part of loop E in FIG. 10, above its self-intersecting point describes a counter-clockwise loop, whereas the lower part describes a clockwise loop.

If two constituent regions are then merged, what happens at the intersection area is dependent on the relative directions of the enclosing closed loops. If the constituent regions are enclosed by loops of the same direction, then the absolute winding count of the intersection region increases, whereas if the constituent regions are of opposite directions, then the absolute winding count decreases. In the former, the two constituent regions are said to combine constructively, whereas in the latter, they are said to combine destructively. The situation is slightly more complicated when one or both constituent regions are self-intersecting, in which case parts of the intersection area may combine constructively, whilst other parts may combine destructively. For example, in FIG. 10, the intersection area between the constituent regions defined by E and B comprises of the subregions x and y. The regions combine constructively in x but destructively in y.

From the areas of the two constituent regions, and the areas of the different intersecting subregions, it is possible to compute the overall opacity of the pixel. In the example of FIG. 10, let the areas of the two constituent regions be denoted by e and b, then the overall opacity under the winding-counting fill rule can be computed as $$\alpha(e-x-y)+\alpha(b-x-Y)+x(2\alpha-\alpha^2)=\alpha(e+b-2y)-\alpha^2 x$$

Where α is the intrinsic opacity of the polygon.

Under the non-zero winding fill rule, the opacity of the constructively combined intersecting region x is α instead of $(2\alpha-\alpha^2)$, and hence the overall opacity of the pixel is given by $$\alpha(e-x-y)+\alpha(b-x-y)+x\alpha=\alpha(e+b-2y-x)$$

Under the odd-even fill rule on the other hand, the opacity of the region denoted by x is 0, and hence the overall pixel opacity becomes $$\alpha(e-x-y)+\alpha(b-x-y)=\alpha(e+b-2y-2x)$$

Although it is theoretically possible to derive similar equations for computing the opacity values of pixels comprising of three or more constituent regions, the resulting complexity would make it impractical. The method 600 overcomes this problem by incrementally combining the closed loops by merging a new closed loop together with the previously combined loops at each increment. The method 600 further reduces the computational complexity by approximating the areas of the loops and any intersection areas between constituent regions of the closed loops.

4.0 Straight Line Approximation of Contour Segments

Since computing the areas of regions defined by arbitrary contour segments is time consuming, the method 600 approximates during step 616 the contour segments of the polygon. During this step 616, the method 600 replaces each contour segment in the currently scanned pixel by two straight-line segments joining the points at which the contour segment enters and leaves a pixel, and a third point which is the average of all vertices of the contour within the pixel. Contour segments that are already straight-line segments joining the entry and exit points remain unaltered, and contours that lie completely inside the pixel boundary are discarded. Specifically, the method 600 approximates the straight-line segments of the current sub-list and updates the current sub-list with these approximated straight-line segments.

Turning now to FIGS. 11A to 11D, there is illustrate the process 616 of approximating contour segments of a polygon with straight lines. In each of the first two examples (FIGS. 11A and 11B), the contour segment enters the pixel at A, exits at B, and contains two vertices $(x_1, y_1)$ and $(x_2, y_2)$. It is approximated by line segments joining A, point $$\left(\frac{x_1 + x_2}{2}, \frac{y_1 + y_2}{2}\right)$$

being the average of $(x_1, y_1)$ and $(x_2, y_2)$, and B. In the third example (FIG. 11C), no approximation is needed as it it already a straight line. In the fourth example (FIG. 11D), a polygon that lies entirely within the pixel is approximated to zero.

Figure 11A:
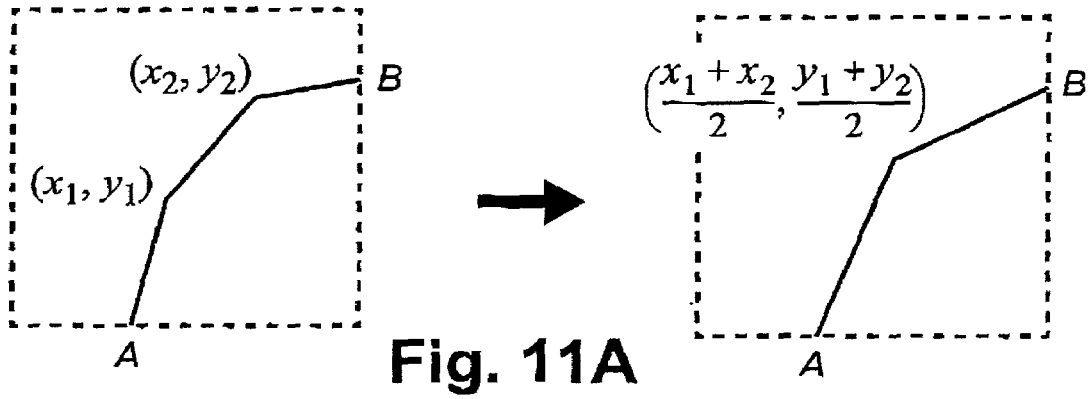
FIGS. 11A to 11D illustrates a process of approximating contour segments of a polygon with straight lines.
Figure 11B:
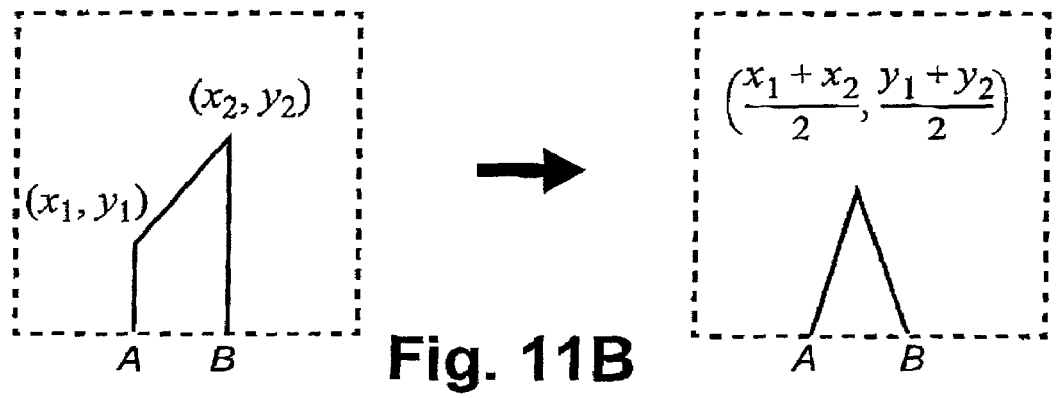
Figure 11C:
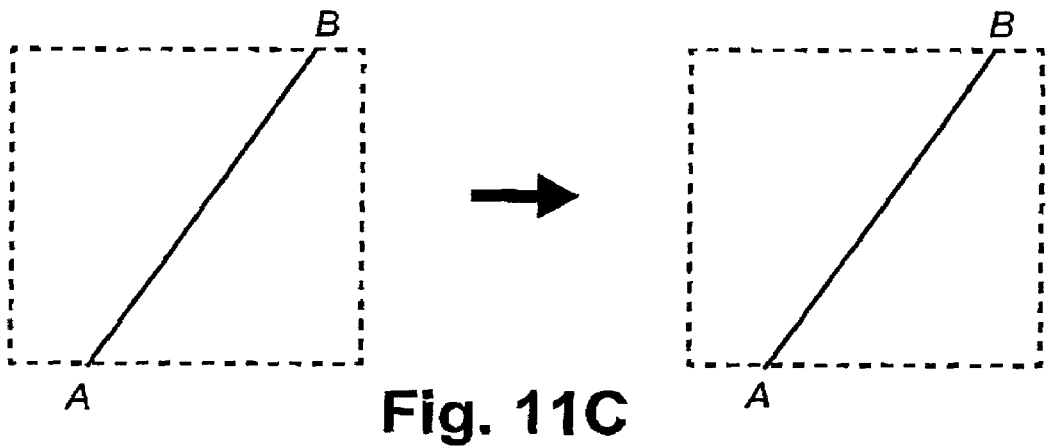
Figure 11D:
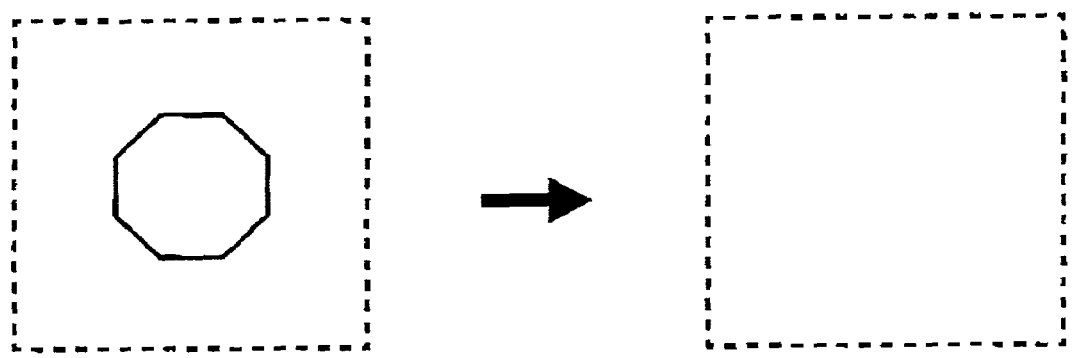
Figure 12A:
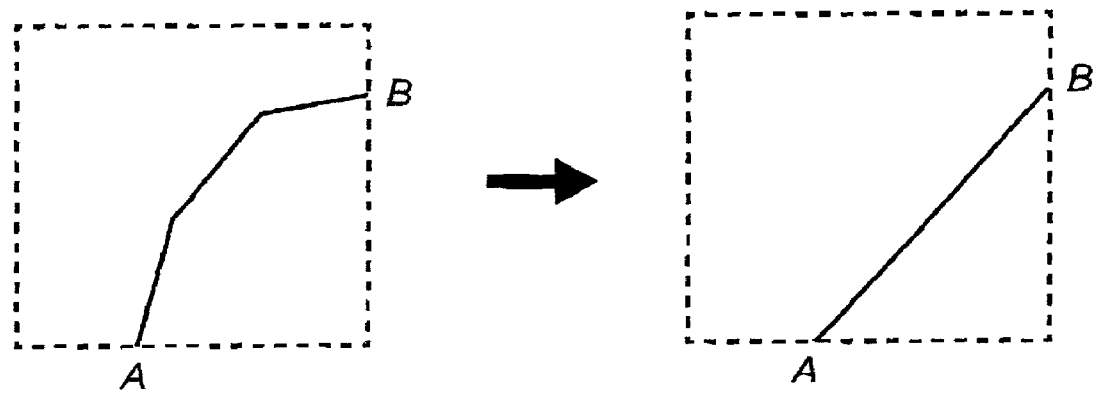
FIGS. 12A and 12B illustrates another process of approximating contour segments of a polygon with straight lines.
Figure 12B:
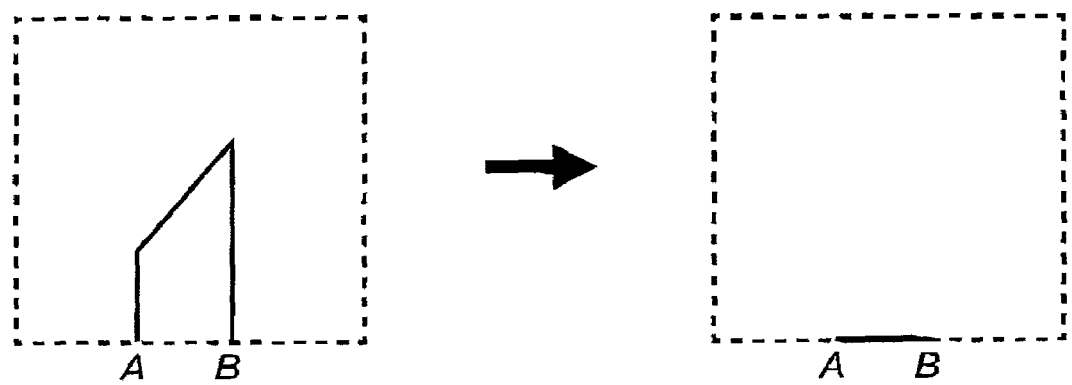

In an alternative approximation scheme, each contour segment is replaced by a single straight-line segment joining the entry and exit points, without passing through an intervening third point as in the preceding scheme. The scheme is illustrated in FIGS. 12A and 12B, which shows a simpler approximation scheme in which each contour segment is replaced by a straight-line segment. Contour segments that are already straight-line segments joining the entry and exit points, and those that lie completely inside die pixel boundary are treated in the same way as in the preceding scheme (FIGS. 11C and 11D).

The latter scheme produces a faster method since area computations are simpler, but at the expense of degradation in accuracy. Whilst the loss of accuracy should not be significant under most situations, it can lead to undesirable artefacts where a contour segment enters and leaves on the same side of a pixel. Replacing such a contour segment with a single straight line would effectively remove it completely. This may produce 1-pixel gaps at the joint of connected edges.

Preferably, the method 600 utilizes the approximation scheme described in relation to FIGS. 11A to 11D. By virtual of the fact that the set of possible straight line approximations produced by the simpler scheme is a subset of that produced by the earlier scheme, all discussions will hence be applicable to the simpler scheme.

To avoid the above problem without significantly sacrificing speed, a mixture of both schemes can also be used. For example, the earlier scheme can be used for approximating contour segments that enter and leave on the same side of a pixel, whereas the simpler scheme can be used for all remaining contours. The method 600 are flexible enough to incorporate an arbitrary mixture of both schemes.

For the purposes of this description, unless otherwise stated, the term "contour segment" will be used to refer to the straight-line approximation of a contour segment, rather than the contour segment itself.

5.0 Coverage Area of a Region Defined by a Single Contour Segment

Turning now to FIGS. 13A to 16, there is illustrated all possible regions R "defining" the contour segments within a pixel that can arise together with the formulae for computing their corresponding areas. Regions that are complementary to those shown have been omitted since these areas can be easily obtained from the latter by noting that the total area of a pixel is 1.

The method 600 estimates during step 620 the area values of these regions R defined by the contour segments of the currently scanned pixel for determining the area values of the single closed loops. The method determines these area values utilizing the information contained in the current sub-list for the currently scanned pixel.

Figure 15A:
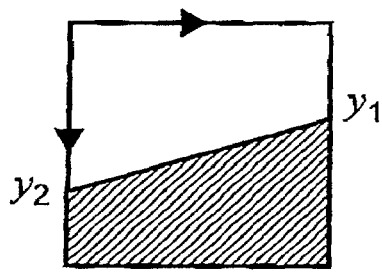
FIGS. 15A to 15C illustrates a set of possible contour segments that intersect the left pixel boundary but not the top or bottom boundary.
Figure 15B:
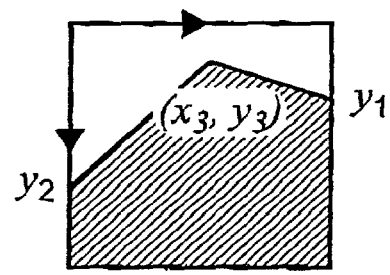
Figure 15C:
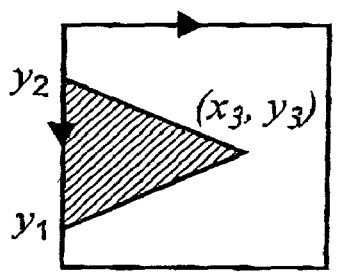
Figure 16:
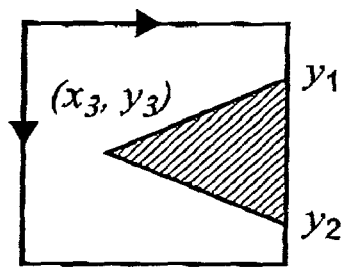
FIG. 16 illustrates a set of possible contour segments that intersect the right pixel boundary only.

With the preferred straight-line approximation scheme, the area of the region R defined by a single contour segment can be easily computed. For convenience and clarity, the list of possible cases has been divided into 4 sets. FIGS. 13A to 13G shows cases in which the contour segment intersects the top pixel boundary FIGS. 14A to 14E shows cases in which the contour segment intersects the bottom pixel boundary but not the top. Cases in which the contour segment intersects the left pixel boundary but not the top nor the bottom are shown in FIGS. 15A to 15C, and the remaining case where the contour segment intersects the right pixel boundary only is shown in FIG. 16.

The formulae shown assume that origin is located at the top-left corner of the pixel, and that the x and y axes extend to the right and downwards respectively and have values between 0 to 1.

6.0 Weighted Average Winding Count

As mentioned in Section "3.0 Polygon Decomposition", that given a polygon comprising a number of constituent regions, the winding count at any point can be determined by computing the difference between the number of clockwise and counter-clockwise loops that enclose it. As also mentioned, the method 600 combine an arbitrary number of constituent regions together in an incremental manner. This may be accomplished by making use of an "accumulator" to which the effect on the winding counts due to each constituent region is added in turn.

Ideally, the accumulator needs to maintain the winding counts of all points inside the pixel, which has been found to be computationally intensive. It is thus preferable that the method 600 make the following approximation: the pixel is divided into two sub-regions, one containing points with zero winding counts, and the other containing points with non-zero winding counts. The latter is then approximated by assigning it a weighted average winding count, which is the average of the winding counts of all points in the latter sub-region weighted according to their respective area values.

This approximation scheme requires the storage of just two numbers in the accumulator: the area of the latter sub-region (herein referred to as the coverage area) and its weighted average winding count. It is actually more convenient to store the product of the area and the weighted average winding count, called the percentage winding count, rather than the weighted average winding count itself. From these parameters, overall opacity of the pixel can be determined.

Figure 17:
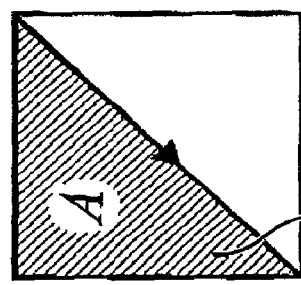
FIG. 17 illustrates a pixel having two complementary sub-regions.
Figure 17:
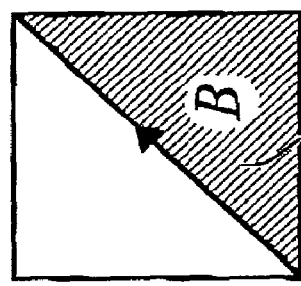
Figure 17:
Figure 17:
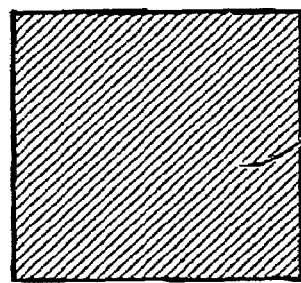

A drawback of the approximation scheme is that poor results are obtained when constituent regions whose winding counts have opposite signs are combined. As an example, reference is made to FIG. 17 involving two complementary constituent regions A and B of opposite winding counts. A has a winding count of 1 whilst B has a winding count of −1. In order to achieve an accurate result, the two regions should combine to produce an overall opacity of α, the intrinsic opacity of the polygon. If the combination of the two regions were approximated by a single weighted average winding count however, the resulting opacity of the pixel would be 0. The problem arises because even though the two constituent regions have opposite winding counts, they both contribute positively to the overall opacity of the pixel.

The above problem is remedied in the method 600 by maintaining two separate accumulators rather than one for each pixel. The first accumulator computes the combination of constituent regions or their sub-regions with positive winding counts, whilst the second computes the effects of regions or sub-regions with negative winding counts. When all constituent regions have been processed, the absolute values of the two accumulators are combined in a final step to obtain the overall opacity of the pixel. Since the weighted average winding count approximation is not required in this final step (the purpose of the approximation is to simplify the processing of intermediate results), the problem illustrated m the above example does not arise.

7.0 Combining Regions

As mentioned previously, the method 600 preferably connects pairs of contour segments of opposing directions to form a single closed loop having a single constituent region. As these contour segments have opposing directions, then the regions "defining" these two contour segments will combine destructively. The method 600 then combines constructively the constituent regions of those single closed loops having the same direction in two separate accumulators. Finally, the method 600 then destructively combines the resultant regions in the separate accumulators. As mentioned previously, it is possible to implement a further variation of the method 600 that takes advantage of the special properties of the odd-even fill rule. In this variation, the regions are always combined in a destructive manner as will be described latter.

The preferred techniques for combining the aforementioned regions in either a constructive or destructive manner are described in this section 7.0 and the next sections 7.1 to 7.2.

When two regions are to be combined constructively, the coverage area of the resulting region can be determined using the formula:

$$x+y-z$$

Figure 18:
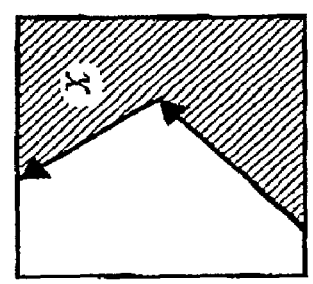
FIG. 18 illustrates the constructive combination of two regions of a pixel.
Figure 18:
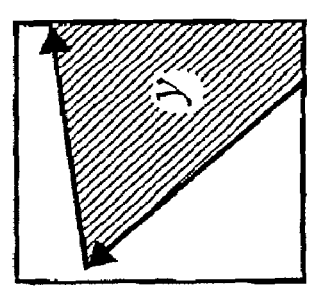
Figure 18:
Figure 18:
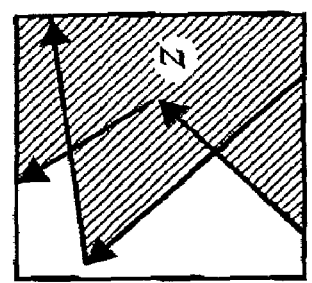

As illustrated in FIG. 18, where x and y are the total coverage areas of the two regions respectively, and z is the area of their intersection.

Similarly, when two regions combine destructively, the coverage area of the resulting region is given by $$x+y-2z$$

Figure 19:
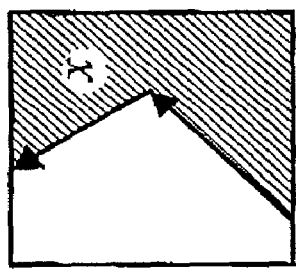
FIG. 19 illustrates the destructive combination of two regions of a pixel.
Figure 19:
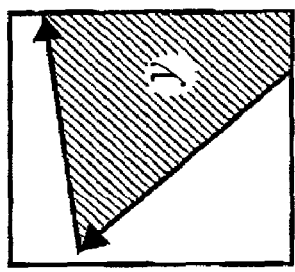
Figure 19:
Figure 19:
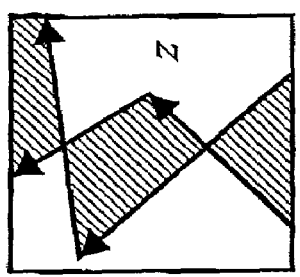

As illustrated in FIG. 19, where again x and y are the total coverage areas of the two regions respectively, and z is the area of their intersection.

Unless it is known that the two regions are mutually exclusive, or that one region is subsumed by the other, computing their exact intersection area is computationally expensive. This is true even when contour segments have been approximated by straight lines as described in Section 4.0 To overcome this problem, the method 600 approximate the intersection area by the product of the areas of the individual regions. This is essentially the same underlying assumption behind the operation of the compositing operators described in Porter and Duff "Compositing Digital Images", SIGGRAPH 84, 1984. Using this approximation, the coverage area produced by the constructive combination of two regions becomes $$x+y-xy \qquad \text{Eqn. (4)}$$

and that produced by the destructive combination of the two regions becomes $$x+y-2xy- \qquad \text{Eqn. (5)}$$

It is worth noting that if x and y are within the range [0, 1], then the coverage areas produced by both Eqns (4) and (5) are also within the range [0, 1].

Although the above approximation works adequately well in most cases, it is inaccurate in situations where the two regions involved do not or hardly intersect one another, or where one region fully or almost subsumes the other. In the former, the true intersection area is close to zero, whereas in the latter it is close to either x or y.

Experimental results suggest that the errors arising from the use of Eqn. (4) are sufficiently small to be not significantly noticeable. This is not necessarily the case for Eqn. (5) however. Due to the presence of the factor of 2, errors that arise from the approximation are effectively doubled, which can be significant.

To overcome the problem, it is necessary to maintain geometrical information about each region in addition to its coverage area. Since execution speed is a priority, the method 600 only makes minimal use of this information. When two regions are combined, the geometrical information is used not to directly estimate the intersection area, but simply to distinguish between three different scenarios: (i) the two regions are mutually exclusive, (ii) one region is subsumed by the other, and (iii) otherwise. In case (i), the intersection area is zero, whereas in (ii), it is the area of the subsumed region. In the remaining case (iii) the intersection area is approximated by the product of the two regions as described earlier.

An advantage of this method is that it requires only very crude geometrical information about each constituent region. Preferably, this geometrical information concerning each constituent region is maintained in the form of a binary mask.

7.1 Mask Creation

Figure 20:
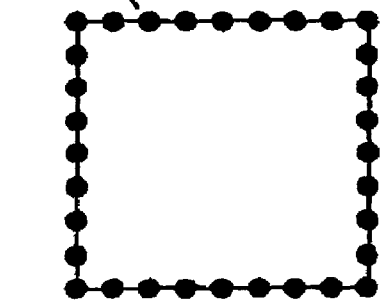
FIG. 20 illustrates an 8×8 grid sampling mask.
Figure 20:
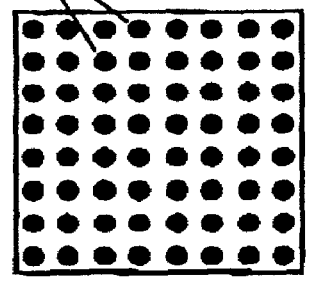

As mentioned earlier, the method preferably maintains geometrical information concerning each region defined by a contour segment. The geometrical information can be in the form of a binary mask where each bit indicates whether a certain sample point within the given pixel is inside or outside of the region that the mask represents. FIG. 20 shows a mask in the form of an 8×8 grid of sample points, which requires a total of 64 bits. Smaller or larger masks can also be used, however, masks smaller than 4×4 are likely to be too crude, whereas masks of size substantially above 8×8 will be too large to be efficiently manipulated.

Figure 21:
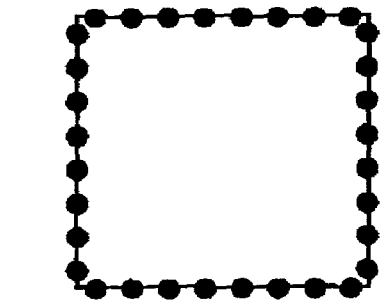
FIG. 21 illustrates a number of masks with sampling points on the pixel boundary.

The sampling points in the mask need not follow the regular grid shown in FIG. 20. They can instead be arranged in any suitable structure. They also need not be located inside the pixel boundary. In fact, a possible choice of location for the sampling points is on the pixel boundary, as shown in FIG. 21. The advantage of this scheme over the earlier scheme employing a regular grid is that it requires fewer sampling points, and hence smaller masks, to produce approximately the same resolving power. For example, a mask comprising of 8 sampling points along each side of the pixel boundary can be represented as a 32 bit integer, and thus can be stored in a single register on a 32-bit machine. This allows the masks to be manipulated very quickly.

The binary mask associated with each region defined by a single contour segment can be created by means of look up tables. In the simpler scheme where sampling points reside on the pixel boundary only, the mask is dependent only on the locations where the contour segment enters and leaves the pixel boundary. In other schemes that contain sampling points inside the pixel boundary, the mask is dependent not only on the locations of the entry and exit points, but also on the x and y coordinates of the intermediate vertex (if any) of the contour segment. Procedures for creating the necessary look up tables are not described since they should be familiar to those skilled in the art.

7.2 Mask Operations

When two regions are combined, the binary mask of the resulting region can be obtained by performing an appropriate logical operation between the masks of the individual regions. If the regions combine constructively, then a logical OR operation is performed. If they combine destructively, then the resulting mask can be computed as the exclusive-OR of the two individual masks.

However in the method 600, since the destructive combination of two regions can give rise to both clockwise and counter-clockwise subregions, as illustrated in FIG. 10, it is necessary to separate these so that each subregion can be combined into the accumulator of the same direction. This requires two separate masks to be computed, one for each subregion. Let $m_x$ and $m_y$ denote the masks of the two regions. The masks of the resulting clockwise and counter-clockwise subregions are then given by $$m_x - m_x \text{ AND } m_y,$$

and $$m_y - m_x \text{ AND } m_y.$$

where the operator AND denotes a logical AND operation,

The coverage area of each subregion are also easily computed using the formulae $$x-z$$

and $$y-z$$

where x, y and z are as defined earlier. It should be noted that the area value of these two sub-regions when combined is equal to x+y−2xy (See Eqn. (3)).

To determine whether two constituent regions intersect, and if so, whether one region is subsumed by the other, a logical AND operation is performed between the masks of the individual regions. If the result is zero, then the two regions do not intersect. If the result is identical to one of the original mask, then the corresponding region is subsumed by the other.

8.0 Merging a Constituent Region into the Accumulators

This section describes the procedure for merging a constituent region into a corresponding one of the two accumulators. It assumes that the constituent region being merged has a winding count whose absolute value is 1, and whose sign is identical to that of the accumulator in which it is to be merged. Consequently, the two regions are combined constructively.

Let $\alpha$, $m_\alpha$ and $p_\alpha$ denote the coverage area of the accumulator, its binary mask and percentage winding count respectively. Let A, and B denote the coverage area of the constituent region to be merged and its binary mask respectively. Since winding count of the constituent region is 1, its percentage winding count is also A.

Let z denote the area of the intersection region between the accumulator and the constituent region. As a result of the merge, the pixel may be divided into 3 subregions comprising of a subregion of area α−z and winding count $p_\alpha/\alpha$, subregion of area A−z and winding count 1, and the intersection region of area and winding count $p_\alpha/\alpha+1$.

The resulting percentage winding count is then given by:

$$(a-z)\frac{Pa}{a} + (A-z) + z\left(\frac{Pa}{a} + 1\right) = Pa + A$$

Which is simply the suns of the percentage winding counts of the two regions being combined. The percentage winding count of the accumulator is thus updated with this value:

$$p_\alpha \leftarrow p_\alpha + A.$$

As mentioned previously, the method 600 incrementally combines all the single closed loops of the same direction into the respective accumulators. Consequently, the final percentage winding count of an accumulator is the sum of the percentage winding counts, that is area values, of all the single closed loops having the respective same directions. This summing operation of the area values will result in any area value of any intersecting regions contributing to the sum two or more times depending upon the number of closed loops that forms the intersection region. The number of times a particular area of a closed loop contributes to the sum is the winding count within that area. In this way, the percentage winding Count is effectively a weighted average of the winding counts, where the weighting coefficients are the area values of those regions having those winding counts respectively.

Computation of the coverage area of the combined region is dependent on how the two regions intersect one another, which is in turn dictated by the interaction between the two binary masks $m_\alpha$ and B. This is summarised in Table 1 below.

TABLE 1

Combined coverage area of two regions.

| $m_\alpha$ AND B | α' |
|---|---|
| 0 | α + A |
| $m_\alpha$ | A |
| B | α |
| Otherwise | α + A(1 − α) |

The new coverage area denoted by α' then replaces the original coverage area of the accumulator:

$$\alpha \leftarrow \alpha'.$$

In a simpler variation of the present method, the intersection area between the constituent region and the accumulator is approximated by the product Aα, regardless of the values of $m_\alpha$ and B. The coverage area of the accumulator is thus updated according to $$\alpha \leftarrow \alpha + A(1-\alpha).$$

Finally, the binary mask of the accumulator is updated according to $$m_\alpha \leftarrow m_\alpha \text{ OR } B.$$

As mentioned above, it is possible that two or more regions of the closed loops having the same winding count sign will intersect. As distinct from the winding counts, the area of any intersecting region contributes only once to the area value of the coverage area, as this area value is strictly representative of the area of the closed loops.

8.1 Merging Regions of the Clockwise and Counterclockwise Accumulators

After all the clockwise and counterclockwise single closed loops have been merged into the respective clockwise and counterclockwise accumulators, the method 600 merges these two accumulators together and converts the weighted average winding count of each resulting subregion into opacity values to obtain the final overall opacity of the pixel. Since the accumulators represent region of opposing clockwise and counter-clockwise directions, their combination is destructive.

The method 600 divides the percentage winding count of each accumulator by its coverage area to obtain the weighted average winding count. Let these be denoted by $w_+$ and $w_-$ for the clockwise and counter-clockwise accumulators respectively. Depending on how the coverage areas of the accumulators intersect, their combination can produce up to 3 subregions having winding counts $w_+$, $w_-$, and $w_+-w_-$ (as well as a subregion of zero winding count).

The coverage area of each of these subregions is determined by the coverage areas currently, denoted by $\alpha_+$ and $\alpha_-$, and their respective binary masks stored in the two accumulators, denoted by $m_+$ and $m_-$, in accordance with Table 2.

TABLE 2

Coverage area of each resulting subregion under different intersecting conditions.

| Condition | $s_+$ | $s_-$ | $s_+ - s_-$ |
|---|---|---|---|
| $m_+$ AND $m_- = 0$ | $\alpha_+$ | $\alpha_-$ | 0 |
| $(m_+$ AND $m_- = m_+)$ and $(\alpha_- \geq \alpha_+)$ | 0 | $\alpha_- - \alpha_+$ | $\alpha_+$ |
| $(m_+$ AND $m_- = m_-)$ and $(\alpha_+ \geq \alpha_-)$ | $\alpha_+ - \alpha_-$ | 0 | $\alpha_-$ |
| Otherwise | $\alpha_+(1-\alpha_-)$ | $\alpha_-(1-a_+)$ | $\alpha_+\alpha_-$ |

Namely, the clockwise accumulator is designated as storing a weighted average winding count $w_+=a_+$ and binary mask $m_+$ representing the combined clockwise single closed loops and the counterclockwise accumulator is designated as storing a weighted average winding count $w_-=a_-$ and binary mask $m_-$ representing the combined counterclockwise single closed loops. The method firstly determines the winding count value $(w_+-w_-)$ and then determines the coverage area values $s_+$, $s_-$, and $s_{-+}$ associated with the respective winding count values $w_+$, $w_-$, and $(w_+-w_-)$ of the respective three sub-regions depending upon the aforementioned conditions. For example, if the condition $(m_+$ AND $m_-=m_+)$ and $(\alpha_- \geq \alpha_+)$ holds TRUE, then the coverage area values for the three subregions are computed as $s_+=0$, $s\_32\ a_- -a_+$, and $s_{-+}=a_+$. The method 600 then utilises the winding count values $w_+$, $w_-$, and $(w_+-w_-)$ and area values $s_+$, $s_-$, and $s_{-+}$ of the three subregions for determining the real opacity of the pixel. The manner in which this is achieved is described in more detail in the next section "9.0 Computing the Real Opacity of the Pixel".

9.0 Computing the Real Opacity of the Pixel

The opacity of each of these subregions $s_+$, $s_-$ and $s_{-+}$ is a function of its winding count and the fill rule being used. Due to the weighted average winding count approximation, the winding count of each subregion may not necessarily be an integral number. The fill rules specified in equations (1), (2) and (3) are preferably modified to take into account these non-integral winding count values.

One possibility for the winding-counting fill rule is to extend Eqn. (3) which relates absolute winding counts to real opacities to accept non-integral winding counts. The drawback of this approach is that it does not produce satisfactory results when the intrinsic opacity of the polygon is one (i.e. the polygon is fully opaque). In these cases, Eqn. (3) returns a value of 1 regardless of how small the absolute winding count is.

The method 600 thus adopts the following approach: each absolute winding count n is broken up into an integral part $\lfloor n \rfloor$, being the largest integer less than or equal to n, and the remaining fractional part $m=n-\lfloor n \rfloor$, $m \in [0, 1)$. n is then assigned a real opacity value equivalent to that obtained when an object of winding count n is composited over another object of opacity $m\alpha$. From the definition of the over compositing operator given in Porter, Thomas, and Duff, "compositing Digital Images", SIGGRAPH 84, 1984, the relationship between absolute winding counts and real opacity values is then:

$$\text{opacity}=f(n)=m\alpha+(1-(1-\alpha)^{\lfloor n \rfloor})(1-m\alpha) \qquad \text{Eqn. 6}$$

under the winding-counting fill rule. It is worthwhile noting that as $m \to 0$ and $m \to 1$, the above equation approaches the intuitive opacity values of $1-(1-\alpha)^n$ and $1-(1-\alpha)^{n+1}$ respectively.

Under the non-zero winding fill rule, opacity values are preferably capped at the intrinsic opacity, thus giving rise to the following equation:

$$\text{opacity}=f(n)=\begin{cases} n\alpha & n \leq 1 \\ \alpha & n > 1 \end{cases} = \alpha\min(1,n) \qquad \text{Eqn. (7)}$$

which is equivalent to a cap of the winding count at the maximum value of 1.

The winding count under the odd-even fill rule on the other hand, is "bounced" back and forth between the maximum and minimum values of 1 and 0 respectively. That is, if $\lfloor n \rfloor$ is even, then the "effective winding count" is given by $n-\lfloor n \rfloor$. When $\lfloor n \rfloor$ is odd, it is $1-(n-\lfloor n \rfloor)$. The opacity value is then computed as the product of the effective winding count and the intrinsic opacity, giving rise to the equation:

$$\text{opacity}=f(n)=\begin{cases} (n-\lfloor n \rfloor)\alpha & \lfloor n \rfloor \text{ even} \\ (1-n+\lfloor n \rfloor)\alpha & \lfloor n \rfloor \text{ odd} \end{cases} \qquad \text{Eqn. (8)}$$

Notice again that the above equation produces the expected opacity value when n is a pure integer number.

As described in section 8.1, merging the contents of the clockwise and counterclockwise accumulators can create upto three sub-regions of different winding counts, namely $w_+$, $w_{-1}$, $|w_+-w_{31}|$. Having computed the areas of these sub-regions, denoted by $s_+$, $s_-$, and $s_{+-}$ respectively (see table 2), there are a number of possible methods for determining the overall real opacity of the pixel as will now be described.

In the first method, the overall real opacity of the currently scanned pixel is computed as the weighted average of the real opacities of the different sub-regions, weighted by their coverage areas. This overall real opacity is obtained using the following formulae:

$$\text{Overall Opacity} = s_+ f(|w_+|) + s_- f(|w_-|) + s_{-+} f(|w_+ - w_-|), \quad \text{Eqn. (9)}$$

where f( ) is any one of the opacity functions specified in Eqns. (6), (7) or (8).

In an alternative method, the overall opacity of the pixel is computed by computing first the average absolute winding count of the three sub-regions as well as the empty sub-region of the pixel, and then converting it into a overall real opacity value. This overall real opacity is obtained using the following formulae;

$$\text{Overall Opacity} = f(s_+|w_+| + s_-|w_-| + s_{-+}|w_+ - w_-|), \quad \text{Eqn. (10)}$$

where f( ) is any one of the opacity functions specified in Eqns. (6), (7) or (8).

In another alternative method, the overall opacity of the pixel is computed by first computing the average absolute winding count of the three non-empty subregions and then converting it into a real opacity value. In this case, the overall real opacity value is obtained using the following formulae:

$$\text{Overall Opacity} = f((s_+|w_+| + s_-|w_-| + s_{-+}|w_+ - w_-|)/(s_+ + s_- + s_{-+}))(s_+ + s_- + s_{-+}) \quad \text{Eqn. (11)}$$

where f( ) is any one of the opacity functions specified in Eqns (6), (7) or (8).

After the overall opacity of the pixel has been computed, the method 600 then renders the pixel in accordance with his overall opacity.

10.0 The Rendering Method 600 in More Detail

This section describes in more detail the steps 618 through to 622 of the method 600 of rendering the self-overlapping polygon.

As stated in Section 3 "Polygon Decomposition", the winding counts at all points within a given pixel is fully determined by the set of contour segments appearing in the pixel, and the winding count of a single reference point on the pixel boundary (assuming that all contours that reside completely within the pixel have been removed by the straight line approximation scheme described in Section 4.0). Let this reference point be denoted by S, and let its winding count be W. Also, without loss of generality, let the winding counts be measured such that points enclosed by clockwise loops are given positive winding counts and points enclosed by counter-clockwise loops are given negative winding counts.

Figure 26A:
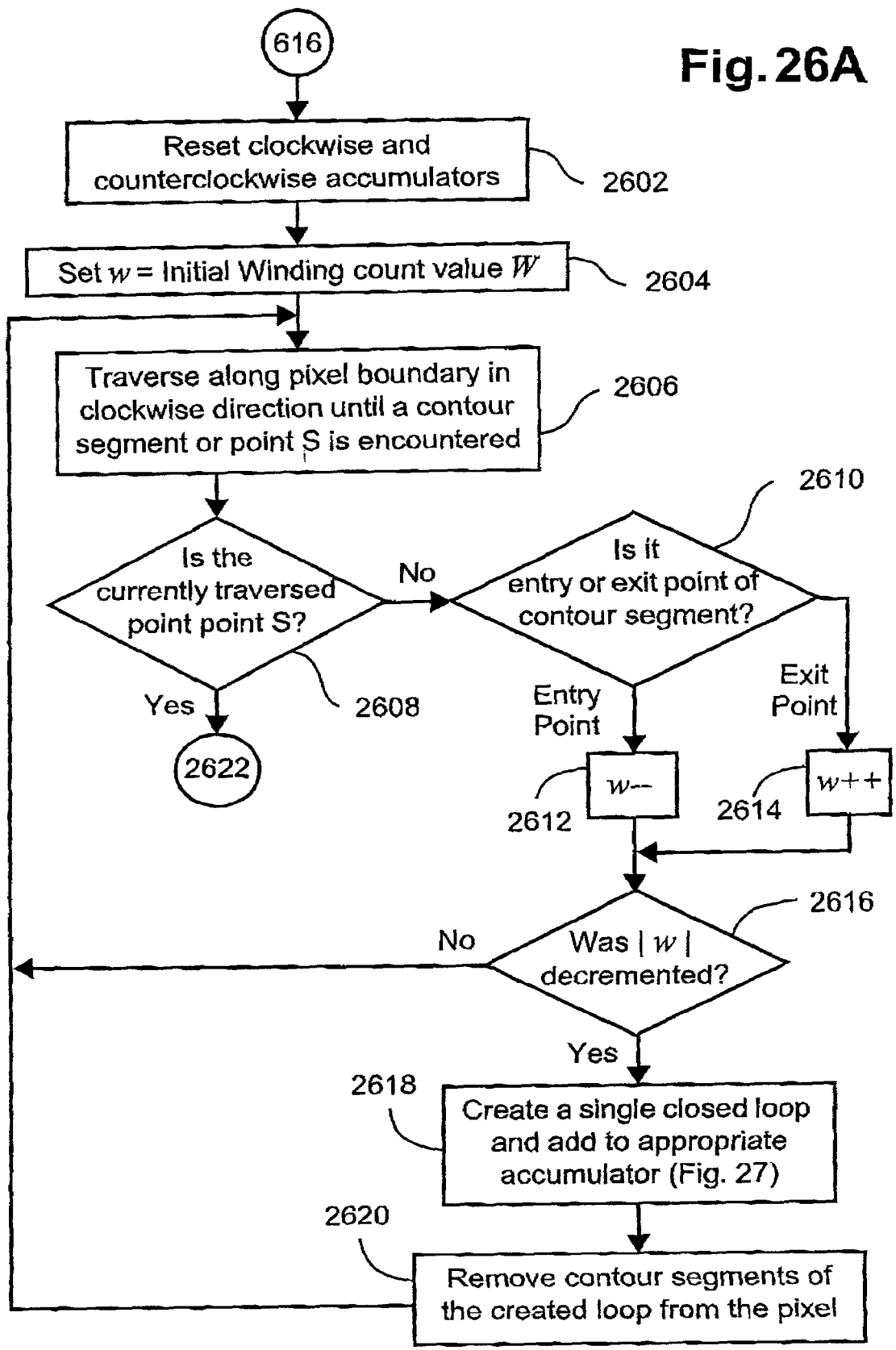
FIGS. 26A and 26B is a flow chart of steps 618 to 622 of FIG. 6 in accordance with the method 600 shown in more detail.
Figure 26B:
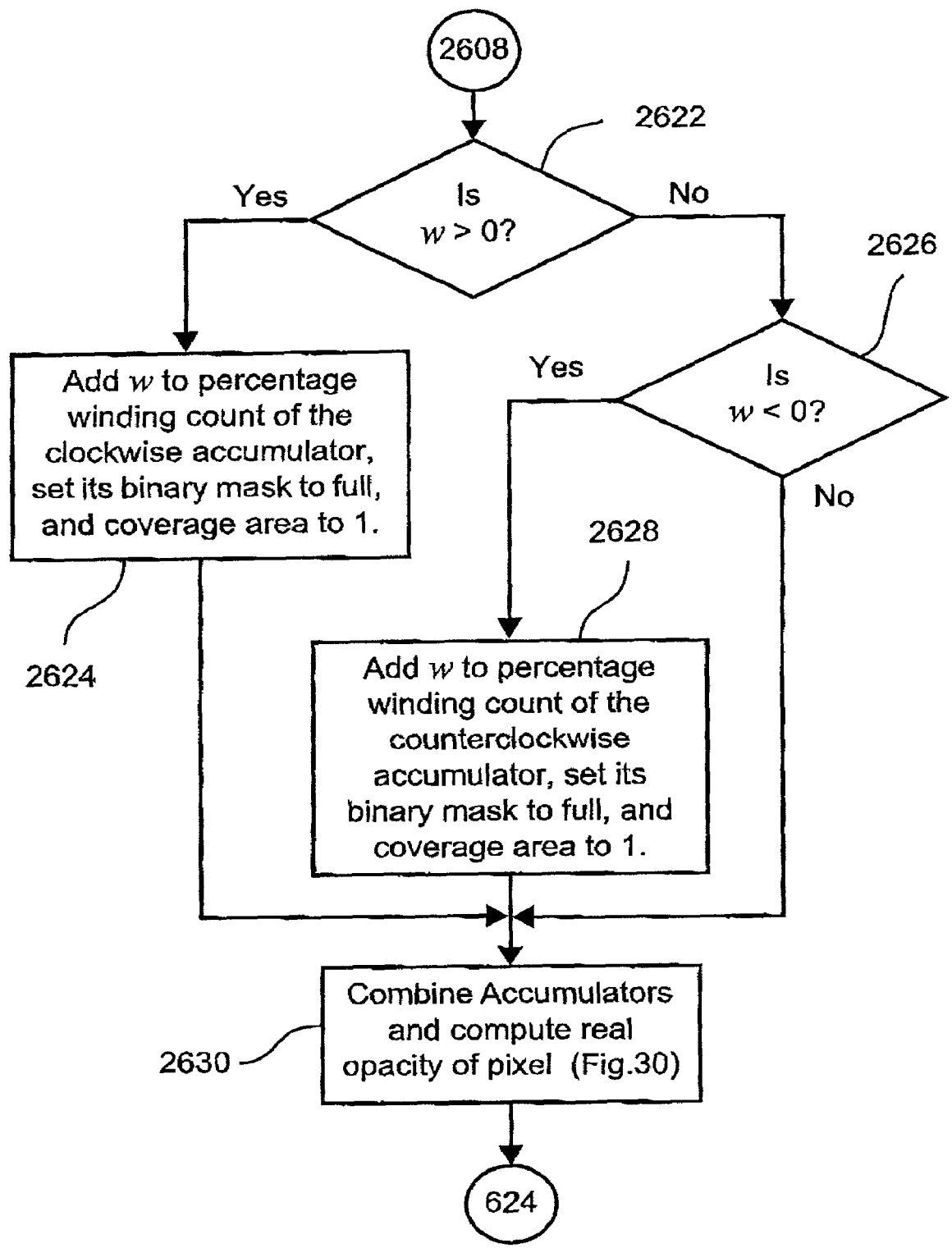

Turning now to FIGS. 26A and 26B, there is shown in more detail a flow chart of steps 618 to 622 of FIG. 6 in accordance with the method 600. After each contour segment within the currently scanned pixel has been approximated 616, the method 600 proceeds to step 2602. The method 600 during step 2602 resets to zero the percentage winding count and coverage area values in both the clockwise and counterclockwise accumulators. The method 600 also sets the binary masks associated with respective clockwise and counterclockwise accumulators to zero. The method 600 then proceeds to step 2604, where a variable w is set to the initial winding count W of the starting point S.

After completion of step 2604, the method 600 proceeds to step 2606, where the method 600 traverses along the boundary of the currently scanned pixel in a clockwise direction from point S until an entry or exit point of a contour segment or the point S is at last encountered. The traversal is such that the point S is first encountered when the method has traversed right around the boundary of the pixel. The entry point of a contour segment is that point on the pixel boundary where the contour segment enters the currently scanned pixel with reference to the associated direction of the contour segment. The exit point of a contour segment is that point on the pixel boundary where the contour segment exits the currently scanned pixel with reference to the associated direction of the contour segment. Namely, the associated direction of the contour segment at the entry point points inside the pixel and the associated direction of the contour segment at the exit point points outside the pixel.

For ease of explanation, the method 600 is described in terms of traversing the boundary of the currently scanned pixel and visiting entry and exit points of contour segments and the initial point S, processing these contour segments in turn, and the subsequent removal of contour segment(s) from the currently scanned pixel. In practice, the method 600 does not physically traverse the boundary of the currently scanned pixel and remove these contour segments. Rather, the method 600 preferably generates an indexed list of these entry and exit points of the contour segments together with the initial point S and then processes these points in sorted order and flags those contour segments in the list as being removed and/or traversed when required. Preferably, each entry and exit point of this list is assigned a value representing the distance from the starting point S to the entry or exit point measured around the pixel boundary in the clockwise direction. The list is sorted in accordance with this value. Each entry and exit point of the list is also assigned a unique number indicating the contour segment to which it belongs. In the case where an entry or exit point is located at the starting point S, then the aforementioned value is assigned a small non-zero value in order to distinguish it from the starting point S. This indexed list may be generated from the current sub-list of straight-line segments for the currently scanned pixel.

The method 600 performs the following operations 2608 to 2620 on each traversed point of the currently scanned pixel. The method will now be described with respect to a currently traversed point. For further ease of explanation, the first traversed point immediately prior to the currently traversed point that has not been removed is referred to herein as the previous traversed point. The contour segment that has as one of its end points the currently traversed point is referred to herein as the current contour segment. The contour segment that has as one of its end points the previous traversed point is referred to herein as the previous contour segment.

After the method 600, reaches an entry or exit point of a contour segment or point S, the method proceeds to decision block 2608, where a check is made whether the currently traversed point is point S. If the decision block 2608 returns TRUE (Yes), the method 600 proceeds to decision block 2622. This branch of the decision block 2608, is concerned with the final processing of the currently scanned pixel and will be discussed later in the description. On the other hand, if the decision block 2608 returns FALSE (No), the method 600 proceeds to decision block 2610. The latter branch of the decision block 2608 is concerned with the earlier processing stages of the currently scanned pixel, and now will be described.

The decision block 2610 checks whether the currently traversed point is an exit or an entry point of a contour segment. If the decision block 2610 determines that the currently traversed point is an entry point, the method 600 proceeds to step 2612, where the variable w is decremented by one. On the other hand, if the decision block 2610 determines that the currently traversed point is an exit point the method 600 proceeds to step 2614, where the variable w is incremented by one.

After completion of steps 2612 or 2614, the method 600 proceeds to decision block 2616, The decision block 2616 makes a check whether the absolute value of the current value of the variable w was decreased as a result of steps 2612 or 2614. If the decision block 2616 returns FALSE (No), then the method 600 returns to step 2606, where the method 600 traverses to the next exit point, entry point, or if there are no more exit or entry points to point S. The method 600 then processes this new point in the same fashion as described above.

On the other hand, if the decision block 2616 returns TRUE (Yes), then the method 600 proceeds to step 2618. During step 2618, the method 600 creates a single closed loop from one or two contour segments and updates the appropriate clockwise or counterclockwise accumulator. The manner in which this step 2618 performs these tasks will be described later in more detail with reference to FIG. 27. After the completion of the step 2618, the method 600 then proceeds to step 2620.

The method 600 during step 2620 removes those contour segments from the pixel that make up the single closed loop created during step 2618. As mentioned previously, these contour segments are not physically removed from the currently scanned pixel, but rather the method 600 flags those contour segments in the indexed list as being removed. After completion of the step 2620, the method 600 returns to step 2606, where the method 600 traverses to the next exit point, entry point, or if there are no more exit or entry points to point S. The method 600 then processes this new point in the same fashion as described above.

As mentioned earlier, if the decision block 2608 returns TRUE (Yes), that is the currently traversed point is point S, the method 600 then proceeds to decision block 2622, where the method 600 commences the final processing of the currently scanned pixel.

During decision block 2622, the method 600 checks whether the currently updated variable w is greater than zero. If the decision block 2622 determines that the currently updated variable w is greater than zero, the method 600 proceeds to step 2624.

A positive non-zero value of w indicates that, in addition to the contour segments that have been processed and whose resulting constituent region, have been added to the accumulators, the currently scanned pixel is also fully enclosed by |w| clockwise loops. The contribution of these loops will need to be added to the clockwise accumulator to obtain the true average winding count of the pixel.

The method during step 2624, then adds the currently updated variable w to the percentage winding count of the clockwise accumulator, sets the associated binary mask of the clockwise accumulator to full indicating that the region associated with the clockwise accumulator covers the entire area of the currently scanned pixel, and sets the area value of the clockwise accumulator to one. After completion of step 2624, the method 600 proceeds to step 2630.

On the other hand if the decision blocks 2622 and 2626 determine that the currently updated variable w is less than zero, the method 600 proceeds to step 2628.

A negative non-zero value of w indicates that, in addition to the contour segments that have been processed and whose resulting constituent regions have been added to the accumulators, the currently scanned pixel is also fully enclosed by |w| counterclockwise loops. The contribution of these loops will need to be added to the counterclockwise accumulator to obtain the true average winding count of the pixel.

The method during step 2628, then adds the currently updated variable w to the percentage winding count of the counterclockwise accumulator, sets the associated binary mask of the counterclockwise accumulator to full indicating that the region associated with the counterclockwise accumulator covers the entire area of the currently scanned pixel, and sets the area value of the counterclockwise accumulator to one. After completion of step 2628, the method 600 proceeds to step 2630.

On the other hand if the decision blocks 2622 and 2622 determine that the currently updated variable w is equal to zero, then the method 600 proceeds directly to step 2630.

During step 2630, the method 600 combines the clockwise and counterclockwise accumulators and computes the real opacity of the currently scanned pixel. The manner in which the method 600 performs these tasks will be described later with reference to FIG. 30. After completion of this step 2630, the method 600 then proceeds to step 624, where the currently scanned pixel is rendered in accordance with the real opacity computed during step 2630. After completion of step 624, the method 600 then proceeds to the next pixel within the scanline for processing. If there are no more remaining pixels within the scanline to be processed, the method 600 terminates and returns to the main method.

Figure 27:
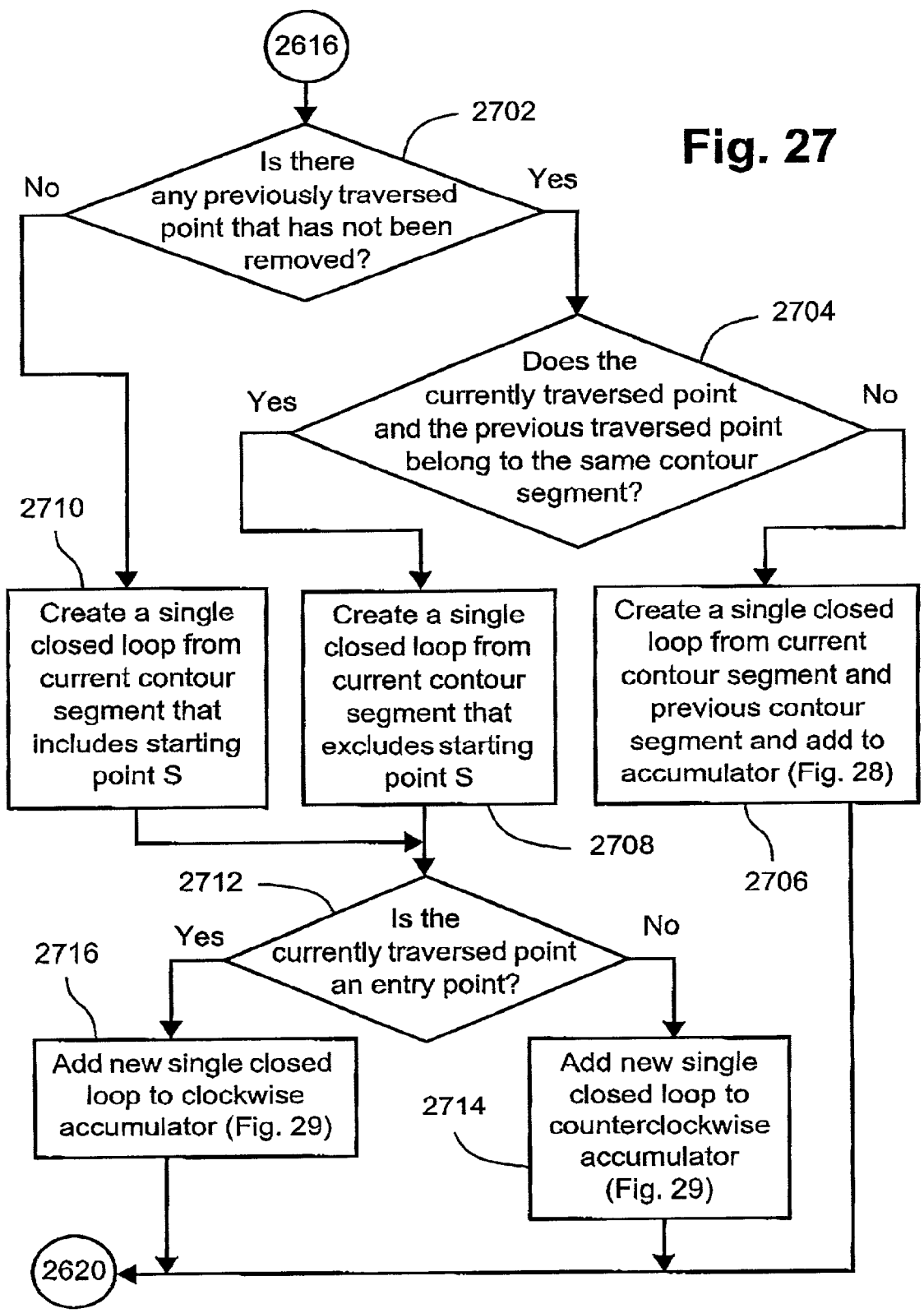
FIG. 27 is a flow chart of step 2618 of FIG. 26A in accordance with the method 600 shown in more detail.

Turning now to FIG. 27, there is shown in more detail a flow chart of step 2618 of FIG. 26A in accordance with the method 600. In the event decision block 2616 (FIG. 26A) returns TRUE (Yes), the method proceeds to decision block 2702 (FIG. 27).

The decision block 2702 determines whether there are any previously traversed entry or exit points that have not yet been removed by step 2620 (FIG. 26A). If the decision block 2702 returns TRUE (Yes), the method 600 then proceeds to decision block 2704, otherwise the decision block 2702 returns FALSE (No) and the method 600 proceeds to step 2710. In the specific case, where the currently traversed point is the first traversed point, then the decision block 2702 returns FALSE (No) and the method 600 proceeds to step 2710.

The decision block 2704 makes a check whether the currently traversed point and the previous traversed point belong to the same contour segment. If the decision block 2704 returns FALSE (No), then the method 600 proceeds to step 2706.

The method 600, during step 2706, then combines the respective regions defined by the current contour segment and previous contour segment to create a single closed loop. The step 2706 then updates the appropriate clockwise or counterclockwise accumulator with this newly created single closed loop. In this fashion, the method 600 connects a pair of contour segments of opposing directions into a single closed loop and adds it to the appropriate accumulator. The manner in which this step 2706 performs these tasks will be described later in more detail with reference to FIGS. 28A and 28B. After the completion of the step 2706, the method 600 then proceeds to step 2620.

On the other hand, if the decision block 2704 returns TRUE (Yes), that is if the currently traversed point and the previous traversed point belong to the same contour segment, then the method 600 proceeds to step 2708. The method 600, during step 2708, creates a single closed loop defined by the current contour segment that excludes the starting point S. In this regard, it should be noted that the single closed loop is formed from this contour segment only and not a pair of contour segments. Specifically, the step 2708 computes the area value A of that region bounded by the current contour segment and the pixel boundary that excludes the starting point S. In computing this area value A, the step 2708 utilizes those techniques as described above in Section "5.0 Coverage area of a Region defined by a single contour segment". The step 2708 furthermore creates a binary mask B=$m_x$ representative of this single closed loop in the manner as described in Section "7.1 Mask Creation". After completion of step 2708, the method 600 then proceeds to decision block 2712.

Returning now to decision block 2702, if this decision block 2702 returns FALSE (No), that is if all of previously traversed entry or exit points have been removed by step 2620 (FIG. 26A), the method proceeds to step 2710.

The method 600, during step 2710, creates a single closed loop defined by the current contour segment that includes the starting point S. In this regard, it should be noted that the single closed loop is formed from this contour segment only and not a pair of contour segments. Specifically, the step 2710 computes the area value A of that region bounded by the current contour segment and the pixel boundary that includes the starting point S. In computing this area value A, the step 2710 utilizes those techniques as described above in Section "5.0 Coverage area of a Region defined by a single contour segment". The step 2710 furthermore creates a binary mask B=$m_x$ representative of this single closed loop in the manner as described in Section "7.1 Mask Creation". After completion of step 2710, the method 600 then proceeds to decision block 2712.

The decision block 2712 checks whether the currently traversed point is an entry point. If the decision block 2712 returns TRUE (Yes), then the method proceeds to step 2716, where the single closed loop determined during steps 2710 or 2708 is added to the clockwise accumulator. The manner in which this step 2716 performs this task will be described later in more detail with reference to FIG. 29. If the decision block 2712 returns FALSE (No), then the method proceeds to step 2714, where the single closed loop determined during steps 2710 or 2708 is added to the counterclockwise accumulator. The manner in which this step 2714 performs this task will be described later in more detail with reference to FIG. 29. In this way, the decision block 2712 determines whether the single closed loop determined during steps 2710 or 2708 is a clockwise closed loop or a counterclockwise closed loop and adds it to the appropriate accumulator. After the completion of steps 2710 or 2708, the method then proceeds to step 2620 (FIG. 26A).

Figure 28B:
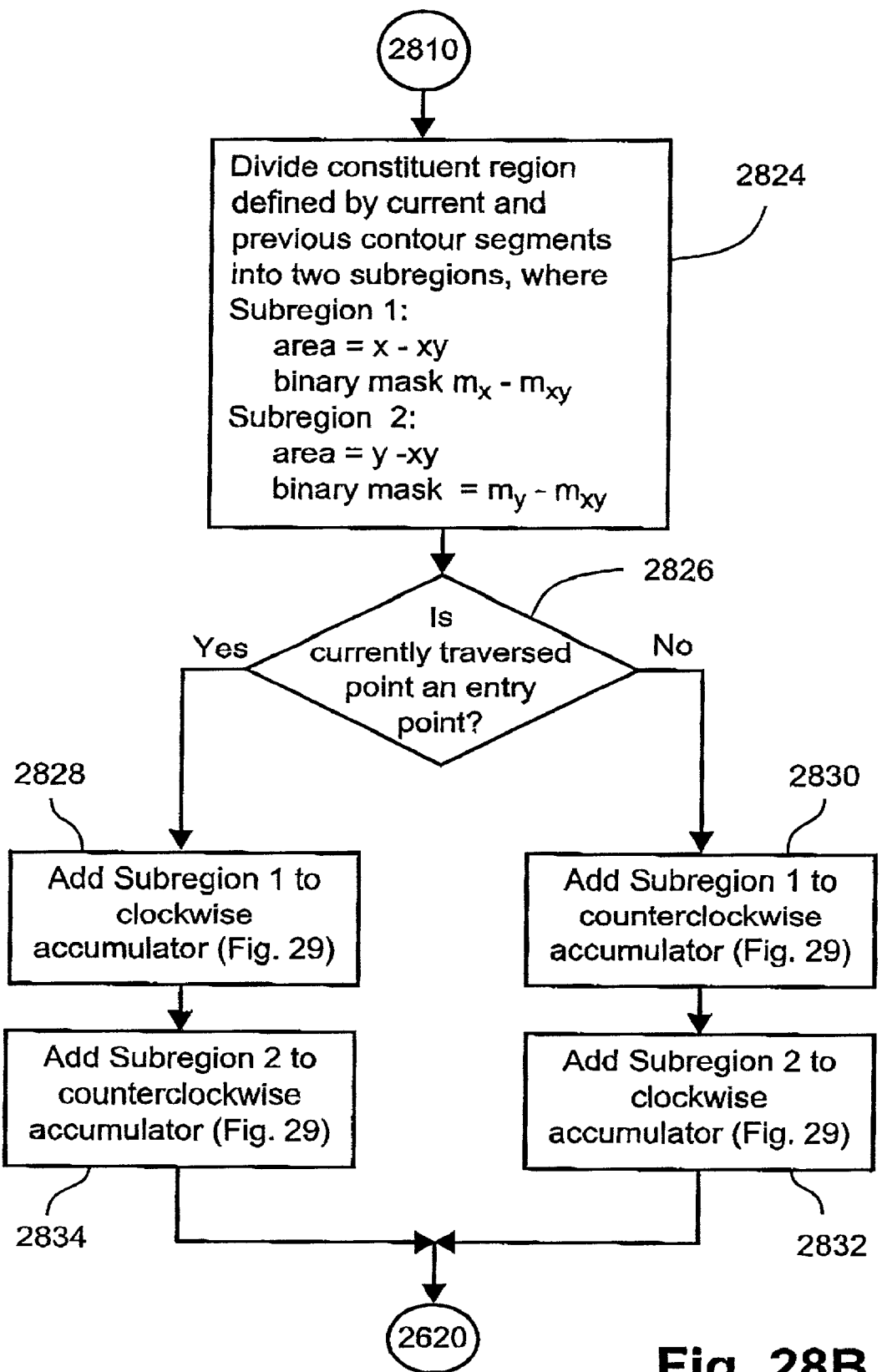

Turning now to FIGS. 28A and 28B, there is shown in more detail a flow chart of step 2706 of FIG. 27 in accordance with the method 600. After the decision block 2704 returns FALSE (No), the method 600 then proceeds to step 2802.

The method 600 during this step 2802 determines the area value of the region defined by the previous contour segment. Specifically, the step 2802 computes the area value x of that region bounded by the previous contour segment and the pixel boundary that includes the currently traversed point and assigns it to a variable x. In computing this area values the step 2802 utilises those techniques as described above in Section "5.0 Coverage area of a Region defined by a single contour segment". The method during this step 2802 also creates a binary mask $m_x$ representative of the region defined by the previous contour segment in the manner as described in Section "7.1 Mask Creation". After the completion of this step 2802, the method 600 proceeds to step 2804.

The method 600 during this step 2804 determines the area value y of the region defined by the current contour segment. Specifically, the step 2802 computes the area value y of that region bounded by the current contour segment and the pixel boundary that excludes the previous traversed point and assigns it to a variable y. In computing this area value, the step 2804 utilises those techniques as described above in Section "4.0 Coverage area of a Region defined by a single contour segment". The method also during this step 2804 creates a binary mask $m_y$ representative of the region defined by the current contour segment in the manner as described in Section "7.1 Mask Creation". After the completion of this step 2804, the method 600 proceeds to step 2806.

The method during this step 2806 performs the logical operation $m_{xy}=m_x$ AND $m_y$, where the binary masks $m_x$, and $m_y$, are representative of the previous and current contour segments respectively. After completion of this step 2806, the method proceeds to a series of decision blocks 2808 and 2810. The purpose of step 2806 and decision blocks 2808 and 2810 is to determine whether one region is subsumed by the other, and if so which region.

Specifically, after completion of step 2806, the method 600 proceeds to decision block 2808 where a check is made whether $m_y=m_{xy}$, and x>=y. Namely, the decision block 2808 checks whether region y defined by the current contour segment is totally subsumed within the region x defined by the previous contour segment. If the decision block 2808 returns TRUE (yes), then the method proceeds to step 2812.

The method during this step 2812 creates the constituent region of the single closed loop comprising the current and previous contour segments. Specifically, the method 600 determines the area value of A=x−y of this new constituent region and creates a binary mask B=$m_x$ XOR $m_y$, representative of this new constituent region.

After completion of step 2812, the method proceeds to decision block 2816, where a check is made whether the currently traversed point is an entry point. If the decision block 2816 returns TRUE (Yes), then the method 600 proceeds to step 2822, where the new constituent region is added to the clockwise accumulator. On the other hand, if the decision block 2816 returns FALSE (No), then the method 600 proceeds to step 2820, where the new constituent region is added to the counterclockwise accumulator. The steps 2822 and 2820 both call the same sub-process for adding their respective constituent regions to the accumulators. This sub-process is described in more detail later with reference to FIG. 29.

On the other hand, if the decision block 2808 returns FALSE (No) the method 600 proceeds to decision block 2810, where a check is made whether $m_x=m_{xy}$, and y>=x. Namely, the decision block 2810 checks whether the region x defined by the previous contour segment is totally subsumed within the region y defined by the current contour segment. If the decision block 2810 returns TRUE (yes), then the method 600 proceeds to step 2814.

The method during this step 2814 creates the constituent region of the single closed loop comprising the current and previous contour segments. Specifically, the method 600 determines the area value of A=y−x of this new constituent region and creates a binary mask B=$m_x$ XOR $m_y$, representative of this new constituent region.

After completion of step 2814, the method proceeds to decision block 2818, where a check is made whether the currently traversed point is an entry point. If the decision block 2818 returns FALSE (No), then the method 600 proceeds to step 2822, where the new constituent region is added to the clockwise accumulator. On the other hand, if the decision block 2818 returns TRUE (Yes), then the method 600 proceeds to step 2820, where the new constituent region is added to the counterclockwise accumulator.

As mentioned previously, the steps 2822 and 2820 both call the same sub-process for adding their respective constituent regions to the accumulators. This sub-process is described in more detail later with reference to FIG. 29. After completion of steps 2820 and 2822, the method 600 then proceeds to step 2620 (FIG. 26A).

If on the other hand, decision block 2810 returns FALSE (No), then the current and previous contour segments form a self-intersecting loop and the method 600 proceeds is to step 2824. The step 2824 divides the constituent region of this self-intersecting loop into two sub-regions, one defining the clockwise sub-region and the other the counterclockwise sub-region of the loop. Specifically, the step 2824 determines for a first sub-region the area value A=x−xy and the binary mask B=$m_x$−$m_{xy}$, representative of this first subregion, and also determines for a second sub-region the area value A=y−xy and the binary mask B=$m_y$−$m_{xy}$, representative of tis second subregion. Note the sum of the area values of these two sub-regions is equal to the area value specified by Eqn. (5).

After the completion of step 2824, the method proceeds to decision block 2826, where a check is made whether the currently traversed point is an entry point. If the decision block 2826 returns TRUE (Yes), then the method 600 proceeds to steps 2828 and 2834, where the first subregion is added 2828 to the clockwise accumulator and the second subregion is added 2834 to the counterclockwise accumulator. If on the other hand, the decision block 2826 returns FALSE (No), then the method 600 proceeds to steps 2830 and 2832, where the first subregion is added 2830 to the counterclockwise accumulator and the second subregion is added 2832 to the clockwise accumulator.

The steps 2828, 2830, 2832, and 2834 each call the same sub-process for adding their respective sub-regions to their respective accumulators. This sub-process is described in more detail later with reference to FIG. 29. After completion of steps 2834 and 2832, the method 600 then proceeds to step 2620 (FIG. 26A).

Figure 29:
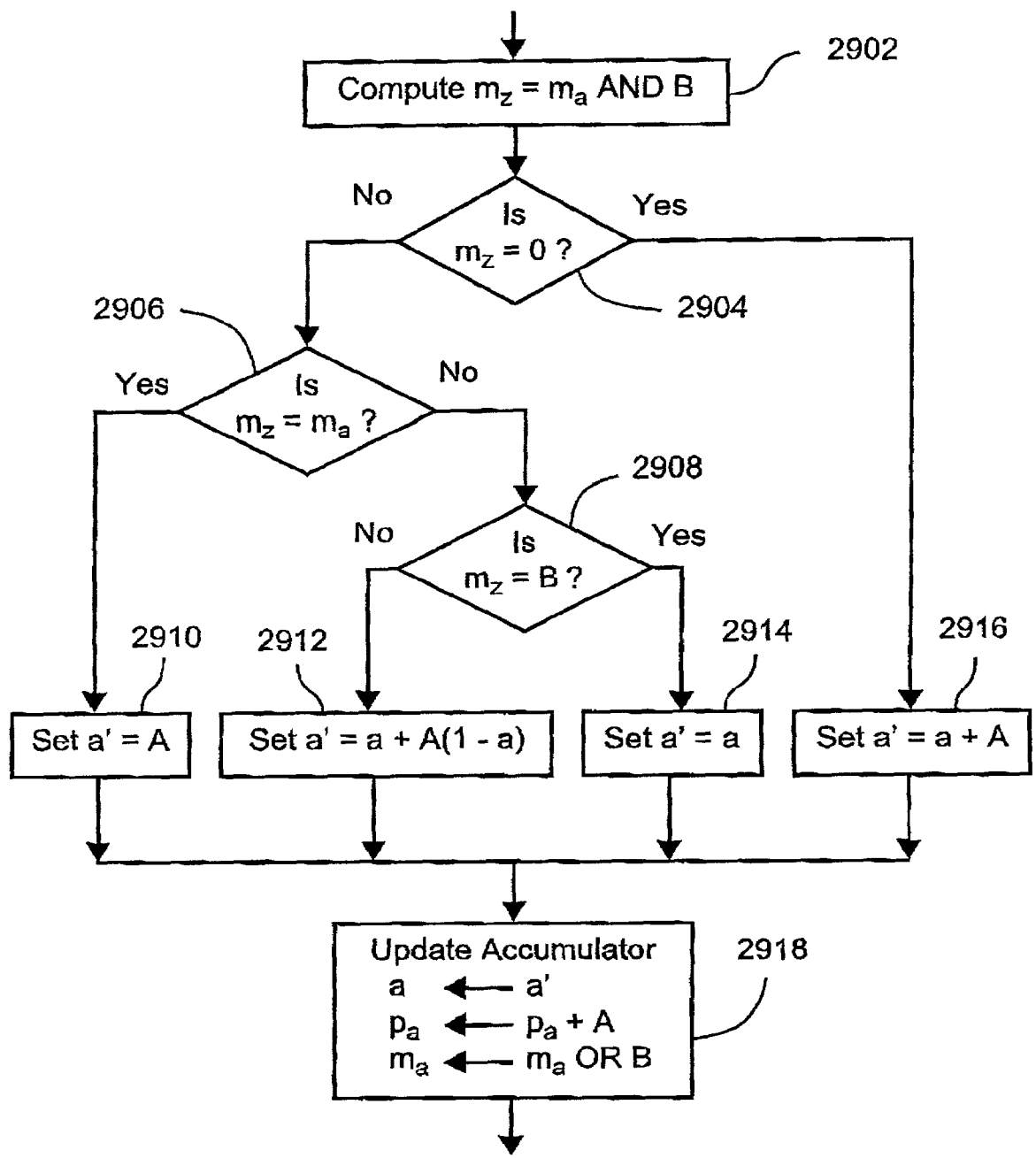
FIGS. 29 is a flow chart of the sub-process adapted to be called by any one of the steps 2716, 2714, 2820, 2822, 2828, 2834, 2830, and 2832 of FIGS. 27, 28A and 28B in accordance with the method 600.

Turning now to FIG. 29, there is shown a flow chart of the sub-process adapted to be called by any one of the steps 2716, 2714, 2820, 2822, 2828, 2834, 2830, and 2832 of FIGS. 27, 28A and 28B in accordance with the method 600. The method 600 passes to the sub-process an area value A and a binary mask B for updating the appropriate accumulator. The process firstly proceeds to a step 2902, where a binary mask $m_z$=$m_a$ AND B is computed, where $m_a$ is the binary mask currently stored in the accumulator and B is the binary mask passed to the process. The sub-process then proceeds to a decision block 2904, where a check is made whether the binary mask $m_z$ is zero. If the decision block 2904 returns TRUE (Yes), then the process continues to step 2916, which sets a variable a' to a+A, where a is the area value currently stored in the accumulator and A is the area value passed to the sub-process by the method 600.

If on the other hand, the decision block 2904 returns FALSE (NO), then the sub-process continues to decision block 2906, where a check is made whether the binary mask $m_z$ equals $m_a$. If the decision block 2906 returns TRUE (Yes), then the sub-process proceeds to step 2910, which sets the variable a' to A. On the other hand, if the decision block 2906 returns FALSE (NO), the sub-process continues to decision block 2908, where a check is made whether $m_z$=B.

If the decision block 2908 returns TRUE (Yes), then the sub-process continues to step 2914, which sets the variable a' to a. On the other hand, if the decision block 2908 returns FALSE (No), then the sub-process continues to step 2912, which sets the variable a' to a+A(1−a).

After the completion of either one of the steps 2910, 2912, 2914 or 2916 the sub-process proceeds to step 2918, which updates the values stored in the appropriate accumulator. Specifically, the sub-process updates the coverage area variable a currently stored in the accumulator with the value a', the percentage winding count variable $p_a$ currently stored in the accumulator with the value $p_a$+A, and the binary mask $m_a$ currently stored in the accumulator with the binary mask $m_a$ OR B. After completion of the updating step 2918 the sub-process returns to the main method 600.

Figure 30:
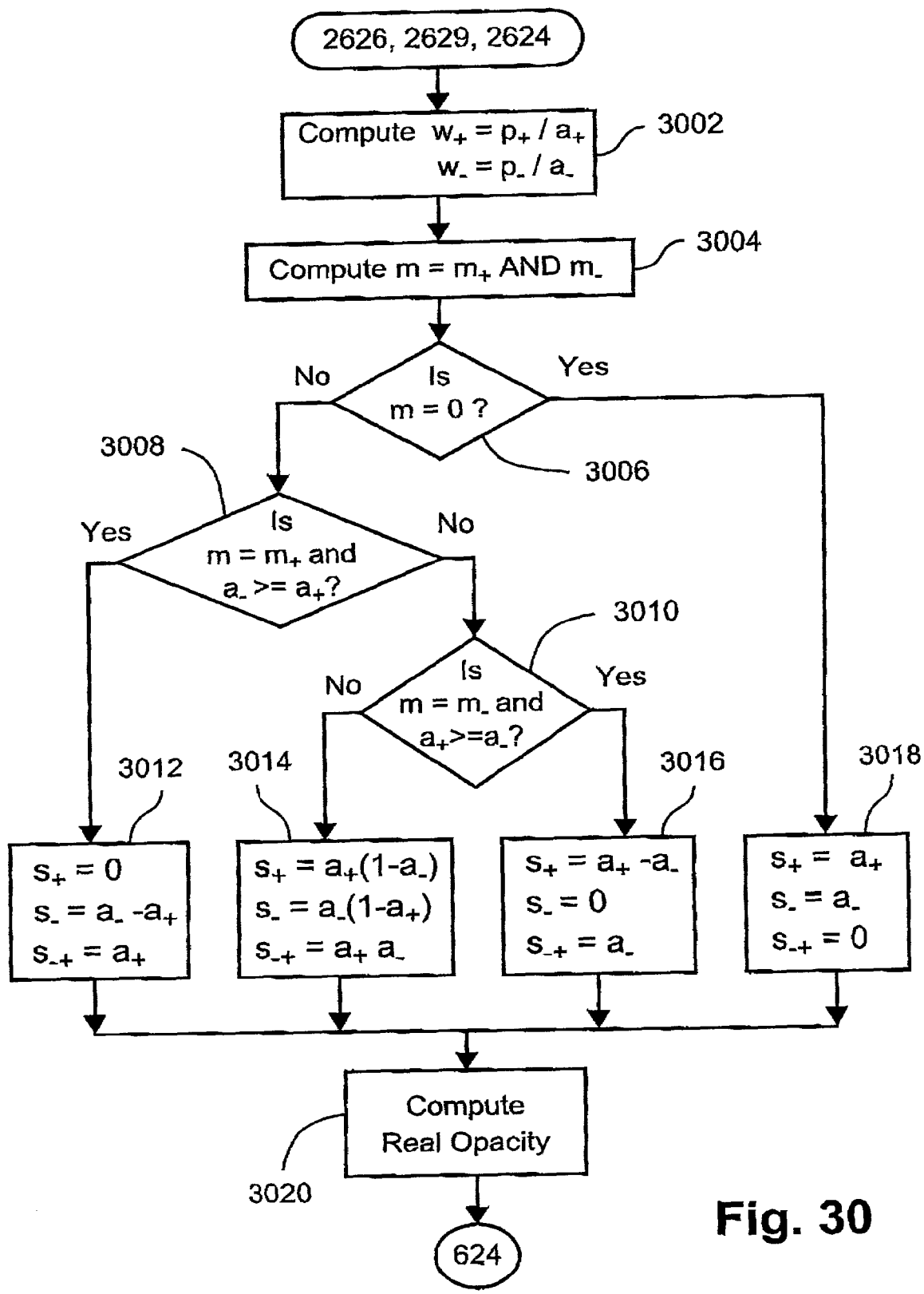
FIG. 30 is a flow chart of step 2630 of FIG. 26B in accordance with the method 600 shown in more detail.

Turning now to FIG. 30, there is shown in more detail a flow chart of step 2630 of FIG. 26B in accordance with the method 600. This step 2630 is concerned with the final processing of the currently scanned pixel and combines the contents of the clockwise and counterclockwise accumulators and then finally computes the real opacity of the currently scanned pixel. Since the accumulators represent regions of the opposing clockwise and counterclockwise directions, the combination of these two regions is destructive resulting in up to three sub-regions: (i) the intersection region between the clockwise and counterclockwise accumulators (ii) the region defined by the clockwise accumulator excluding the intersection region (iii) the region defined by the counterclockwise accumulator excluding the intersection region. This step 2630 computes the weighted average winding count values and area values for these sub-regions denoted by $s_{+-}$, $s_+$ and $s_-$ respectively and then computes the overall real opacity of the currently scanned pixel using these values.

After completion of any of the steps 2624 or 2628, or decision block 2626 (FIG. 26B), the method 600 proceeds to step 3002. The method 600 during step 3002 computes an weighted average winding count $w_+$=$p_+$/$a_+$, where $p_+$ is percentage winding count variable currently stored in the clockwise accumulator, and $a_+$ is the coverage area variable currently stored in the clockwise accumulator. The method 600 at the same time computes the weighted average winding count $w_-$=$p_-$/$a_-$, where $p_-$ is percentage winding count variable currently stored in the counterclockwise accumulator, and $a_{31}$ is the coverage area variable currently stored in the counterclockwise accumulator. The preferred method also computes the weighted average winding count |$w_+$−$w_-$|. After the completion of step 3002, the method 600 proceeds to step 3004, where the method computes the binary mask m=$m_+$ AND $m_-$, where $m_+$ and $m_-$ are the binary masks currently stored in the clockwise and counterclockwise accumulator respectively After completion of step 3004, the method 600 proceeds to decision block 3006 where a check is made whether the binary mask m=0. If the decision block 3006 returns TRUE (Yes), then the method 600 proceeds to step 3018. The method 600, during step 3018, then sets the area values of three subregions according to $s_+$=$a_+$, s−=$a_{31}$, and $s_{-+}$=0. On the other hand, if the decision block 3006 returns FALSE (No), then the method 600 proceeds to decision block 3008, where a check is made whether m=$m_+$ and $a_-$>=$a_+$. If the decision block 3008 returns TRUE (Yes), then the method 600 proceeds to step 3012. The method 600, during step 3012, then sets the area values of the three subregions according to $s_+$=0, s−=$a_-$−$a_+$, and $s_{-+}$=$a_+$. On the other hand, if the decision block 3008 returns FALSE (No), then the method 600 proceeds to decision block 3010, where a check is made whether m=m_ and $a_+ \geq a_-$. If the decision block 3010 returns TRUE (Yes), then the method 600 proceeds to step 3016. The method 600, during step 3016, then sets the area values of the three subregions according to $s_+ = a_+ - a_-$, $s_- = 0$ and $s_{-+} = a_-$. On the other hand, if the decision block 3010 returns FALSE (No), then the method 600 proceeds to step 3014. The method 600, during step 3014, then sets the area values of the three subregions according to $s_+ = a_+(1-a_-)$, $s_- = a_-(1-a_+)$ and $s_{-+} = a_+ a_-$. The method proceeds to step 3020, after the area values $s_+$, $s_-$ and $s_{-+}$ have been set by the relevant step 3012, 3014, 3016, or 3018.

The method 600 during step 3020 computes the overall opacity of the currently scanned pixel utilizing these area values $s_+$, $s_-$ and $s_{-+}$ and their associated weighted average winding count values $|w_+|$, $|w_-|$, and $|w_+ - w_-|$. Specifically, the method 600 computes the overall opacity of the currently scanned pixel using the techniques as described in the aforementioned section "9.0 Computing the Real Opacity of the Pixel". After completion of this step 3020, the method 600 proceeds to step 624 (FIG. 6), where the currently scanned pixel is rendered in accordance with the computed overall real opacity.

Although the method 600 described above performs the traverse of the pixel boundary in the clockwise direction, it can easily be adapted by those skilled in the art so that the traverse is performed in the opposite direction.

10.1 Illustrative Example of the Preferred Rendering Method

The method 600 will now be described with reference to a particular example.

FIG. 22 shows a pixel containing 3 contour segments a, b and c. This example is identical to that shown in FIG. 7 except that the contour segments have been approximated with straight-line segments. The starting point S has been chosen in this example to be the top-left corner of the pixel. The initial winding count of this point is zero.

Tracing begins at point S, moving along the pixel boundary in the clockwise direction. The first contour segment encountered is b. Since this is the entry point of the contour segment, the winding count is decremented to −1. As this represents an increase in the absolute value of the winding count, tracing continues. The next contour segment that is encountered is a. Again this is an entry point and hence the winding count is decremented to −2.

Tracing continues until the next contour segment c is reached. This time it is the exit point and hence the winding count is incremented back to −1. Since this represents a decrease in the absolute winding count, the current contour segment c is paired with the previous contour segment, a, to create a single constituent region. This region is formed by destructively combing the regions defined by the individual contour segments, as shown in FIG. 23. Notice that the region due to a, denoted by A, is defined such that it includes the current trace point $P_c$ where c is encountered, whilst that due to c, denoted by C, is defined such that it excludes the earlier point $P_a$ where a was encountered.

Figure 13A:
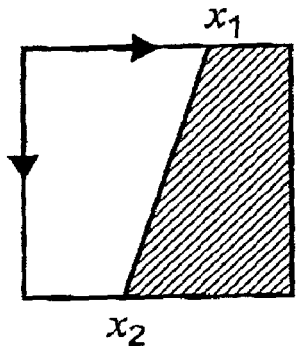
FIGS. 13A to 13G illustrates a set of possible contour segments that intersect the top pixel boundary.
Figure 13B:
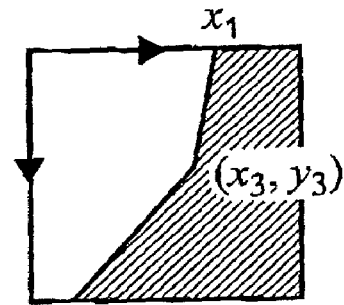
Figure 13C:
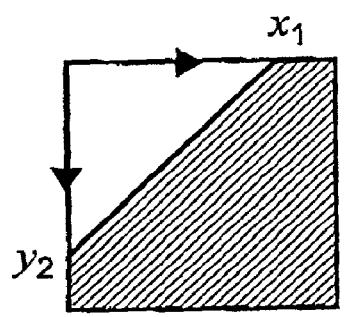
Figure 13D:
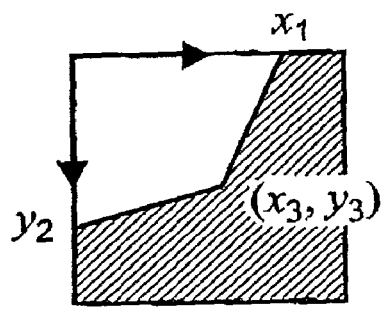
Figure 13E:
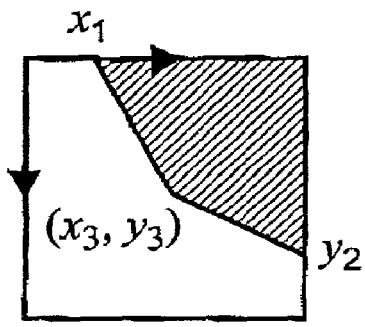
Figure 13F:
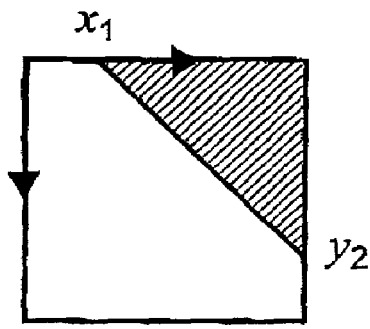
Figure 13G:
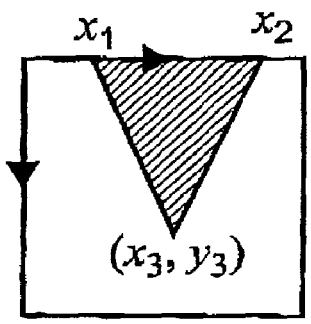
Figure 14A:
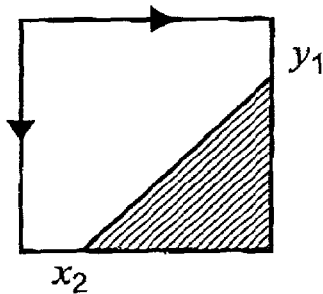
FIGS. 14A to 14E illustrates a set of possible contour segments that intersect the bottom pixel boundary but not the top boundary.
Figure 14B:
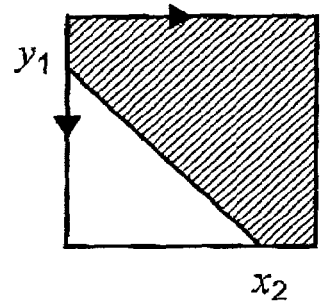
Figure 14C:
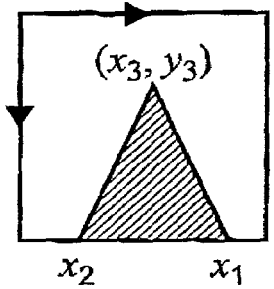
Figure 14D:
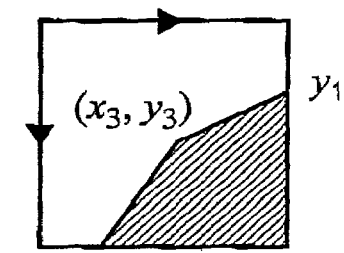
Figure 14E:
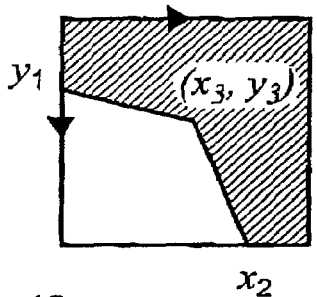

The areas of regions A and C are then computed using the Type 2 formula shown in FIG. 13B. Let these be 0.5 and 0.45 respectively. Since A does not subsume C, the intersection area between the two regions is approximated by the product of their individual areas, which is 0.5×0.45=0.225. The combination of A and C defines a counter-clockwise subregion in the upper half of the pixel, and a clockwise subregion in the lower half. The areas of these subregions are given by (area of A)−(area of intersection region)

and (area of C)−(area of intersection region)

respectively, which work out to be 0.5−0.225=0.275, and 0.45−0.225=0.225. These areas are then added to the percentage winding counts of the counter-clockwise and clockwise accumulators respectively. They are also used to update the coverage areas of the accumulators. Since both accumulators are initially empty, their new percentage winding count values as well as their coverage areas are simply 0.275 and 0.225 respectively.

Following updating the accumulators, both contour segments a and c are removed from the pixel, leaving a single contour segment b remaining, as shown in FIG. 24. Tracing then continues from the current point $P_c$. The next point where a contour segment is encountered is the exit point of b, which causes the winding count to be incremented from −1 to 0. Again this represents a decrease in the absolute value of the winding count, and hence a constituent region is created.

Since b is also the only contour segment that remains, the constituent region is formed solely from b. The region formed includes points from $P_{b1}$ to $P_{b2}$ (and hence excludes point S) as the currently traversed point $P_{b2}$ and the previous traversed point $P_{b1}$ belong to the same contour segment (see step 2708). Its area is computed using the Type 2 formula in FIG. 13B. Since the region is defined by counter-clockwise edges, its area, which works out to be 0.65, is then added to the percentage winding count of the counter-clockwise accumulator, bringing its value to 0.275+0.65=0.925. The coverage area of the accumulator is also updated to 0.65, the area of the new constituent region, due to the fact that this new region subsumes the existing coverage area of the accumulator.

The contour segment b is then removed and tracing continues all the way back to point S, encountering no farther contour segments. The final winding count at S is zero, and hence no further updates are made to the two accumulators.

Finally, the two accumulators are combined. Since the coverage areas of the accumulators do not intersect, as illustrated in FIG. 25, the overall opacity of the pixel is simply the sum of the real opacities of the accumulators, weighted by their coverage areas. To obtain the opacity value of each accumulator, its weighted average winding count is computed by dividing the percentage winding count by the coverage area. These work out to be 0.925/0.65=1.4231 for the counter-clockwise accumulator, and 0.225/0.225=1 for the clockwise accumulator.

Computing now the overall real opacity of the example pixel according to the winding-counting fill rule and using the afore-mentioned Eqns (6) and Eqns (9), the overall real opacity is:

$$0.65(0.4231\alpha + \alpha(1 - 0.4231\alpha)) + 0.225(\alpha),$$

where $\alpha$ is the intrinsic opacity of the polygon.

On the other hand, the overall real opacity of the example pixel according to the non-zero winding fill rule and using Eqns (7) and (9) is:

$$0.65(\alpha) + 0.225(\alpha).$$

Whilst, the overall real opacity of the example pixel according to tie odd-even ill rule and using Eqns (8) and (9) is:

$$0.65(\alpha(-0.4231))+0.225(\alpha).$$

11.0 Variation of the Rendering Method 600 in More Detail

Although the method 600 presented above is capable of operating under any fill rule, it is possible to devise a simpler and faster method that takes advantage of the special properties of the odd-even fill rule.

Under the odd-even fill rule, when two single closed loops are combined, regardless of whether their constituent regions are defined by edges of the same or opposite directions, the end result in the intersection area is always destructive. In addition, the resulting coverage area can effectively be treated as if it has a winding count of 1. This means (i) it is no longer necessary to maintain a weighted average winding count as constituent regions are combined together, and (ii) only a single accumulator rather than two needs to be maintained for each pixel, since it is not necessary to distinguish between clockwise and counter-clockwise regions. When all constituent regions have been processed, the overall opacity of the pixel is then preferably the product of the final coverage area of the accumulator and the intrinsic opacity of the polygon.

For example, when two single closed loops of the same direction are combined under the odd-even fill rule, the winding count of the intersection area will be even and thus makes no contribution to the real opacity of the pixel. Consequently, two single closed loops of the same direction can be combined destructively. When two single closed loops of opposing direction are combined under the odd-even fill rule, the winding count of the intersection area will be zero and also makes no contribution to the real opacity of the pixel. Consequently, two single closed loops of opposing direction can also be combined destructively. Thus when two constituent regions are combined, these can be combined destructively regardless of their direction. The remaining non-intersection areas have odd winding counts, and according to the odd-even fill rule these areas can effectively be treated as having a winding count of one. Thus under the odd-even fill rule, the weighted average of winding counts is effectively equal to the area value of the destructively combined regions. The real opacity of the currently scanned pixel can then be computed as being representative of the product of the intrinsic opacity of the polygon and the area value of the combined constituent regions.

Figure 31A:
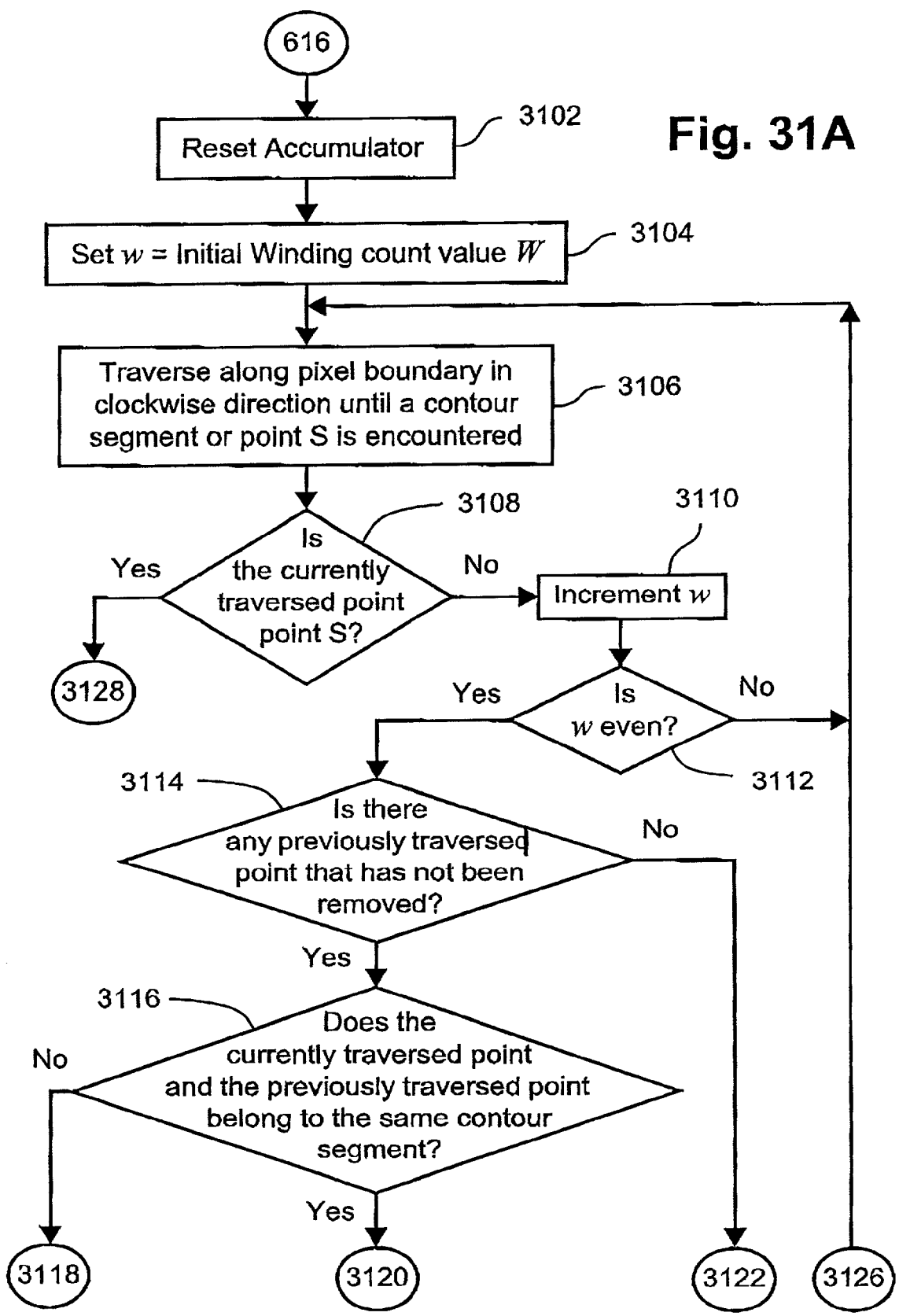
FIGS. 31A, 31B and 31C is a flow chart of the steps 618 to 622 of FIG. 6 in accordance with a variation of the method 600.
Figure 31B:
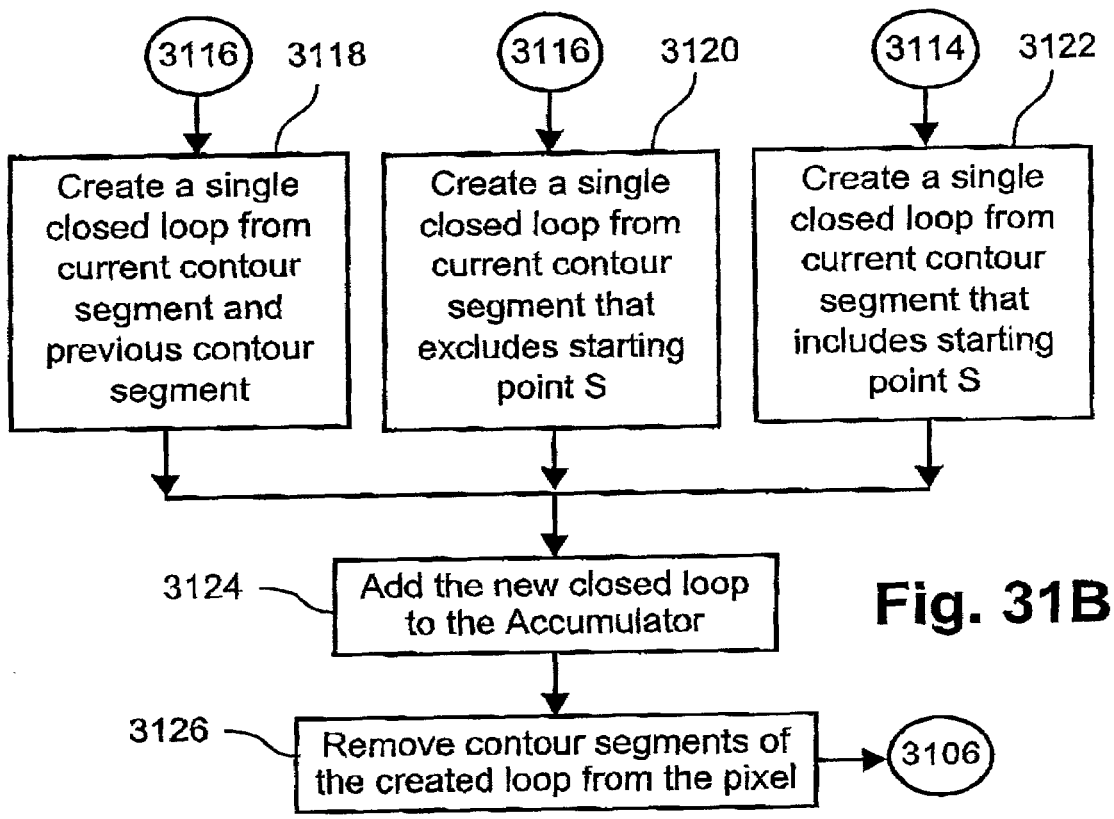
Figure 31C:
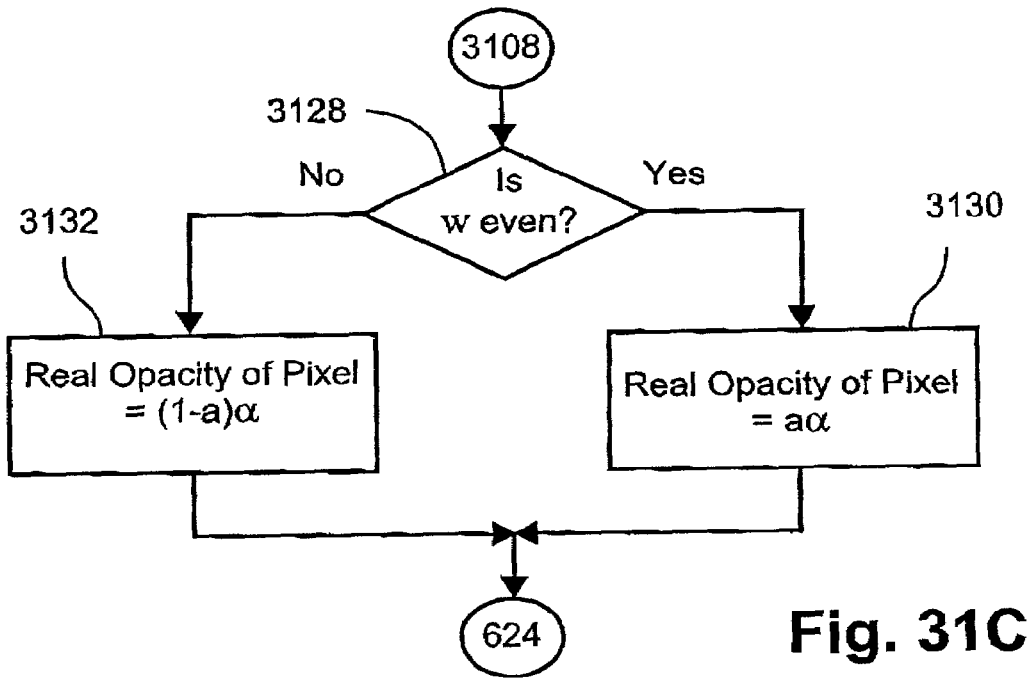

Turning now to FIGS. 31A, 31B and 31C, there is shown in more detail a flow chart of steps 618 to 622 of FIG. 6 in accordance with the variation of the method 600 for computing the overall opacity of a pixel under the odd-even fill rule. After each contour segment within the currently scanned pixel has been approximated 616, the method 600 proceeds to step 3102. The method 600 during step 3102 resets to zero the coverage area variable in the accumulator and its associated binary mask to zero. The method 600 then proceeds to step 3104, where a variable w is set to the initial winding count W of the starting point S.

After completion of step 3104, the method 600 proceeds to step 3106, where the method 600 traverses along the boundary of the currently scanned pixel in a clockwise direction from point S until an entry or exit point of a contour segment or the point S is at last encountered. This step 3106 is performed in similar fashion as described with reference to step 2606 of FIG. 26A. As mentioned previously, the method 600 preferably generates an indexed list of the entry and exit points of the contour segments together with the initial point S and then processes these points in sorted order and flags those contour segments in the list as being removed and/or traversed when required. Preferably, each entry and exit point of this list is assigned a value representing the distance from the starting point to the entry or exit point measured around the pixel boundary in the clockwise direction. The list is sorted in accordance with this value. Each entry and exit point of the list is also assigned a unique number indicating the contour segment to which it belongs. In the case where an entry or exit point is located at the starting point S, then the aforementioned value is assigned a small non-zero value in order to distinguish it from the starting point S. This indexed list may be generated from the current sub-list of straight-line segments for the currently scanned pixel.

The method 600 performs the following operations 3108 to 3126 on each traversed point of the currently scanned pixel. The method will now be described with respect to a currently traversed point. For further ease of explanation, the first traversed point immediately prior to the currently traversed point that has not been removed is again referred to herein as the previous traversed point. The contour segment that has as one of its end points the currently traversed point is again referred to herein as the current contour segment. The contour segment that has as one of its end points the previous traversed point is again referred to herein as the previous contour segment.

After the method 600, reaches an entry or exit point of a contour segment or point S, the method proceeds to decision block 3108, where a check is made whether the currently traversed point is point S. If the decision block 3108 returns TRUE (Yes), the method 600 proceeds to decision block 3128. This branch of the decision block 3108, is concerned with the final processing of the currently scanned pixel and will be discussed later in the description. On the other hand, if the decision block 3108 returns FALSE (No), the method 600 proceeds to step 3110. The latter branch of the decision block 3108 is concerned with the earlier processing stages of the currently scanned pixel, and now will be described.

The method 600, during step 3110 increments the variable w and then proceeds to decision block 3112. The decision block 3112 checks whether the current value stored in the variable w is even. If the decision block 3112 returns FALSE (No), then the method 600 returns to step 3106, where the method 600 traverses to the next exit point, entry point, or if there are no more exit or entry points to point S. The method 600 then processes this new point in the same fashion as described above. If on the other hand, the decision block 3112 returns TRUE (Yes), the method 600 proceeds to decision block 3114.

The decision block 3114 determines whether there are any previously traversed entry or exit points that have not yet been removed by step 3126. If the decision block 3114 returns TRUE (Yes), the method 600 then proceeds to decision block 3116, otherwise the decision block 3114 returns FALSE (No) and the method 600 proceeds to step 3122. In the specific case, where the currently traversed point is the first traversed point, then the decision block 3114 returns FALSE (No) and the method 600 proceeds to step 3122.

The decision block 3116 makes a check whether the currently traversed point and the previous traversed point belong to the same contour segment. If the decision block 3116 returns FALSE (No), then the method 600 proceeds to step 3118. On the other hand, if the decision block returns TRUE (Yes), then the method 600 proceeds to step 3120.

The method 600, during step 3118, then combines the respective regions defined by the current contour segment and previous contour segment to create a single closed loop. In this fashion, the method 600 connects a pair of contour segments into a single closed loop. The manner in which the step 3118 combines these regions will be described later in more detail with reference to FIG. 32. After the completion of the step 3118, the method 600 then proceeds to step 3124.

The method 600, during step 3120, creates a single closed loop defined by the current contour segment that excludes the starting point S. In this regard, it should be noted that the single closed loop is formed from this contour segment only and not a pair of contour segments. Specifically, the step 3120 computes the area value A of that region bounded by the current contour segment and the pixel boundary that excludes the starting point S. In computing this area value A, the step 3120 utilizes those techniques as described above in Section "5.0 Coverage area of a Region defined by a single contour segment". The step 3120 furthermore creates a binary mask $B=m_x$ representative of this single closed loop in the manner as described in Section "7.1 Mask Creation". After completion of step 3120, the method 600 then proceeds to step 3124.

The method 600, during step 3122, creates a single closed loop defined by the current contour segment that includes the starting point S. In this regard, it should be noted that the single closed loop is formed from this contour segment only and not a pair of contour segments. Specifically, the step 3122 computes the area value A of that region bounded by the current contour segment and the pixel boundary that includes the starting point S. In computing this area value A, the step 3122 utilizes those techniques as described above in Section "5.0 Coverage area of a Region defined by a single contour segment". The step 3122 furthermore creates a binary mask $B=m_x$ representative of this single closed loop in the manner as described in Section "7.1 Mask Creation". After completion of step 3122, the method 600 then proceeds to step 3124.

The method 600 then adds 3124 the single closed loop created during step 3118, 3120 or 3122 to the accumulator. The manner in which the method 600 performs the task of adding a closed loop to the accumulator will be described later in more detail with reference to FIG. 33. After completion of step 3124, the method proceeds to step 3126.

The method 600 during step 3126 removes those contour segment(s) from the currently scanned pixel that make up the single closed loop created during step 3118, 3120, or 3122. As mentioned previously, these contour segments are not physically removed from the currently scanned pixel, but rather the method 600 flags those contour segments in the indexed list as being removed. After completion of the step 3126, the method 600 returns to step 3106, where the method 600 traverses to the next exit point, entry point, or if there are no more exit or entry points to point S. The method 600 then processes this new point in the same fashion as described above.

Figure 32:
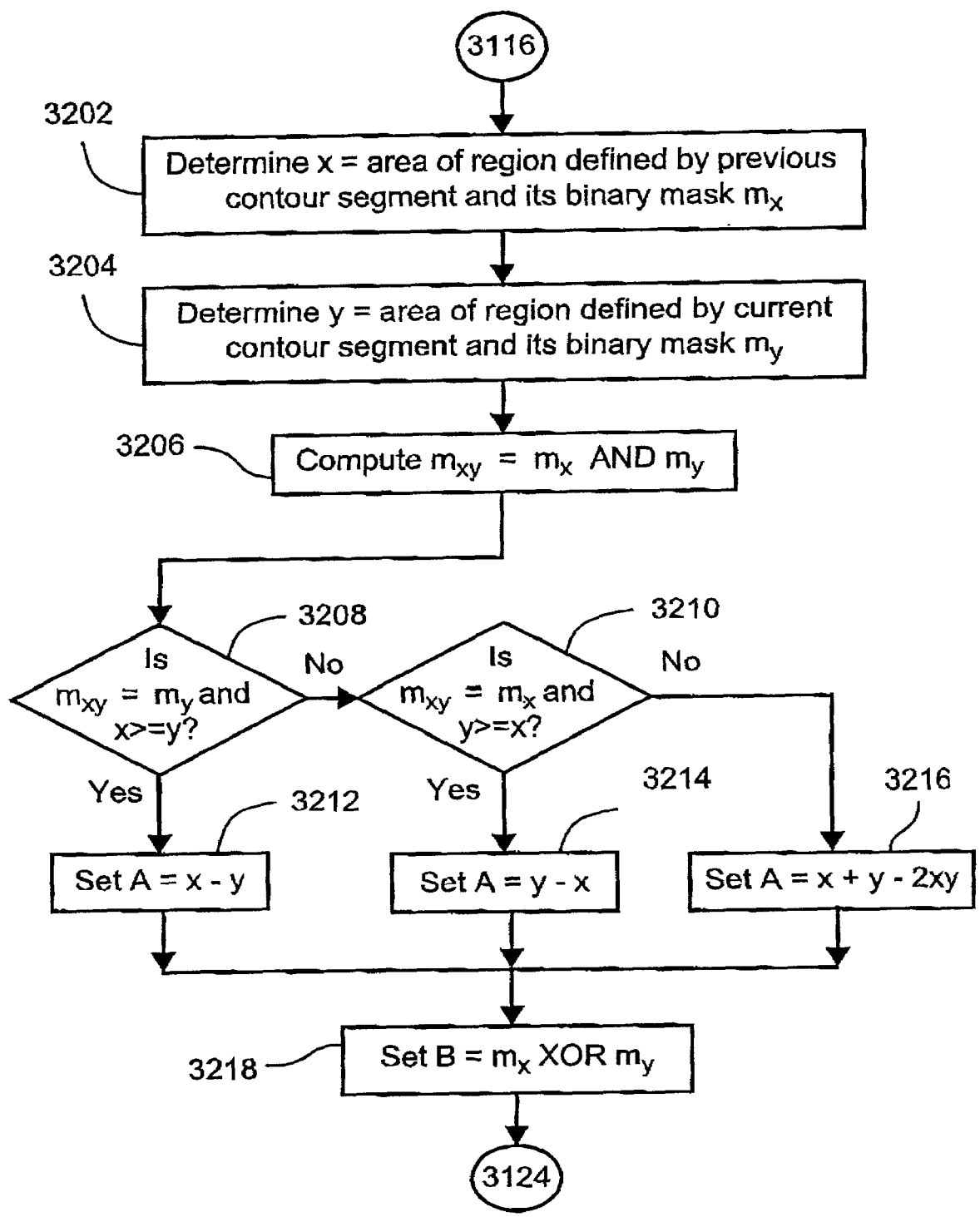
FIG. 32 is a flow chart of step 3118 of FIG. 31B in accordance with the variation of the method 600 shown in more detail.

Turning now to FIGS. 32, there is shown in more detail a flow chart of step 3118 of FIG. 31B in accordance with the method 600. After the decision block 3116 returns FALSE (No), the method 600 then proceeds to step 3202.

The method 600 during this step 3202 determines the area value of the region defined by the previous contour segment. Specifically, the step 3202 computes the area value x of that region bounded by the previous contour segment and the pixel boundary that includes the currently traversed point and assigns it to a variable x. In computing this area value, the step 3202 utilizes those techniques as described above in Section "5.0 Coverage area of a Region defined by a single contour segment". The method 600 during this step 3202 also creates a binary mask $m_x$ representative of the region defined by the previous contour segment in the manner as described in Section "7.1 Mask Creation". After the completion of this step 3202, the method 600 proceeds to step 3204.

The method 600 during this step 3204 determines the area value y of the region defined by the current contour segment. Specifically, the step 3202 computes the area value y of that region bounded by the current contour segment and the pixel boundary that excludes the previous traversed point and assigns it to a variable y. In computing this area value, the step 3204 utilizes those techniques as described above in Section "5.0 Coverage area of a Region defined by a single contour segment". The method also during this step 3204 creates a binary mask my representative of the region defined by the current contour segment in the manner as described in Section "7.1 Mask Creation". After the completion of this step 3204, the method 600 proceeds to step 3206.

The method during this step 3206 performs the logical operation $m_{xy}=m_x$ AND $m_y$, where the binary masks $m_x$ and $m_y$ are representative of the previous and current contour segments respectively. After completion of this step 3206, the method proceeds to a series of decision blocks 3208 and 3210. The purpose of step 3206 and decision blocks 3208 and 3210 is to determine whether one region is subsumed by the other, and if so which region.

Specifically, after completion of step 3206, the method 600 proceeds to decision block 3208 where a check is made whether $m_y=m_{xy}$ and x>=y. Namely, the decision block 3208 checks whether the region y defined by the current contour segment is totally subsumed within the region x defined by the previous contour segment. If the decision block 3208 returns TRUE (yes), then the method proceeds to step 3212.

The method 600 during this step 3212 creates the constituent region of the single closed loop comprising the current and previous contour segments. Specifically, the method 600 determines and sets 3212 the area value of A=x−y of this new constituent region. The method then creates 3218 a binary mask $B=m_x$ XOR $m_y$ representative of this new constituent region. After completion of this step 3218, the method proceeds to step 3124 (FIG. 31), where the single closed loop is added to the accumulator.

On the other hand, if the decision block 3208 returns FALSE (No) the method 600 proceeds to decision block 3210, where a check is made whether $m_x=m_{xy}$ and y>=x. Namely, the decision block 3210 checks whether the region x defined by the previous contour segment is totally subsumed within the region y defined by the current contour segment. If the decision block 3210 returns TRUE (yes), then the method 600 proceeds to step 3214.

The method 600 during this step 3214 creates the constituent region of the single closed loop comprising the current and previous contour segments, Specifically, the method 600 determines and sets 3214 the area value of A=y−x of this new constituent region. The method then creates 3218 a binary mask $B=m_x$ XOR $m_y$ representative of this new constituent region, After completion of step 3218, the method proceeds to step 3124 (FIG. 31), where the single closed loop is added to the accumulator.

If on the other hand, decision block 3210 returns FALSE (No), then the current and previous contour segments form a self-intersecting loop and the method 600 proceeds to step 3216. The method 600 during this step 3216 creates the constituent region of the single closed loop comprising the current and previous contour segments. Specifically, the method 600 determines and sets the area value of A=x+y−

2xy of this new constituent region. The method then creates 3218 a binary mask B=$m_x$ XOR $m_y$, representative of this new constituent region. After the completion of step 3218, the method proceeds to step 3124 (FIG. 31), where the single closed loop is added to the accumulator.

Figure 33:
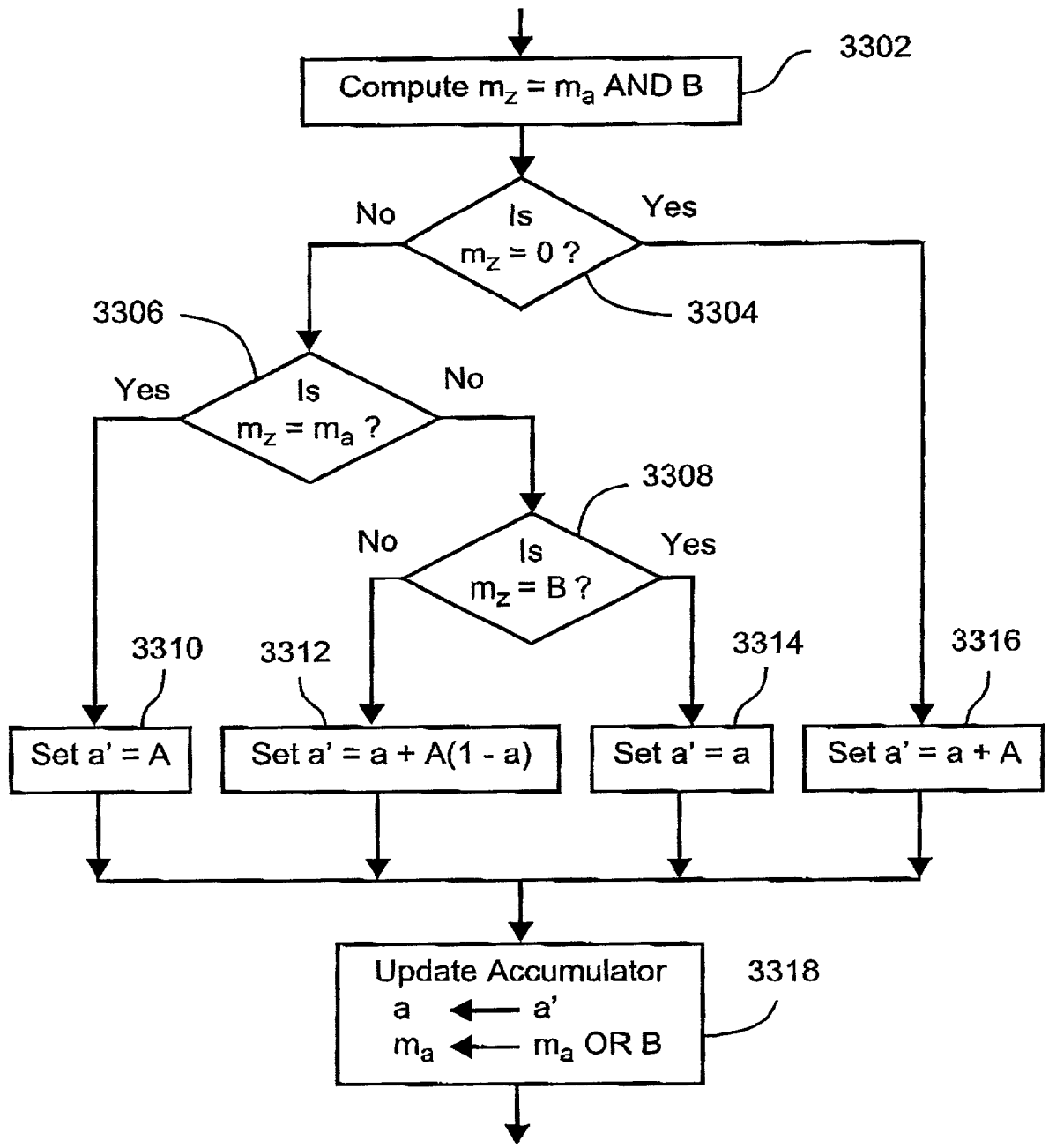
FIGS. 33 a flow chart of the step 3124 of FIG. 31B in accordance with the variation of the method 600 shown in more detail.

Turing now to FIG. 33, there is shown a flow chart of step 3124 of FIG. 31B in accordance with the variation of the method 600 shown in more detail. After completion of any one of the steps 3118, 3116, or 3122 the method calls this step 3124, which is in the form of a sub-process. The method 600 passes to the sub-process 3124 an area value A and a binary mask B for updating the accumulator. This sub-process 3124 is essentially equivalent to the sub-process described with reference to FIG. 29 with the exception of the final updating step 3318 and only the latter will now be described.

After the completion of any one of the steps 3310, 3312, 3314 or 3316 the sub-process proceeds to step 3318, which updates the values stored in the accumulator. The variables a and $m_a$ denote the coverage area of the accumulator and its binary mask respectively stored in the accumulator and A and B denote the coverage area of constituent region to be merged and its binary mask respectively. Computation of the coverage area of the combined region is dependent on how the two regions intersect one another, which is in turn dictated by the interaction between the two binary masks $m_a$ and B, according to Table 1. The process then updates the coverage area variable a currently stored in the accumulator with the value a', and the binary mask $m_a$, currently stored in the accumulator with the binary mask $m_a$ OR B.

After completion of the updating step 3318 the process returns to the main method 600 and step 3126.

Returning to FIGS. 31A, as mentioned earlier, if the decision block 3108 returns TRUE (Yes), that is the currently traversed point is point S, the method 600 then proceeds to decision block 3128, where the method 600 commences the final processing of the currently scanned pixel.

During decision block 3128, the method 600 checks whether the currently updated variable w is even. If the decision block 3128 returns TRUE (Yes), then the method proceeds to step 3130, where the overall real opacity of the currently scanned pixel is computed in accordance with the formulae:

Opacity=a$\alpha$, where a is the coverage area value currently stored in the accumulator and $\alpha$ is the intrinsic opacity of the polygon. In this particular case, as w is even the final winding count w makes no contribution to the overall real opacity of the currently scanned pixel.

On the other hand, if the decision block 3128 returns FALSE (No), then the method proceeds to step 3122, where the overall real opacity of the currently scanned pixel is computed in accordance with the formulae:

Opacity=(1−a)$\alpha$, where a is the coverage area value currently stored in the accumulator and $\alpha$ is the intrinsic opacity of the polygon. In this particular case, w is odd and the effect of adding to the accumulator an odd number of loops that fully enclose the pixel is equivalent to inverting the coverage area of the pixel. This is because the additional loops combine destructively with the accumulator.

After completion of steps 3122 or 3130, the method 600 then proceeds to step 624, where the currently scanned pixel is rendered in accordance with the computed real opacity. After completion of step 624, the method 600 then proceeds to the next pixel within the scanline for processing. If there are no more remaining pixels within the scanline to be processed, the method 600 terminates and returns to the main method.

The aforementioned method(s) comprise a particular control flow. There are many other variants of the preferred method(s) which use different control flows without departing the spirit or scope of the invention. Furthermore one or more of the steps of the preferred method(s) may be performed in parallel rather sequential.

12.0 Preferred Apparatus

Figure 37:
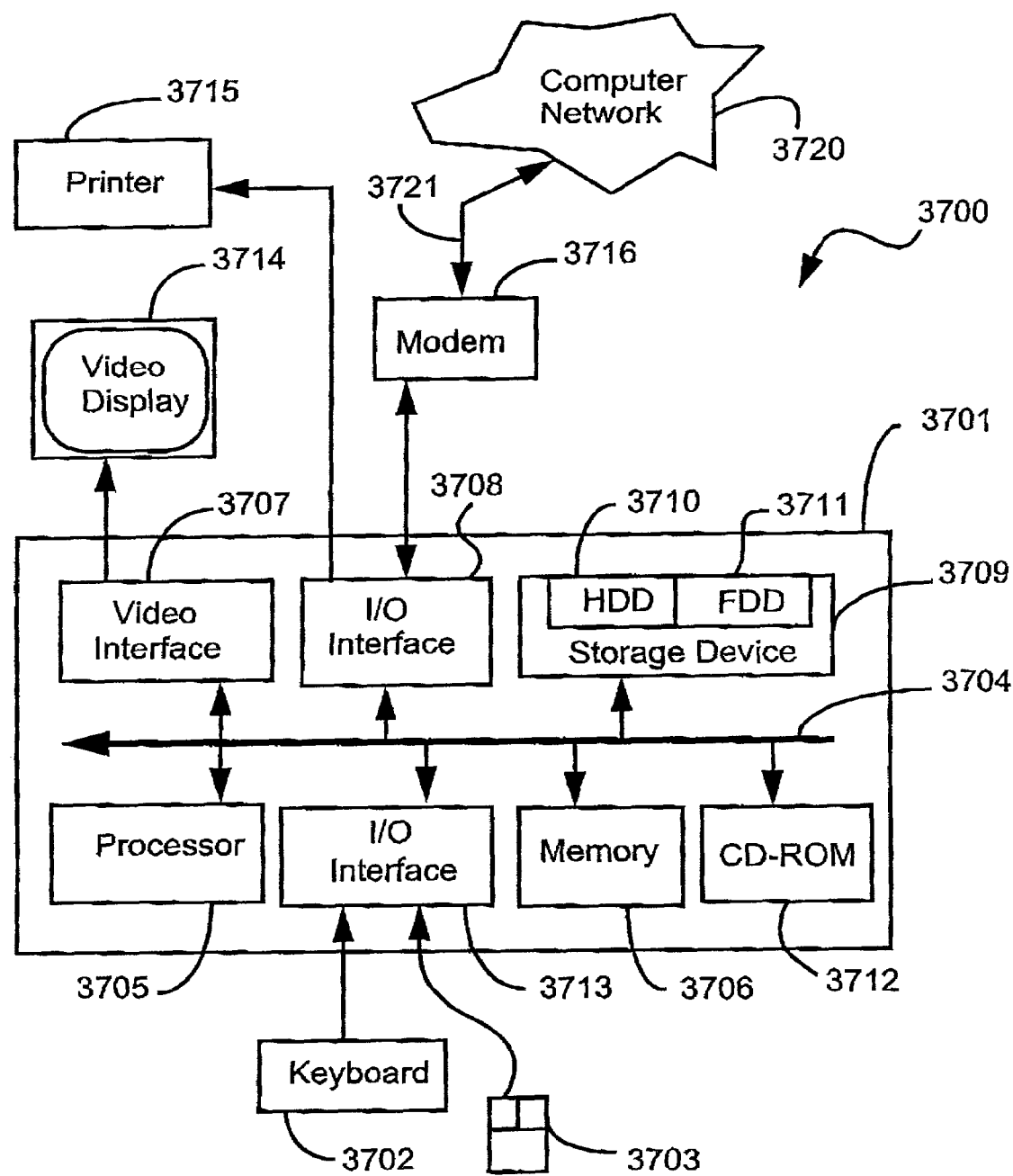
FIG. 37 is a schematic block diagram of a general-purpose computer, upon which the methods 600 and 3600 can be practiced.

The method(s) of FIG. 6 and 36 are preferably practiced using a conventional general-purpose computer system 3400, such as that shown in FIG. 37 wherein the processes of FIGS. 6 and 36 may be implemented as software, such as an application program executing within the computer system 3700. In particular, the steps of the method(s) of FIG. 6 and 36 are effected by instructions in the software that are carried out by the computer The software may be stored in a computer readable medium, including the storage devices described below, for example. The software is loaded into the computer from the computer readable medium, and then executed by the computer. A computer readable medium having such software or computer program recorded on it is a computer program product.

The computer system 3700 comprises a computer module 3701, input devices such as a keyboard 3702 and mouse 3703, output devices including a printer 3715 and a display device 3714. A Modulator-Demodulator (Modem) transceiver device 3716 is used by the computer module 3701 for communicating to and from a communications network 3720, for example connectable via a telephone line 3721 or other functional medium. The modem 3716 can be used to obtain access to the Internet, and other network systems, such as a Local Area Network (LAN) or a Wide Area Network (WAN).

The computer module 3701 typically includes at least one processor unit 3705, a memory unit 3706, for example formed from semiconductor random access memory (RAM) and read only memory (ROM), input/output (I/O) interfaces including a video interface 3707, and an I/O interface 3713 for the keyboard 3702 and mouse 3703 and optionally a joystick (not illustrated), and an interface 3708 for the modem 3716. A storage device 3709 is provided and typically includes a hard disk drive 3710 and a floppy disk drive 3711. A magnetic tape drive (not illustrated) may also be used. A CD-ROM drive 3712 is typically provided as a non-volatile source of data. The components 3705 to 3713 of the computer module 3701, typically communicate via an interconnected bus 3704 and in a manner which results in a conventional mode of operation of the computer system 3700 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 3710 and read and controlled in its execution by the processor 3705, Intermediate storage of the program and any data fetched from the network 3720 may be accomplished using the semiconductor memory 3706, possibly in concert with the hard disk drive 3710. In some instances, the application program may be supplied to the user encoded on a CD-ROM or floppy disk and read via the corresponding drive 3712 or 3711, or alternatively may be read by the user from the network 3720 via the modem device 3716. Still further, the software can also be loaded into the computer system 3700 from other computer readable medium including magnetic tape, a ROM or integrated circuit, a magneto-optical disk, a radio or infra-red transmission channel between the computer module 3701 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method(s) of FIG. 6 and 36 may alternatively be implemented in dedicated hardware such as one or more integrated circuits performing the functions or sub functions of the method(s). Such dedicated hardware may include graphic processors, digital signal processors, or one or more microprocessors and associated memories.

INDUSTRIAL APPLICABILITY

It is apparent from the above that the embodiments of the invention are applicable to the computer graphics and related industries.

The foregoing describes only one some embodiments of the present invention, and modifications and/or changes call be made thereto without departing from the scope and spirit of the invention, the embodiment(s) being illustrative and not restrictive.

I claim:

1. A method of rendering objects, the method comprising, for each object within a scanline, the steps of:
    determining each boundary pixel that overlaps both sides of a border of the object;
    computing a real opacity of each said boundary pixel, wherein the real opacity of a said boundary pixel is dependent upon the real opacities of subregions of said boundary pixel, and values representative of the areas of the respective subregions with respect to the total area of the boundary pixel, wherein the real opacity of each subregion is $1-(1-\alpha)^{|n|}$ where $\alpha$ is the intrinsic opacity of the object and n is the winding count for the subregion, and wherein the real opacity is a weighted sum of the real opacities of respective subregions, where the real opacities subregions are weighted with said values; and
    rendering each said boundary pixel by compositing using the corresponding computed real opacity.

2. A method as claimed in claim 1, wherein said computing step, comprises the sub-steps of:
    computing the real opacities at a plurality of sampling points within each said boundary pixel; and
    determining the real opacity of each said boundary pixel, wherein the real opacity of a said boundary pixel is the sum of the computed real opacities at the sampling points of said boundary pixel divided by the total number of sampling points in the pixel.

3. A method as claimed in claim 1, wherein said computing step, comprises the sub-steps of:
    determining those subregions within each said boundary pixel which have a constant winding count;
    computing the real opacities of a plurality of subregions within each said boundary pixel; and
    determining the real opacity of each said boundary pixel, wherein the real opacity of a said boundary pixel is the sum of the product of percentage areas of pixel occupied by each subregion of said boundary pixel and its computed real opacity.

4. A method as claimed in claim 1, wherein at least one of the objects is a simple polygon.

5. A method as claimed in claim 1, wherein at least one of the objects is a self-overlapping polygon.

6. A method as claimed in claim 1, wherein for a given object of uniform intrinsic opacity, said method further comprises:
    computing the real opacities for winding counts 1 to m, where m is a positive integer.

7. A method as claimed in claim 1, wherein the method further comprises the sub-steps:
    determining inner pixels of the object, the inner pixels being pixels inside the object other than said boundary pixels;
    computing a real opacity of each said inner pixel, wherein the real opacity is dependent upon an intrinsic opacity of the object and a winding count for that inner pixel; and
    rendering each inner pixel with the corresponding determined real opacity.

8. Apparatus for rendering objects, the apparatus comprising processing means for processing each object within a scanline, the processing means comprising:
    means for determining each boundary pixel that overlaps both sides of a border of the object;
    means for computing a real opacity of each said boundary pixel, wherein the real opacity of a said boundary pixel is dependent upon the real opacities of subregions of said boundary pixel, and values representative of the areas of the respective subregions with respect to the total area of the boundary pixel, wherein the real opacity of each subregion is $1-(1-\alpha)^{|n|}$ where $\alpha$ is the intrinsic opacity of the object and n is the winding count for the subregion, and wherein the real opacity is a weighted sum of the real opacities of respective subregions, where the real opacities subregions are weighted with said values; and
    means for rendering each said boundary pixel by compositing using the corresponding computed real opacity.

9. Apparatus as claimed in claim 8, wherein said computing means comprises:
    means for computing the real opacities at a plurality of sampling points within each said boundary pixel, and
    means for determining the real opacity of each said boundary pixel, wherein the real opacity of a said boundary pixel is the sum of the computed real opacities at the sampling points of said boundary pixel divided by the total number of sampling points in the pixel.

10. Apparatus as claimed in claim 8, wherein said computing means comprises:
    means for determining those subregions within each said boundary pixel which have a constant winding count;
    means for computing the real opacities of a plurality of subregions within each said boundary pixel; and
    means for determining the real opacity of each said boundary pixel, wherein the real opacity of a said boundary pixel is the sum of the product of percentage areas of pixel occupied by each subregion of said boundary pixel and its computed real opacity.

11. Apparatus as claimed in claim 8, wherein at least one of the objects is a simple polygon.

12. Apparatus as claimed in claim 8, wherein at least one of the objects is a self-overlapping polygon.

13. Apparatus as claimed in claim 8, wherein for a given object of uniform intrinsic opacity, said apparatus further comprises:

means for computing the real opacities for winding counts 1 to m, where m is a positive integer.

14. Apparatus as claimed in claim 8, wherein the apparatus further comprises:

means for determining inner pixels of the object, the inner pixels being pixels inside the object other than said boundary pixels;

means for computing a real opacity of each inner pixel, wherein the real opacity is dependent upon an intrinsic opacity of the object and a winding count for that inner pixel; and means for rendering each inner pixel by compositing using the corresponding determined real opacity.

15. A computer program for rendering objects, the computer program comprising processing code for processing each object within a scanline, the processing code comprising:

code for determining each boundary pixel that overlaps both sides of a border of the object;

code for computing a real opacity of each said boundary pixel, wherein the real opacity of a said boundary pixel is dependent upon the real opacities of subregions of said boundary pixel, and values representative of the areas of the respective subregions with respect to the total area of the boundary pixel, wherein the real opacity of each subregion is $1-(1-\alpha)^{|n|}$, where $\alpha$ is the intrinsic opacity of the object and n is the winding count for the subregion, and wherein the real opacity is a weighted sum of the real opacities of respective subregions, where the real opacities subregions are weighted with said values; and code for rendering each said boundary pixel with by compositing using the corresponding computed real opacity.

16. A computer program as claimed in claim 15, wherein said computing code comprises:

code for computing the real opacities at a plurality of sampling points within each said boundary pixel, and code for determining the real opacity of each said boundary pixel, wherein the real opacity of a said boundary pixel is the sum of the computed real opacities at the sampling points of said boundary pixel divided by the total number of sampling points in the pixel.

17. A computer program as claimed in claim 15, wherein said computing code comprises:

code for determining those subregions within each said boundary pixel which have a constant winding count;

code for computing the real opacities of a plurality of subregions within each said boundary pixel; and code for determining the real opacity of each said boundary pixel, wherein the real opacity of a said boundary pixel is the sum of the product of percentage areas of pixel occupied by each subregion of said boundary pixel and its computed real opacity.

18. A computer program as claimed in claim 15, wherein at least one of the objects is a simple polygon.

19. A computer program as claimed in claim 15, wherein at least one of the objects is a self-overlapping polygon.

20. A computer program as claimed in claim 15, wherein for a given object of uniform intrinsic opacity, said computer program further comprises:

code for computing the real opacities for winding counts 1 to m, where m is a positive integer.

21. A computer program as claimed in claim 15, wherein the computer program further comprises:

code for determining inner pixels of the object, the inner pixels being pixels inside the object other than said boundary pixels;

code for computing a real opacity of each inner pixel, wherein the real opacity is dependent upon an intrinsic opacity of the object and a winding count for that inner pixel; and code for rendering each inner pixel with the corresponding determined real opacity.

\* \* \* \* \*

UNITED STATES PATENT AND TRADEMARK OFFICE
CERTIFICATE OF CORRECTION

| | |
|---|---|
| PATENT NO. | : 7,110,003 B2 |
| APPLICATION NO. | : 10/022376 |
| DATED | : September 19, 2006 |
| INVENTOR(S) | : Khanh Phi Van Doan |

It is certified that error appears in the above-identified patent and that said Letters Patent is hereby corrected as shown below:

COLUMN 4:

Line 17, "illustrates" should read --illustrate--;
Line 19, "illustrates" should read --illustrate--;
Line 21, "illustrates" should read --illustrate--;
Line 23, "illustrates" should read --illustrate--;
Line 26, "illustrates" should read --illustrate--;
Line 48, "is a" should read --are--; and "chart" should read --charts--;
Line 53, "is a" should read --are--; and "chart" should read --charts--;
Line 55, "FIGS. 29" should read --FIG. 29--; and
Line 61, "is a" should read --are--; and "chart" should read --charts--.

COLUMN 5:

Line 1, "FIGS. 33" should read --FIG. 33--;
Line 30, "direction" should read --direction.--;
Line 57, "follows;" should read --follows:--;
Line 62, "Eqn. (1)." should read --Eqn. (1)--; and
Line 67, "of" should read --of:--.

COLUMN 7

Line 13, "Porter et. al.," should read --Porter et al.,--; and
Line 66, "Porter et. al)." should read --Porter et al.).--.

COLUMN 8:

Line 8, "represents" should read --represent--; and
Line 56, "may" should read --may be--.

COLUMN 9:

Line 16, "3614," should read --3614.--;
Line 34, "rule" should read --rule.--; and
Line 38, "polygons," should read --polygons.--.

COLUMN 11:

Line 24, "pixel," should read --pixel.--; and
Line 56, "respectively," should read --respectively.--.

UNITED STATES PATENT AND TRADEMARK OFFICE
CERTIFICATE OF CORRECTION

PATENT NO. : 7,110,003 B2
APPLICATION NO. : 10/022376
DATED : September 19, 2006
INVENTOR(S) : Khanh Phi Van Doan It is certified that error appears in the above-identified patent and that said Letters Patent is hereby corrected as shown below:

<u>COLUMN 12</u>:

Line 9, "region," should read --region.--; and
    Line 59, "area In" should read --area. In--.

<u>COLUMN 13</u>:

Line 27, "mation"." should read --mation",--;
    Line 39, "regions," should read --regions.--;
    Line 42, "polygons" should read --polygon,--; and
    Line 50, "mule" should read --rule--.

<u>COLUMN 14</u>:

Line 28, "poses" should read --posing--.

<u>COLUMN 15</u>:

Line 25, "be then" should read --then be--.

<u>COLUMN 16</u>:

Line 35, "$\alpha(e-x-y)+\alpha(b-x-Y)+x(2\alpha-\alpha^2)=\alpha(e+b-2y)-\alpha^2 x$" should read
        --$\alpha(e-x-y)+\alpha(b-x-y)+x(2\alpha-\alpha^2)=\alpha(e+b-2y)-\alpha^2 x$--;
    Line 37, "Where" should read --where--;
    Line 41, "by" should read --by:--;
    Line 46, "becomes" should read --becomes:--; and
    Line 51, "prising" should read --prised--.

<u>COLUMN 17</u>:

Line 9, "illustrate" should read --illustrated--;
    Line 21, "it it" should read --it is--;
    Line 33, "die" should read --the--; and
    Line 46, "virtual" should read --virtuality--.

<u>COLUMN 18</u>:

Line 17, "boundary" should read --boundary.--.

UNITED STATES PATENT AND TRADEMARK OFFICE
CERTIFICATE OF CORRECTION

PATENT NO. : 7,110,003 B2
APPLICATION NO. : 10/022376
DATED : September 19, 2006
INVENTOR(S) : Khanh Phi Van Doan It is certified that error appears in the above-identified patent and that said Letters Patent is hereby corrected as shown below:

COLUMN 19:

Line 19, "m the" should read --in the--;
Line 47, "As" should read --as--;
Line 51, "by" should read --by:--;
Line 54, "As" should read --as--; and
Line 63, "4.0" should read --4.0.--; and "approximate" should read --approximates--.

COLUMN 20:

Line 3, "becomes" should read --becomes:--;
Line 8, "becomes" should read --becomes:--;
Line 12, "Eqns" should read --Eqns.--;
Line 21, "be not" should read --not be--; and
Line 67, "comprising" should read --comprised--.

COLUMN 21:

Line 32, "by" should read --by:--;
Line 39, "operation," should read --operation.--;
Line 40, "are" should read --is--; and
Line 41, "formulae" should read --formulae:--.

COLUMN 22:

Line 10, "ing" should read --ed--;
Line 12, "area" should read --area z--;
Line 20, "Which" should read --which--; and "suns" should read --sum--; and
Line 65, "to" should read --to:--.

COLUMN 23:

Line 2, "to" should read --to:--;
Line 20, "region" should read --regions--; and
Line 61, "s_32" should read --s_ =--.

COLUMN 24:

Line 62, "upto" should read --up to--; and
Line 63, "$W_+$, $W_{-1}$, $|W_+ - W_{31}|$." should read --$W_+$, $W_-$, $|W_+ - W_-|$.--.

UNITED STATES PATENT AND TRADEMARK OFFICE
CERTIFICATE OF CORRECTION

PATENT NO. : 7,110,003 B2
APPLICATION NO. : 10/022376
DATED : September 19, 2006
INVENTOR(S) : Khanh Phi Van Doan It is certified that error appears in the above-identified patent and that said Letters Patent is hereby corrected as shown below:

<u>COLUMN 25</u>:

Line 15, "formulae;" should read --formulae:--; and
    Line 30, "Eqns" should read --Eqns.--.

<u>COLUMN 27</u>:

Line 8, "2616," should read --2616.--; and
    Line 49, "region," should read --regions--.

<u>COLUMN 29</u>:

Line 62, "values" should read --value,--.

<u>COLUMN 30</u>:

Line 17, "$m_x$," should read --$m_x$--.

<u>COLUMN 31</u>:

Line 14, "is" should be deleted;
    Line 23, "tis" should read --this--.

<u>COLUMN 32</u>:

Line 38, "$W_+ = p_+/a_{+,\text{ where } p+}$" should read --$W_+ = p_+/a_+$, where $p_+$--;
    Line 45, "$a_{31}$" should read --$a_-$--;
    Line 52, "respectively" should read --respectively.--; and
    Line 58, "$s-=a_{31}$," should read --$s-=a_-$,--.

<u>COLUMN 33</u>:

Line 55, "combing" should read --combining--;
    Line 67, "subre" should read --subre- --.

<u>COLUMN 34</u>:

Line 2, "half" should read --half.--; and "by" should read --by:--;
    Line 57, "Eqns" (both occurrences) should read --Eqns.--; and
    Line 65, "Eqns" should read --Eqns.--.

UNITED STATES PATENT AND TRADEMARK OFFICE
CERTIFICATE OF CORRECTION

PATENT NO. : 7,110,003 B2
APPLICATION NO. : 10/022376
DATED : September 19, 2006
INVENTOR(S) : Khanh Phi Van Doan It is certified that error appears in the above-identified patent and that said Letters Patent is hereby corrected as shown below:

COLUMN 35:

Line 2, "ill" should read --fill--; and "Eqns" should read --Eqns.--; and
Line 5, "0,65($\alpha$(−0.4231))+0.225($\alpha$)." should read
--0.65($\alpha$(1−0.4231))+0.225($\alpha$).--.

COLUMN 38:

Line 16, "my" should read --My--;
Line 54, "segments," should read --segments.--; and
Line 58, "region," should read --region.--.

COLUMN 39:

Line 6, "turing" should read --turning--;
Line 29, "$m_a$," should read --$m_a$--; and
Line 33, "FIGS." should read --FIG.--.

COLUMN 40:

Line 18, "computer" should read --computer.--; and
Line 57, "3705," should read --3705.--.

COLUMN 41:

Line 22, "one" should be deleted;
Line 23, "call" should read --can--; and
Line 39, "$1-(1-\alpha)^{|n|}$" should read --$1-(1-\alpha)^{|n|}$,--.

COLUMN 42:

Line 33, "$1-(1-\alpha)^{|n|}$" should read --$1-(1-\alpha)^{|n|}$,--; and
Line 45, "pixel, and" should read --pixel; and--.

UNITED STATES PATENT AND TRADEMARK OFFICE
CERTIFICATE OF CORRECTION

PATENT NO. : 7,110,003 B2
APPLICATION NO. : 10/022376
DATED : September 19, 2006
INVENTOR(S) : Khanh Phi Van Doan It is certified that error appears in the above-identified patent and that said Letters Patent is hereby corrected as shown below:

<u>COLUMN 43</u>:

Line 35, "with" should be deleted; and
    Line 41, "pixel, and" should read --pixel; and--.

Signed and Sealed this

Twenty-sixth Day of June, 2007

JON W. DUDAS
*Director of the United States Patent and Trademark Office*